United States Patent [19]

Suzuki et al.

[11] Patent Number: 5,594,992
[45] Date of Patent: Jan. 21, 1997

[54] APPARATUS FOR MEASURING A LENS FRAME CONFIGURATION

[75] Inventors: Yasuo Suzuki; Takashi Sato; Jun Akiyama, all of Tokyo, Japan

[73] Assignee: Kabushiki Kaisha Topcon, Tokyo, Japan

[21] Appl. No.: 425,202

[22] Filed: Apr. 20, 1995

[30] Foreign Application Priority Data

Apr. 20, 1994 [JP] Japan .................................. 6-081235
Apr. 22, 1994 [JP] Japan .................................. 6-084304

[51] Int. Cl.⁶ ................................................... G01B 5/20
[52] U.S. Cl. .................................. 33/200; 33/507; 33/551
[58] Field of Search ............................... 33/200, 28, 507, 33/549, 550, 551, 553, 554, 555

[56] References Cited

U.S. PATENT DOCUMENTS

| | | | |
|---|---|---|---|
| 4,051,601 | 10/1977 | Godot | 33/553 |
| 5,097,600 | 3/1992 | Brule et al. | 33/200 |
| 5,121,550 | 6/1992 | Wood et al. | 33/551 |
| 5,152,067 | 10/1992 | Kurachi et al. | 33/200 |
| 5,195,248 | 3/1993 | Chansavoir | 33/551 |

FOREIGN PATENT DOCUMENTS

| | | | |
|---|---|---|---|
| 4107894 | 9/1991 | Germany | 33/200 |
| 3135708 | 6/1991 | Japan | 33/200 |

*Primary Examiner*—Christopher W. Fulton
*Attorney, Agent, or Firm*—Finnegan, Henderson, Farabow, Garrett & Dunner, L.L.P.

[57] ABSTRACT

An apparatus for measuring a lens frame configuration is provided which comprises an apparatus body provided with a measuring reference surface, a frame holder movably retained by the apparatus body and adapted to hold right and left lens frames of an eyeglass frame so as to rotate and incline a holding plane of the lens frame with respect to the reference surface, a rotating device for rotating and inclining the frame holder, a measuring portion for measuring coordinates of each point in a circumferential direction of a V-shaped groove of the lens frame with respect to the measuring reference surface, and an arithmetic circuit for calculating an inclination of the lens frame in the V-shaped groove with respect to the reference surface from a result obtained by the measuring portion.

4 Claims, 34 Drawing Sheets

FIG.11(a)
FIG.11(b)
FIG.11(c)
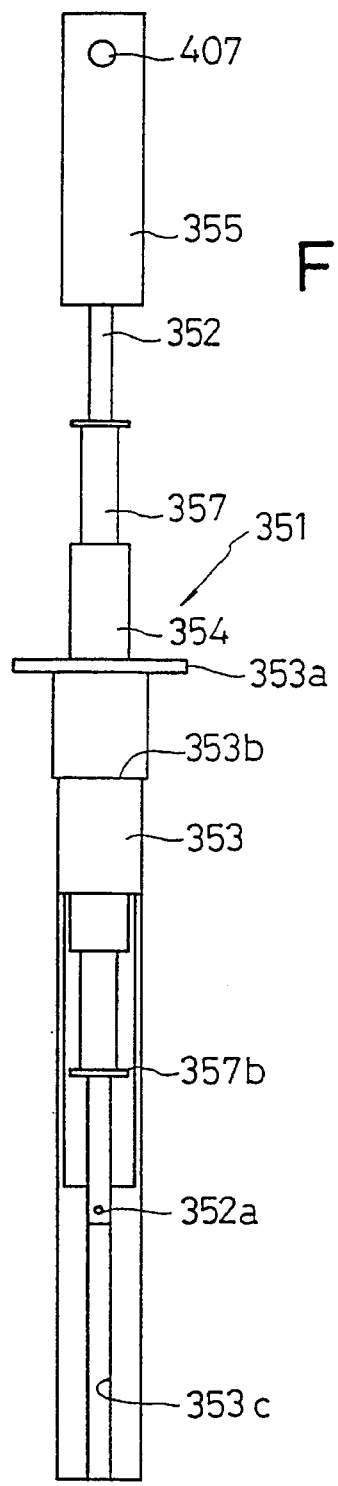
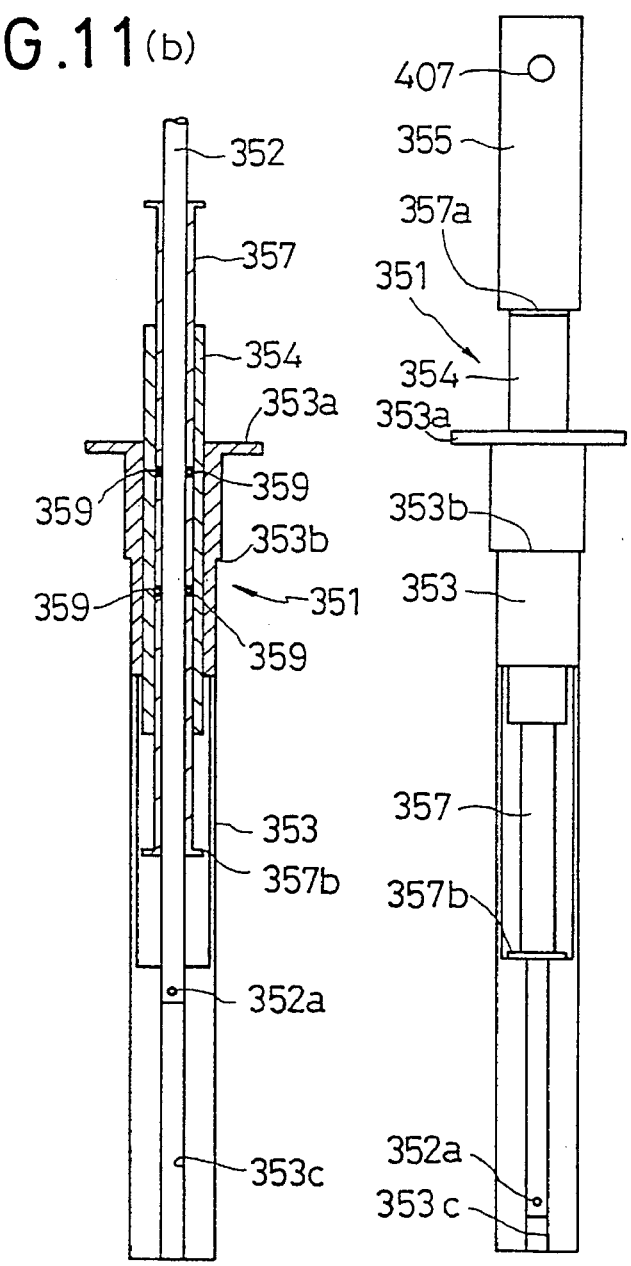

FIG. 19(A)
FIG. 19(B)
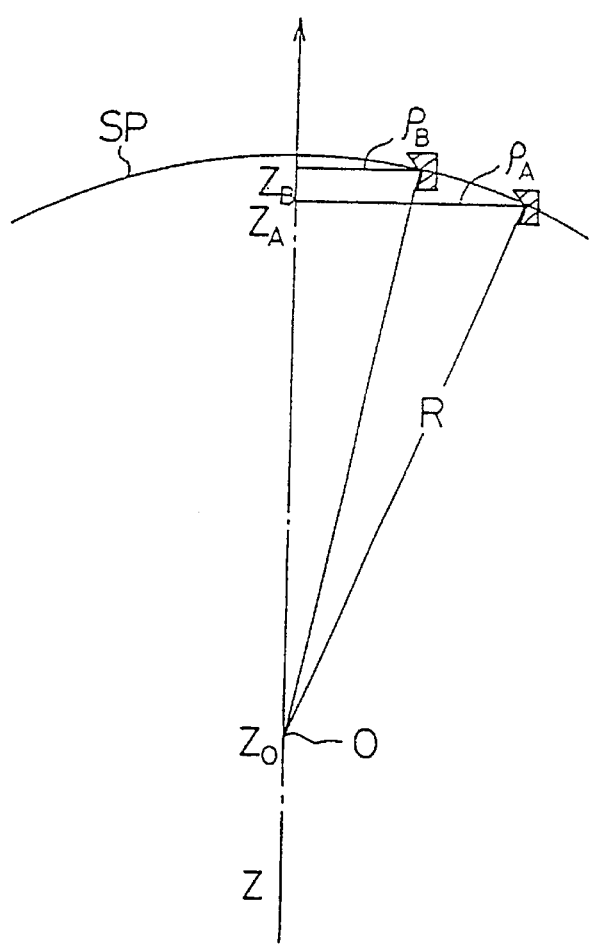
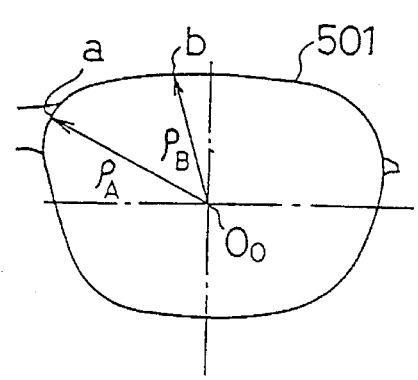

MEASUREMENT ERROR

MEASUREMENT ERROR

LENS L

LENS L'

APPARATUS FOR MEASURING A LENS FRAME CONFIGURATION

BACKGROUND OF THE INVENTION

1. Field of the Invention

This invention relates to an apparatus for digitally measuring the configuration of a lens frame of an eyeglass frame or the configuration of a template obtained by copying the lens frame, and more particularly to a lens frame configuration measuring apparatus suitable for use in combination with a lens grinding machine for grinding an optical lens blank in accordance with data concerning the configuration of the lens frame or template.

2. Description of the Prior Art

As shown in FIG. 37(a), in a typical conventional apparatus for measuring the configuration of a lens frame, right and left lens frames (frame rims) 3, 3 of an eyeglass frame 2 are first brought into contact with a holding surface 1 (measuring surface) of a frame holding device, not shown, and are maintained thereon by a maintaining rod, not shown, biased by a spring. Thereafter, a beveled feeler 5 is brought into contact with a V-shaped groove 4 of the lens frame 3 and moved along the groove 4, so that the track of the feeler is three-dimensionally detected to measure the configuration of the lens frame 3 of the eyeglass frame 2.

Generally, the front of the eyeglass frame 2 is curved as shown in FIG. 37(a). For this reason, part 7 of the lens frame 3 close to a temple (sidepiece) of the eyeglass frame 2 is spaced from the holding surface 1 (measuring reference surface) when part of the lens frame 3 close to a bridge 6 of the lens frames 3, 3 maintains contact with the surface 1 by means of the maintaining rod, not shown. As a result, the lens frame 3 and the holding surface 1 are inclined relative to each other.

In order to measure the accurate size and shape (true size) of the lens frames 3, 3, a coincidence is required between angle γ and angle δ. As shown in FIG. 38(b), γ is an angle formed by a plane including the apex of the edge of a lens L and a center line passing through the V-shaped groove of the lens frame, whereas δ is an angle formed by a plane including the apex of the feeler and the center line passing through the V-shaped groove of the lens frame.

However, in the conventional apparatus for measuring a lens frame configuration, the V-shaped feeler 5 is rotatably held by a measuring shaft (not shown) of a measuring head section for rotation about an axis 0 perpendicular to the holding surface 1 as shown in FIG. 37(b). For this reason, the V-shaped feeler 5 is in contact with the V-shaped groove 4 at an angle of inclination γ with respect to an extending direction of the V-shaped groove 4 as shown in FIG. 37(b) and therefore, it has parts which are in contact with intermediate parts of slanted surfaces 4a, 4a of the V-shaped groove 4 as shown in FIG. 37(c).

As a consequence, for measurement, the apex 5a of the feeler 5 becomes impossible to be in contact with the root of the V-shaped groove and is, therefore, obliged to be moved along the V-shaped groove copying the contour thereof with the apex 5a apart from the root. Sometimes, it happens that the feeler 5 is completely disengaged from the V-shaped groove 4. As a result, an accurate measurement of the lens frame 3 cannot be obtained.

This inconvenience is attributable to the fact that the feeler 5 is incapable of rotating in a direction perpendicular to the axis 0 (rotational axis) and incapable of copying the contour of the curved lens frame 3.

In case a lens L is ground based on measurement data thus obtained, a finished size of the ground lens L unfavorably becomes smaller than the true size as shown in FIG. 38(c).

That is, the angles γ and δ are not in agreement with each other due to inclination of the curved lens frame. If the lens L is ground based on incorrect data obtained at the area of the apex of the feeler, the lens L is ground to have, as an outer diameter, a size c different from a true size d thereof, as shown in FIG. 38(a). As a result, the finished lens L of the size c does not fit the lens frames 3, 3 of the size d, as shown in FIG. 38(c).

Also, as shown in FIG. 37(a), part 7 (part where the temple is attached as an ear hanger) of the lens frame 3 opposite to the bridge 6 is held in a state apart from the holding surface 1. If this spaced-apart amount is large, there is a possibility that the feeler 5 is disengaged from the V-shaped groove 4 of the lens frame 3 and, as a result, the three-dimensional configuration of the lens frame 3 cannot be measured.

To overcome this fault, an idea is proposed that the frame holding device is arranged such that one end portion, lengthwise, of the apparatus is rotated upwardly and downwardly about a rotational axis at the other end portion of the apparatus, and a three-dimensional configuration of the lens frame is measured while inclining the frame holding device about the rotational axis depending on the curved angle of inclination of the eyeglass frame.

However, since the frame holding device is designed such that the rotational axis at the other end of the apparatus is served as a center of rotation, an amount of inclination (an amount of upward and downward rotational movement) of part of the lens frame close to the rotational axis of the eyeglass frame held by the frame holding device is reduced, and a favorable adjustment of inclination of part of the lens frame close to the eyeglass frame is not obtained easily.

Consequently, in case a three-dimensional configuration, for example, of a right-hand side eyeglass lens is measured, the left-hand side lens frame is situated on the side of the rotational axis for measuring the three-dimensional configuration of the right-hand side configuration of the right-hand side eyeglass lens. Thereafter, in case the three-dimensional configuration of the left-hand side lens is measured, the eyeglass frame is removed from the frame holding device and the three-dimensional configuration of the left-hand side lens frame is measured while situating the right-hand side lens frame on the side of the rotational axis.

SUMMARY OF THE INVENTION

It is, therefore, a main object of the present invention to provide an apparatus for measuring a lens frame configuration, in which a configuration of a lens frame can be measured accurately in spite of the lens frame of an eyeglass frame being curved and inclined.

In order to achieve this main object, a lens frame configuration measuring apparatus according to the present invention comprises an apparatus body provided with a measuring reference surface, frame holding means movably retained by the apparatus body and adapted to hold right and left lens frames of an eyeglass frame so as to rotate and incline a holding plane of the lens frame with respect to the reference surface, rotating means for rotating and inclining the frame holding means, measuring means for measuring coordinates of each point in a circumferential direction of a V-shaped groove of the lens frame with respect of the measuring reference surface, and arithmetic circuit for calculating an inclination of the lens frame in the V-shaped groove with respect to the reference surface from a result obtained by the reference means.

From another aspect of the invention, a lens frame configuration measuring apparatus may comprise an apparatus body provided with a measuring reference surface, frame holding means for simultaneously holding right and left lens frames of an eyeglass frame, the frame holding means being attachably and detachably held by the frame holding means, a measuring element retained by the apparatus body so as to be engaged in a V-shaped groove of the eyeglass frame, measuring section supporting/moving means for supporting the measuring element and moving the same to the side of selected one of the right and left lens frames of the eyeglass frame, a measuring element relatively moving quantity detecting means for detecting a quantity of three-dimensional movement of the measuring element by moving the measuring element in contact with and along the V-shaped groove, and an arithmetic control circuit for controllably driving the measuring element moving quantity detecting means and calculating a quantity of movement from an output result of the measuring element moving quantity detecting means.

Another object of the present invention is to provide an apparatus for measuring a lens frame configuration, in which when a lens frame configuration, particularly a curved configuration of that part close to the temple, having a large size is measured, even if the measuring element is disengaged, an angle of inclination at that time the measuring element is disengaged is stored, so that the lens frame configuration can be measured by inclining the frame holding means by that angle of inclination.

In order to achieve this object, a lens frame configuration measuring apparatus according to the present invention comprises an apparatus body provided with a measuring reference surface, frame holding means movably retained by the apparatus body and adapted to simultaneously hold right and left lens frames of an eyeglass frame so as to rotate and incline a holding plane of the lens frame with respect to the reference surface, rotating means for rotating and inclining the frame holding means, measuring means for measuring coordinates of each point in a circumferential direction of a V-shaped groove of the lens frame with respect of the measuring reference surface, and an arithmetic control circuit for calculating an inclination of the V-shaped groove of the lens frame in the V-shaped groove with respect to the reference surface from a result obtained by the reference means, wherein the arithmetic control circuit preliminarily stores data of inclination at the time the measuring element is disengaged from the lens frame of the eyeglass frame, rotates and inclines, when remeasuring, the frame holding means automatically or by way of the operator's manual operation to measure coordinates of each point in the V-shaped groove, based on the inclination data, and calculates a configuration of the lens frame of the eyeglass frame from the measured result.

A further object of the present invention is to provide an apparatus for measuring a lens frame configuration, which includes a frame holding device capable of rotating for inclination about part of the eyeglass frame corresponding to a nose contact piece whereby an equal inclination amount is ensured at each eyeglass lens frame and a feeler support section as a whole is moved in the frame inclination direction so that an apex of a feeler is positively brought into contact with a root portion of a V-shaped groove, thus enabling to accurately measure a lens frame configuration of a curved eyeglass frame.

In order to achieve this object, a lens frame configuration measuring apparatus according to the present invention comprises an apparatus body, frame holding means disposed along an upper part of the apparatus body and attachably and detachably retained by the apparatus body, the holding means being adapted to hold an eyeglass frame along an upper surface of the apparatus body, a measuring element retained by the apparatus body so as to be engaged in a V-shaped groove of the glass frame, measuring section supporting/moving means for supporting the measuring element and relatively moving the same to the side of selected one of the right and left lens frames of the glass frame, a measuring element moving quantity detecting means for detecting a quantity of three-dimensional movement of the measuring element by moving the measuring element in contact with and along the V-shaped groove, and an arithmetic control circuit for controllably driving the measuring element moving quantity detecting means and calculating a quantity of movement from an output result of the measuring element moving quantity detecting means. In the lens frame configuration measuring apparatus, the frame holding means has a rotating shaft which is situated at a place corresponding to a nose contact portion of the eyeglass frame so as to rotate or swing the eyeglass frame upward and downward centering the nose contact portion, and the measuring section supporting/moving means is moved according to a direction of inclination of the frame holding means in order to measure a three-dimensional configuration of the eyeglass frame.

BRIEF DESCRIPTION OF THE ATTACHED DRAWINGS

FIG. 11($a$) is a front view of a measuring element axis holding member now in its upper dead point, FIG. 11($b$) is a vertical sectional view of the measuring element axis holding member, and FIG. 11($c$) is a front view of a measuring element axis holding member now in its lower dead point;

Figure 17:
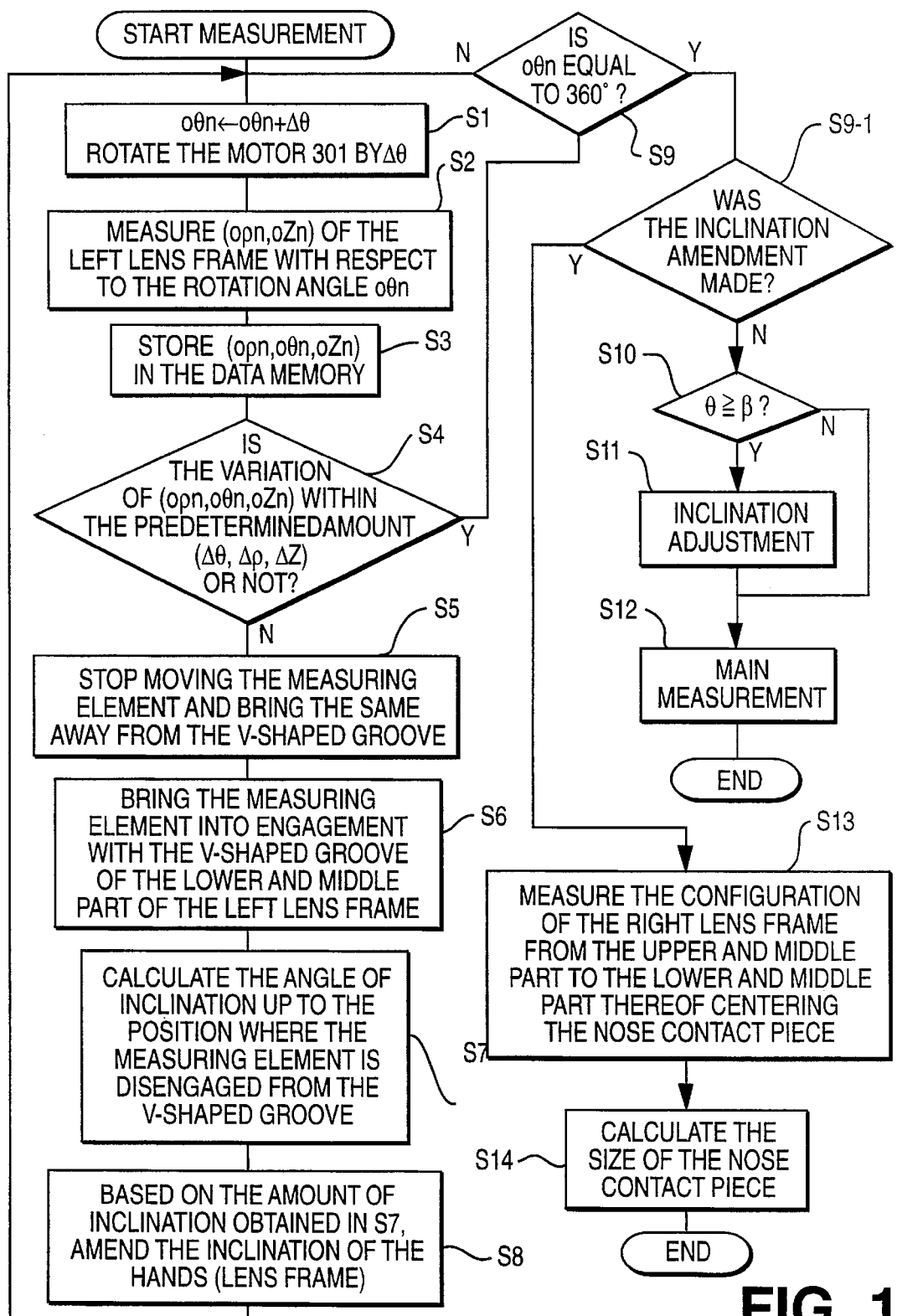
FIG. 17 is a flowchart of the control circuit shown in FIG. 16.
Figure 20A:
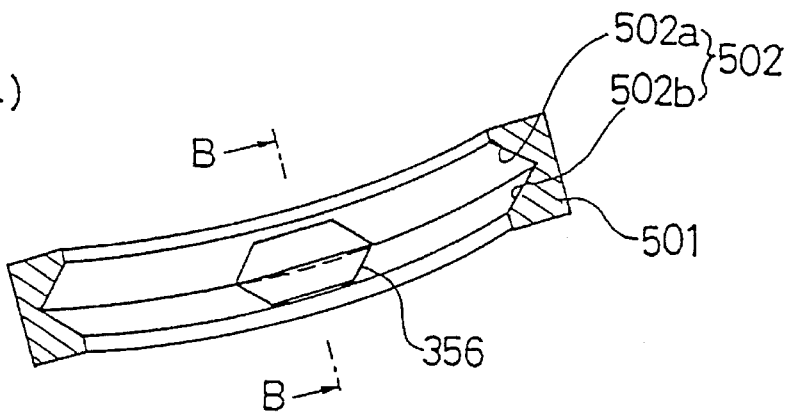
Figure 20B:
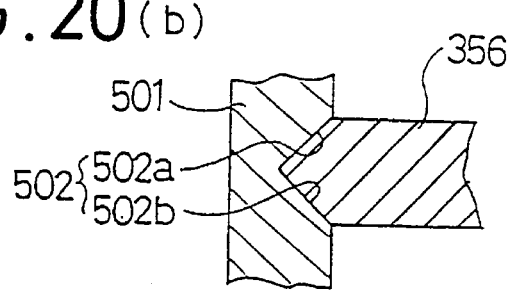
Figure 21:
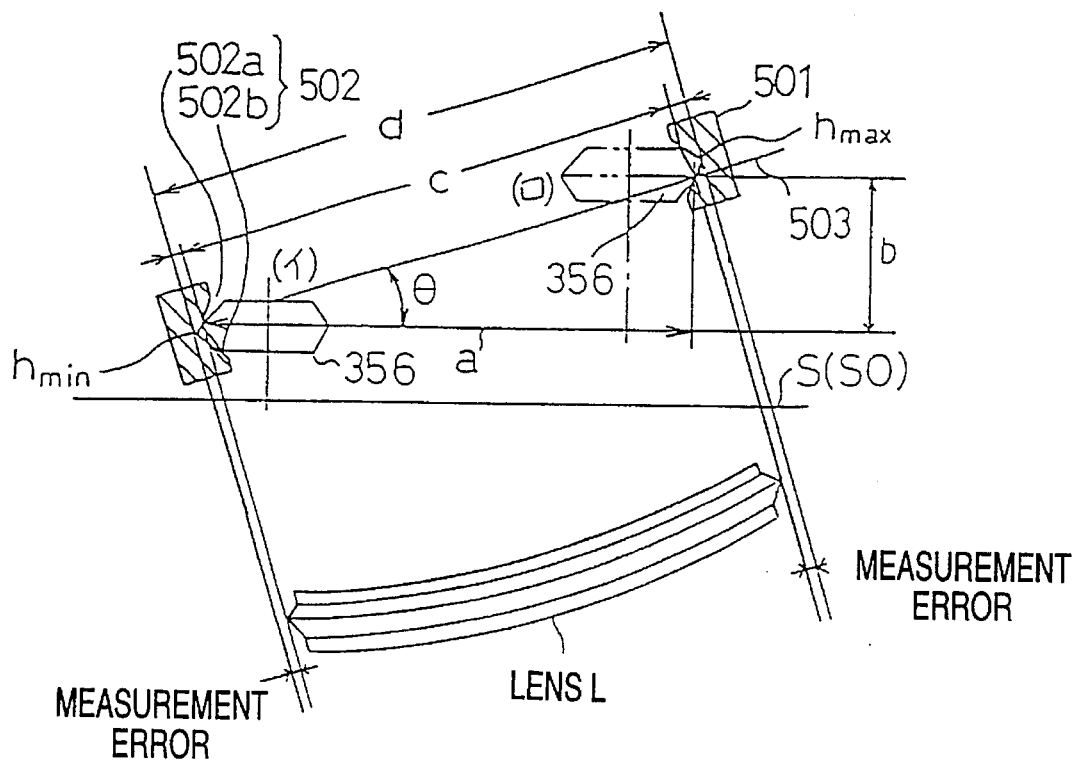
Figure 22:
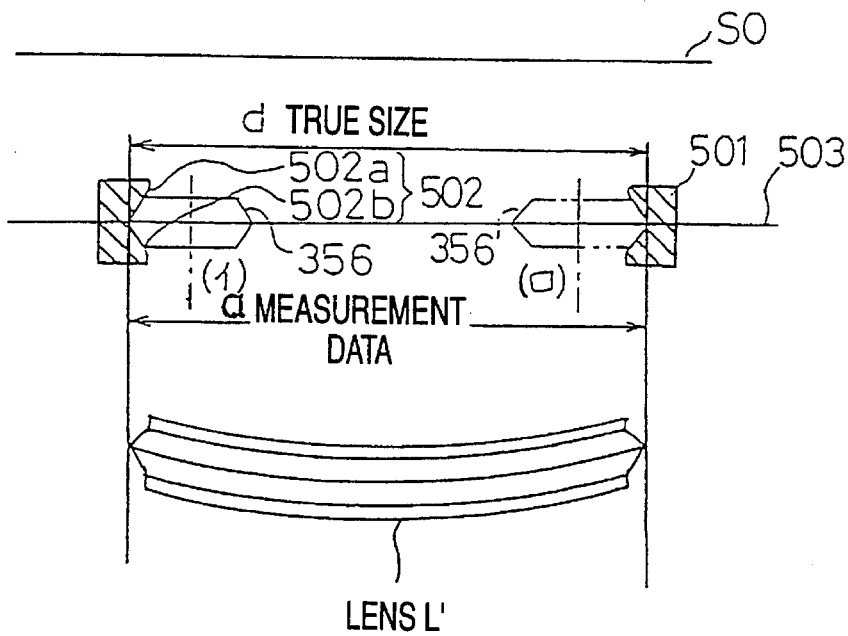
Figure 23A:
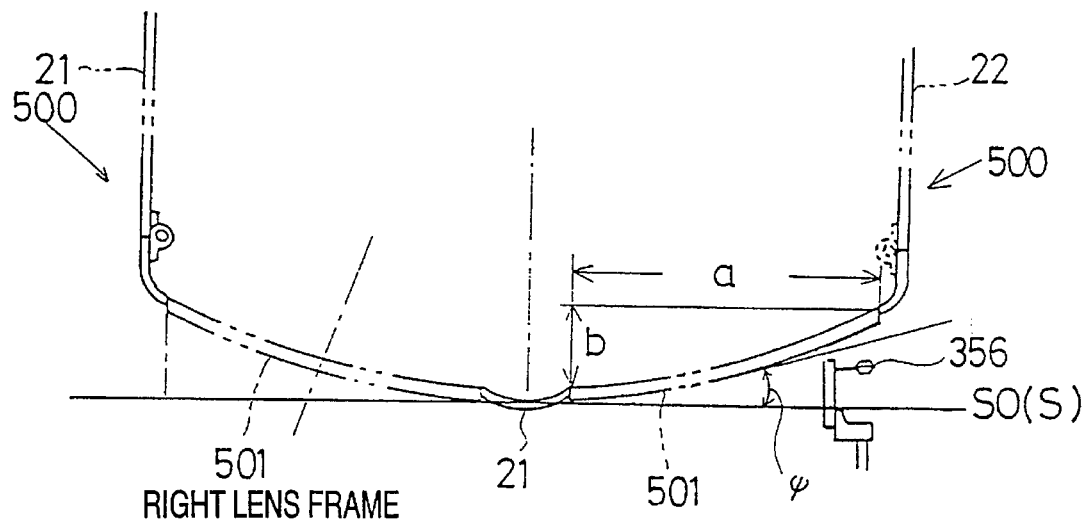
Figure 23B:
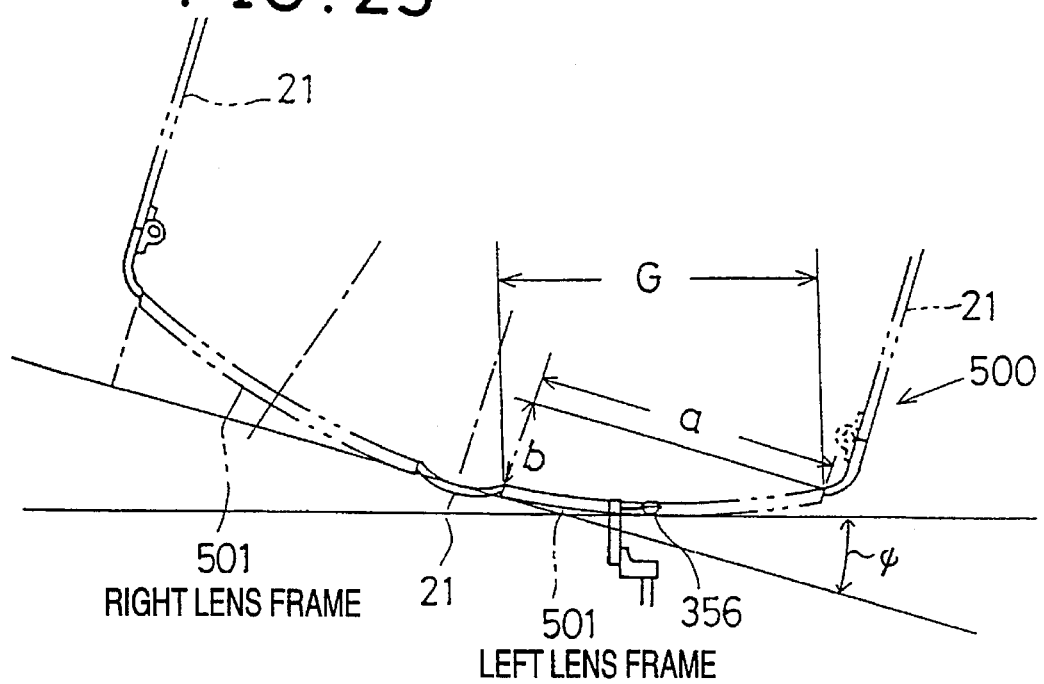
Figure 24A:
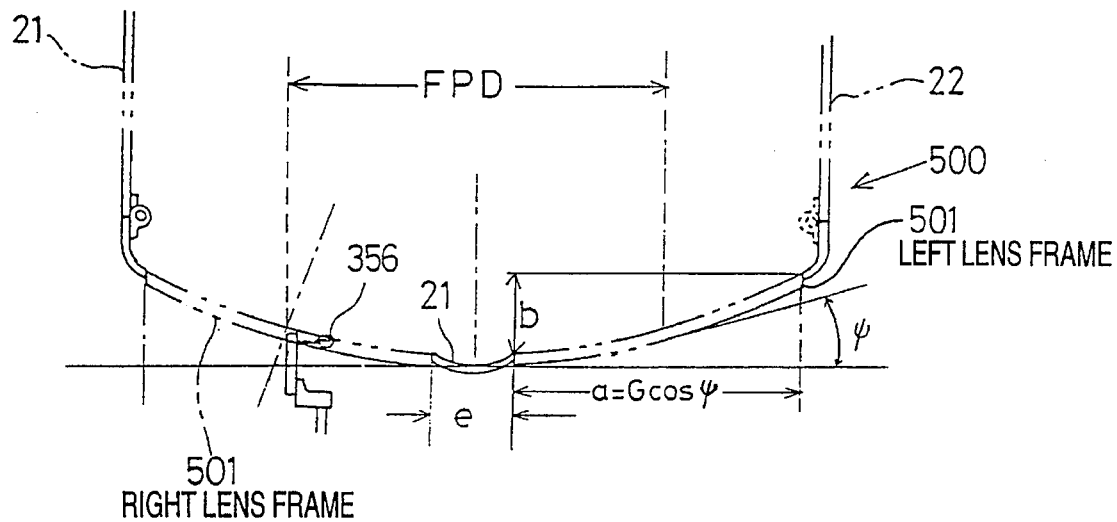
Figure 24B:
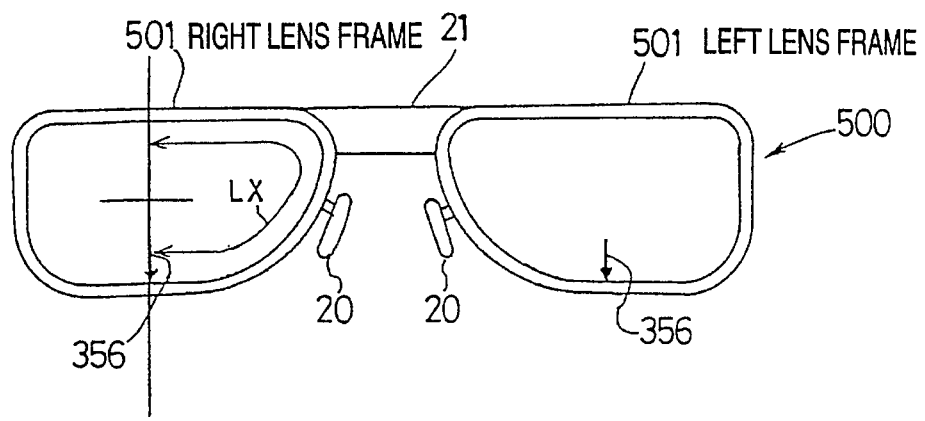
Figure 25:
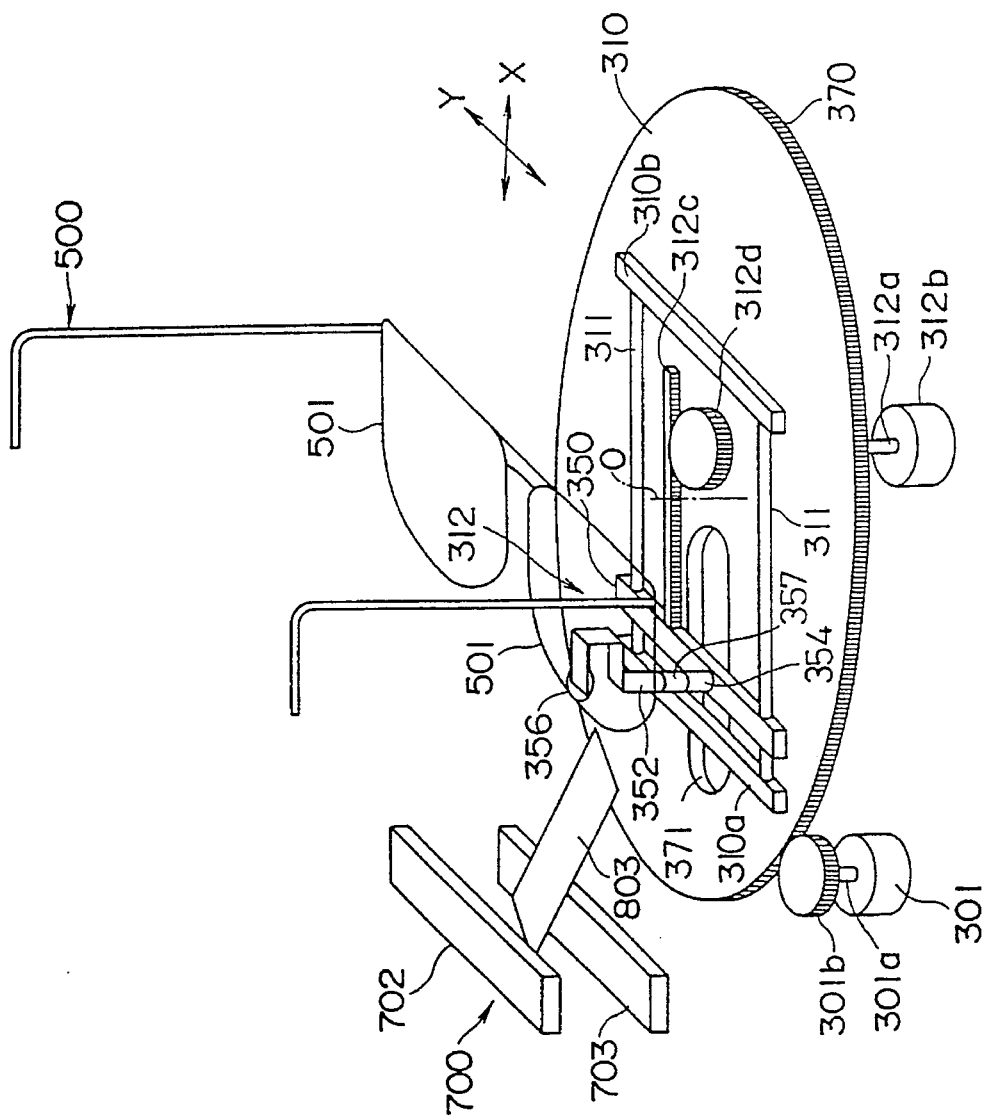
Figure 26:
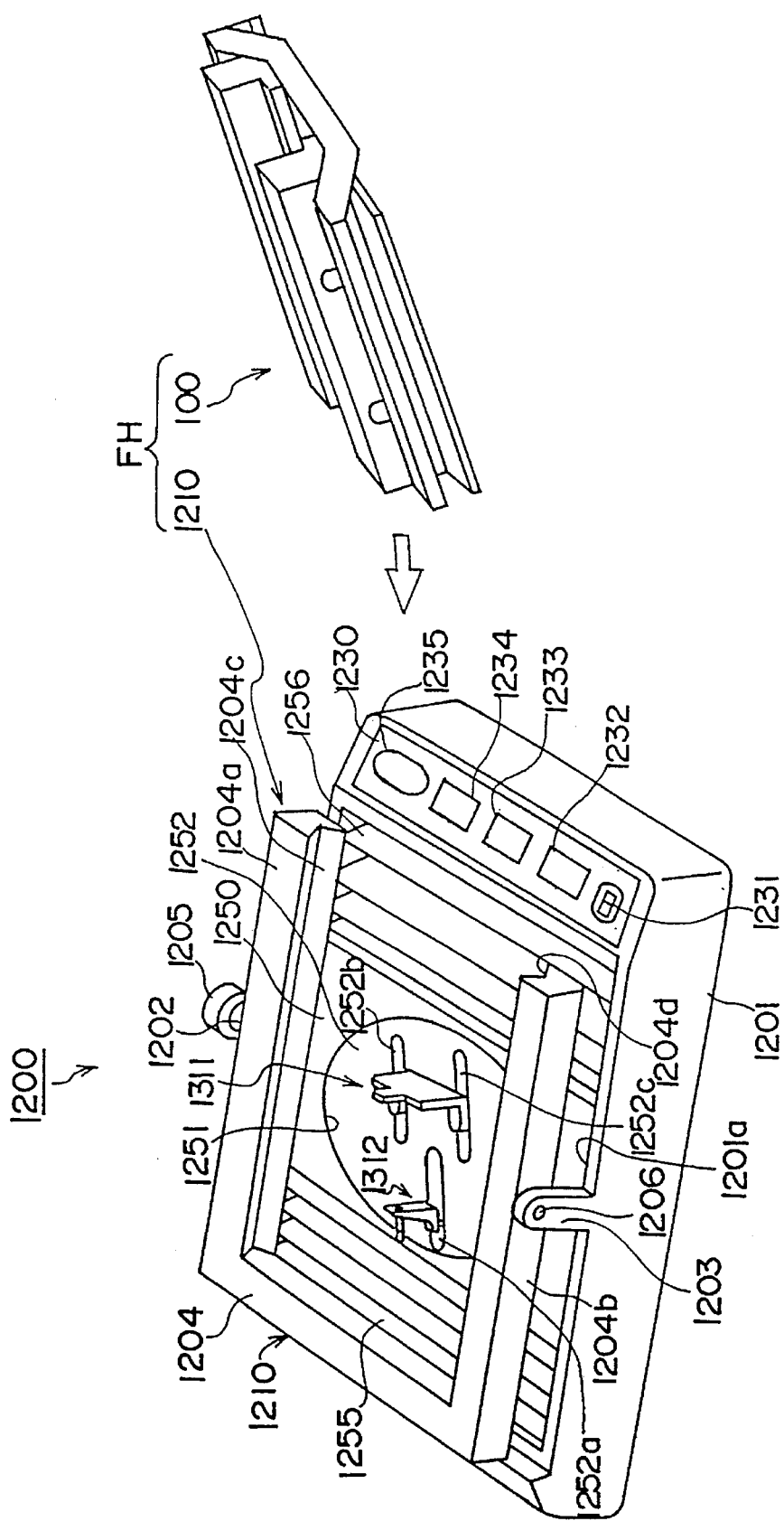
Figure 27:
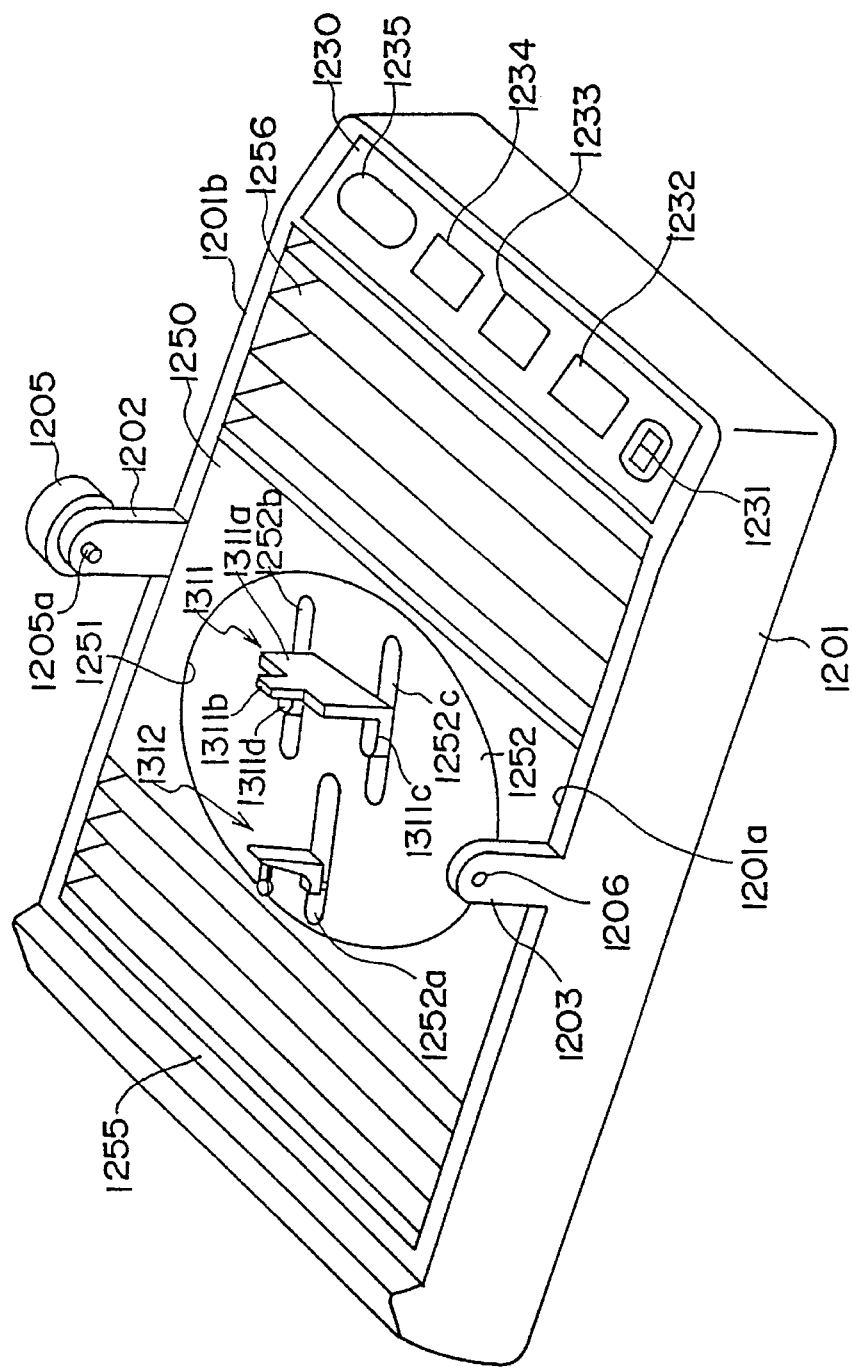
Figure 29:
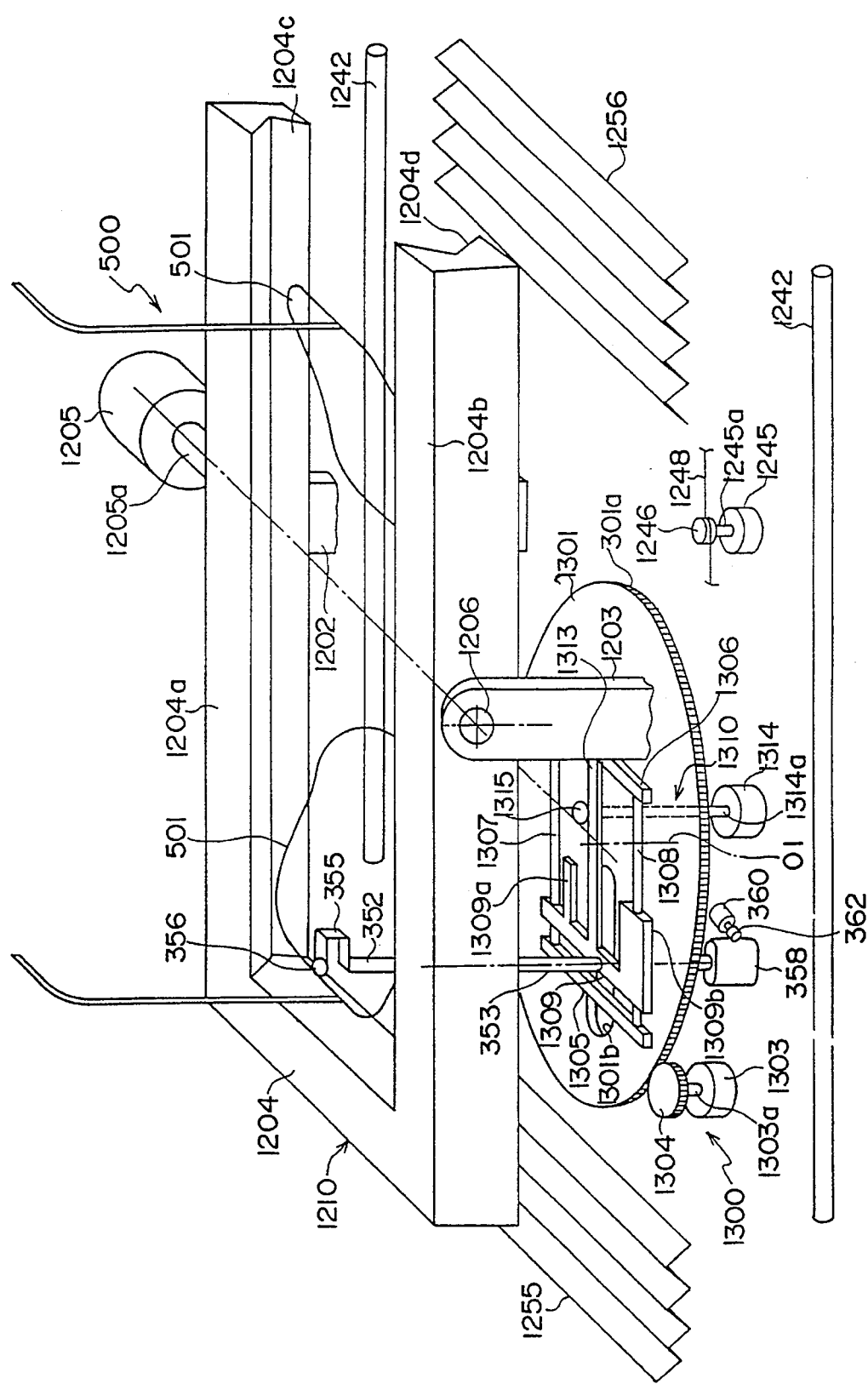
Figure 30A:
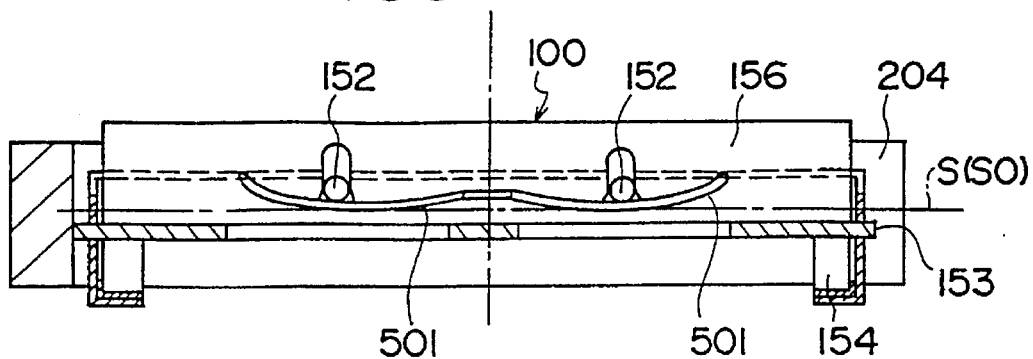
Figure 30B:
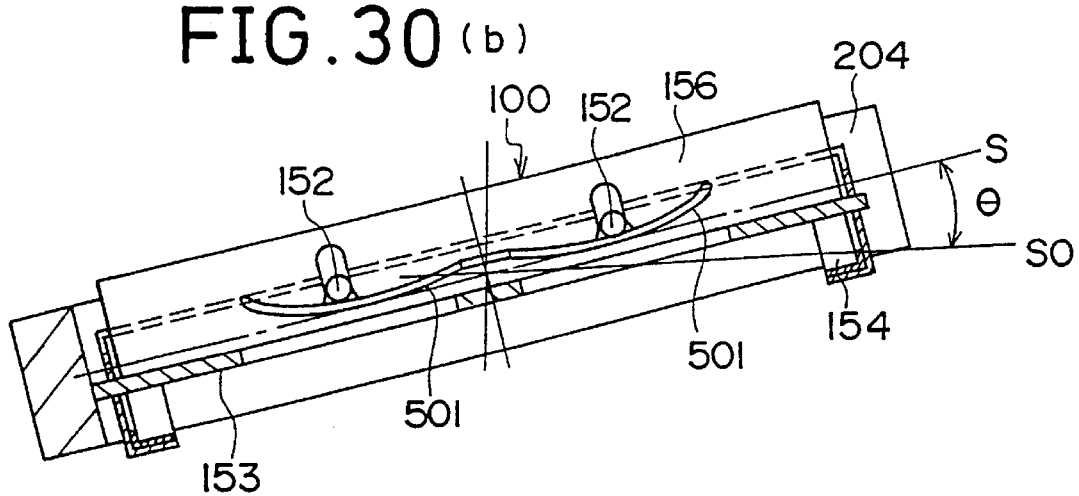
Figure 31:
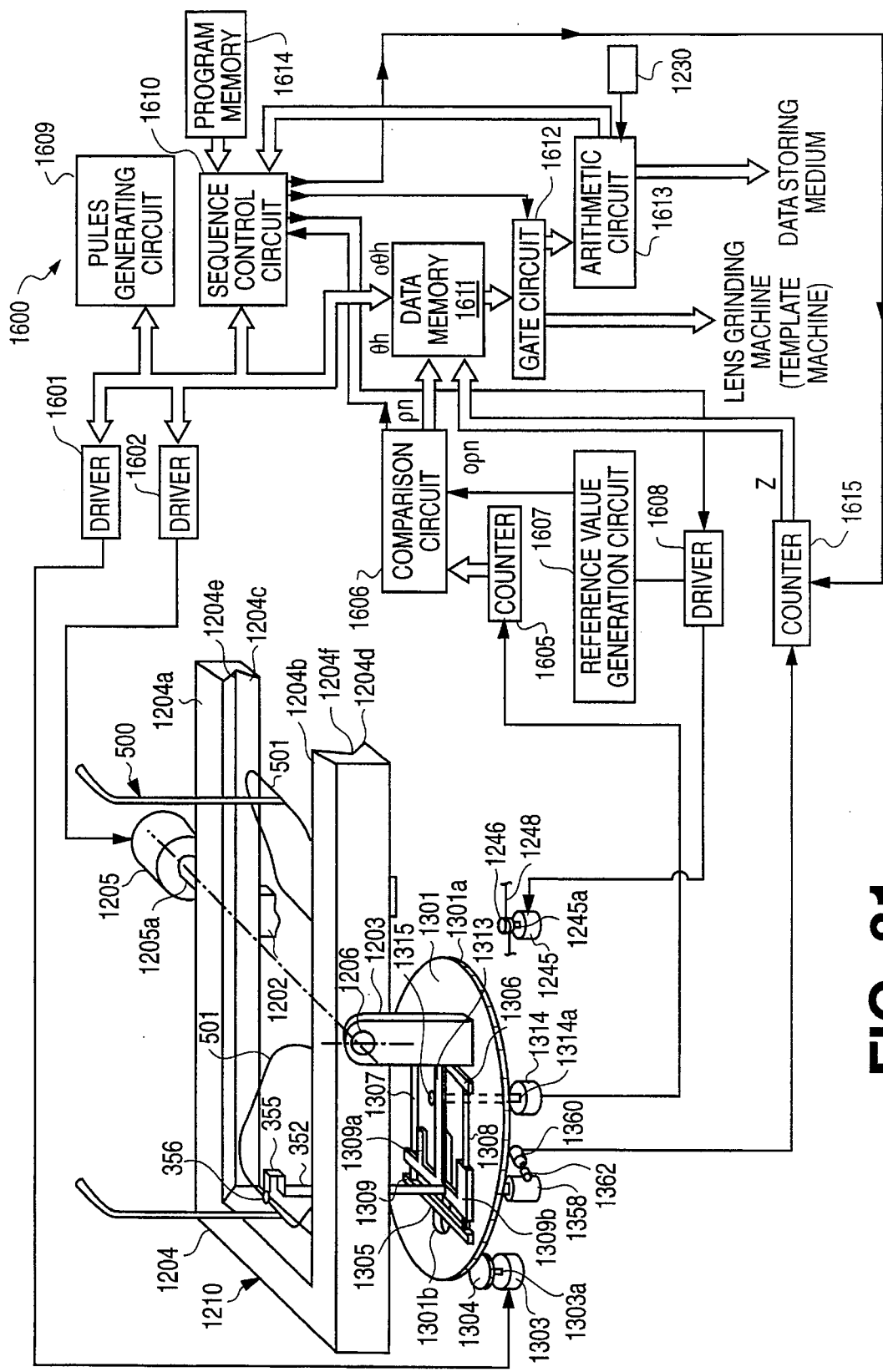
Figure 32:
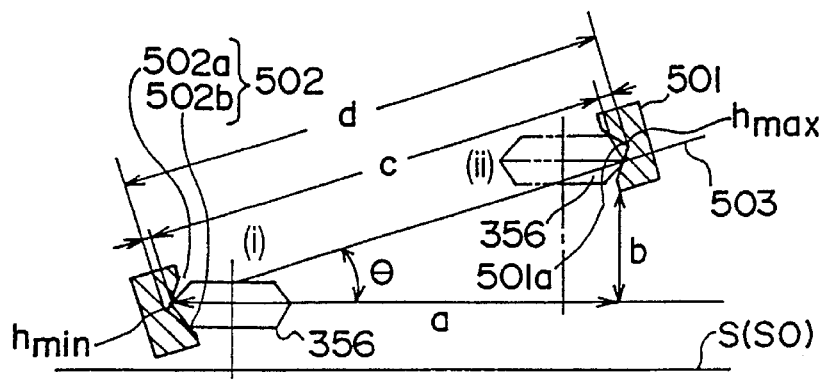
Figure 33:
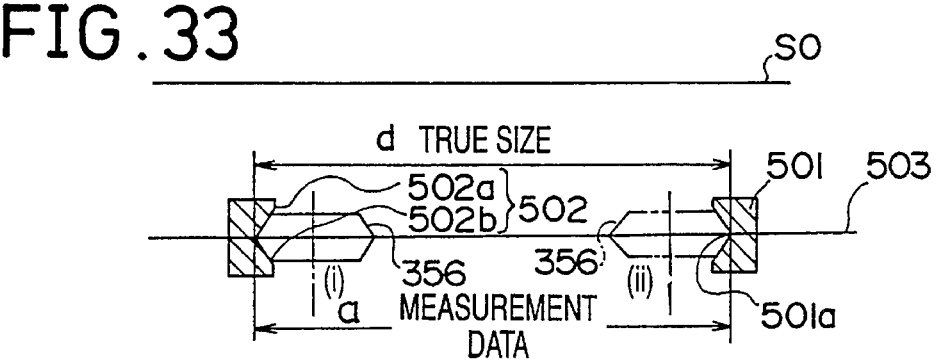
Figure 34:
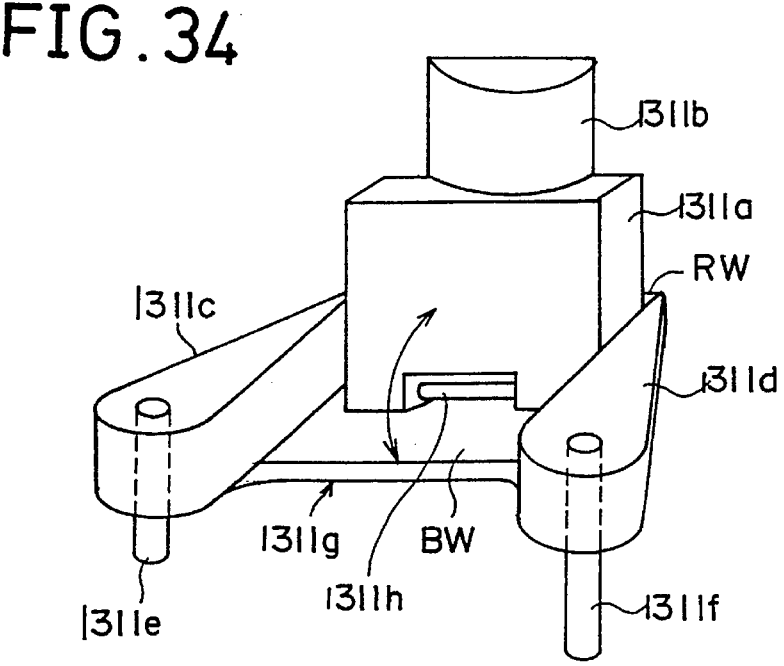
Figure 35:
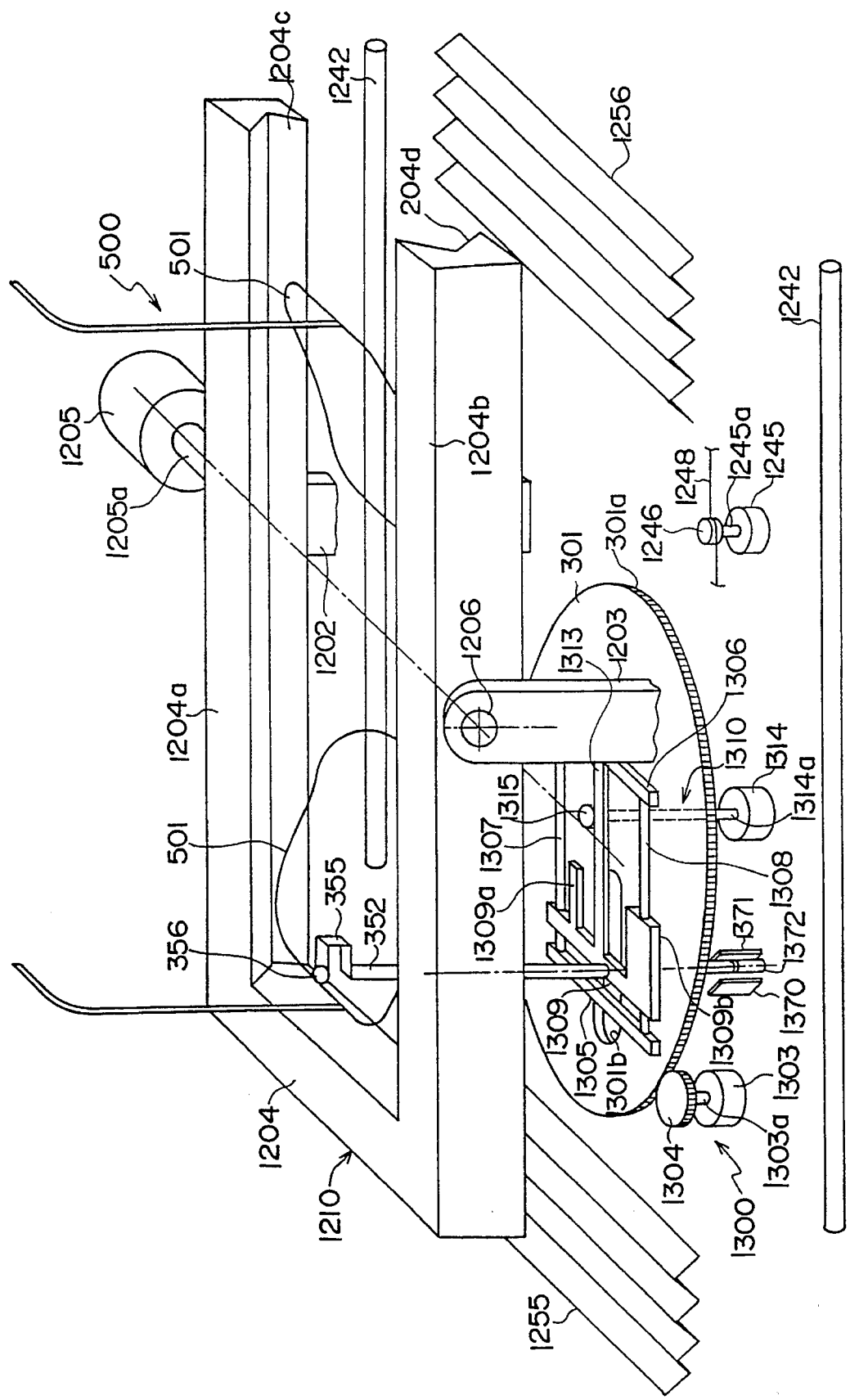
Figure 37A:
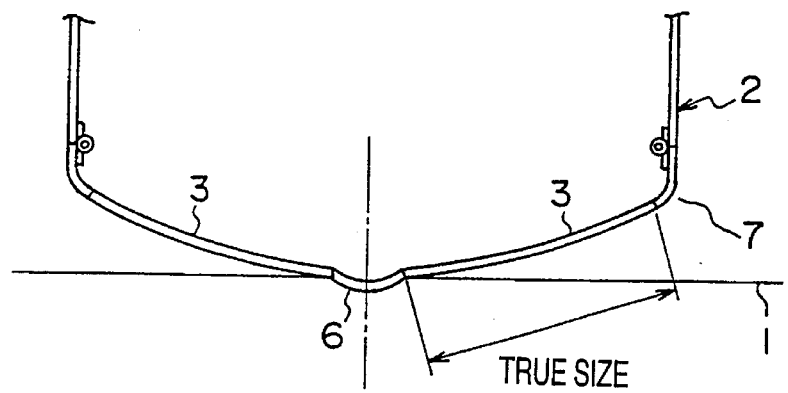
Figure 37B:
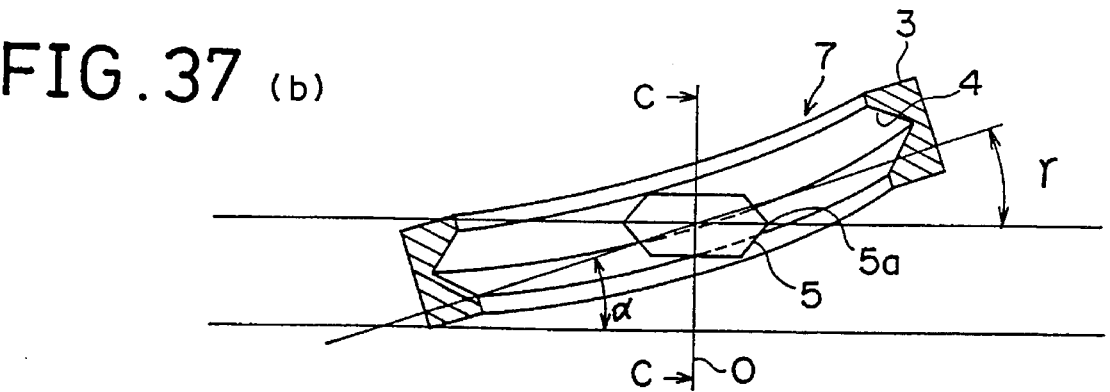
Figure 37C:
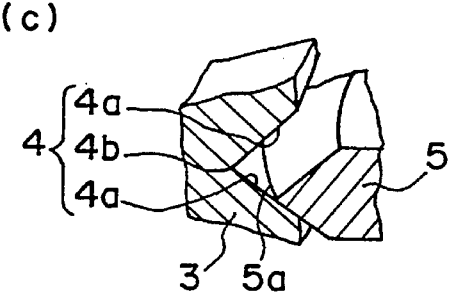
Figure 38:
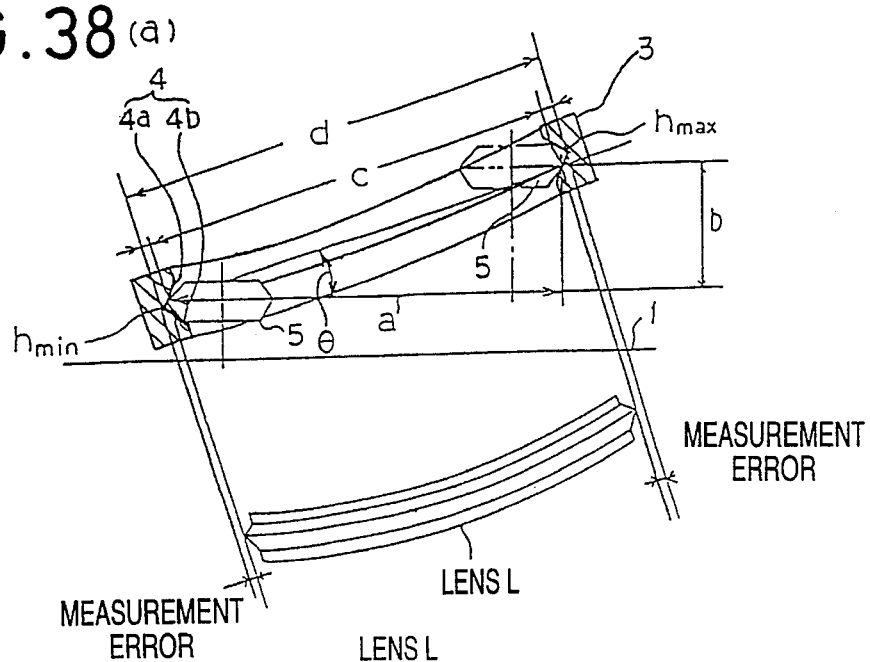
Figure 38:
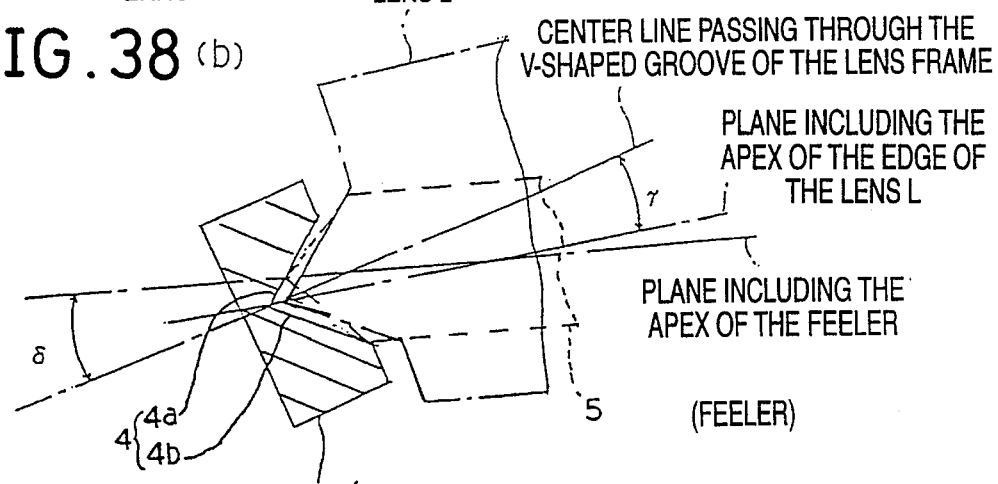
Figure 38:
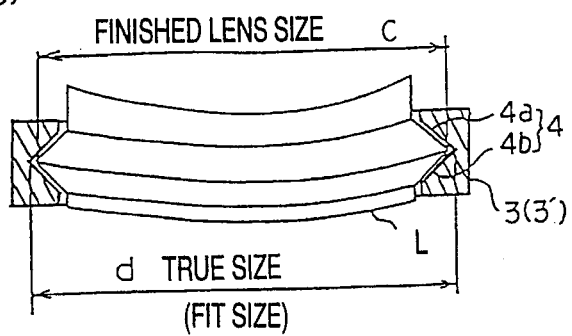

FIGS. 19(A) and 19(B) are diagrammatical views for calculating a curve value C of the lens frame;

FIG. 20(a) is an explanatory view showing the operation of the measuring element by the lens frame configuration apparatus, and FIG. 20(b) is a sectional view taken on line B—B of FIG. 20(a);

FIG. 21 is an explanatory view showing a relation between the height hmin of the nose contact piece side (left-hand) side as viewed in FIG. 21) and the height hmax of the ear hanger (temple) as a result of a provisional measurement of the lens frame made by the lens frame configuration measuring apparatus, and the lens which has been ground based on lens frame configuration data obtained at that time;

FIG. 22 is an explanatory view showing a relation between the lens frame and a lens which has been ground based on lens frame configuration data correctly measured by the apparatus shown in FIGS. 1 to 16;

FIGS. 23(a) and 23(b) are explanatory views showing a lens frame configuration being measured in accordance with the flowchart shown in FIG. 17;

FIG. 24(a) is an explanatory view for measuring a distance between the nose contact pieces, and FIG. 24(b) is an explanatory view showing a range of movement of the measuring element in FIGS. 23 and 24(a);

FIG. 25 is a perspective view of an important portion showing a second embodiment of a lens frame configuration measuring apparatus according to the present invention;

FIG. 26 is a schematic perspective view showing a third embodiment of a lens frame configuration measuring apparatus according to the present invention;

FIG. 27 is a perspective view of the lens frame configuration measuring apparatus of FIG. 26 but from which the holding frame is already removed;

FIG. 28(a) is an explanatory view of a part of the interior of the case of the apparatus body shown in FIG. 26, and FIG. 28(b) is a partial sectional view for explaining a state in which a measuring head portion for measuring a lens configuration of a rimless frame into a mounting hole shown in FIG. 28(a);

FIG. 29 is an explanatory view of an important portion, partly omitted, of the lens frame configuration measuring apparatus shown in FIGS. 26 and 27;

FIGS. 30 (a), 30(b) and 30(c) are explanatory views showing the operation for controllably inclining a frame holding device holding an eyeglass frame;

FIG. 31 is a control circuit for the lens frame configuration measuring apparatus;

FIG. 32 is an explanatory view for measuring the inclination of the lens frame with a measuring element (V-edge feeler) using the frame configuration measuring apparatus shown in FIGS. 26 to 31;

FIG. 33 is an explanatory view showing a relation between the measuring element (V-edge feeler) and the lens frame after the inclination of the lens frame has been altered;

FIG. 34 is a perspective view of an important portion showing another example of a measuring head portion of a lens frame configuration measuring apparatus;

FIG. 35 is a perspective view of an important portion showing another example of a lens frame configuration measuring apparatus;

FIG. 36(a) is an explanatory view of the scale shown in FIG. 35, and FIGS. 36(b) to 36(d) are explanatory views showing other examples of the scale;

FIG. 37(a) is an explanatory view of the conventional measurement of a lens frame configuration, FIG. 37(b) is an enlarged explanatory view of an important portion of FIG. 37(a), and FIG. 37(c) is a sectional view taken on line C—C of FIG. 37(b); and FIG. 38(a) is an explanatory view showing one example of a relation between a measuring element and a V-shaped groove of a conventional lens frame configuration measuring apparatus, FIG. 38(b) is an enlarged view of an important portion of FIG. 38(a), and FIG. 38(c) is an explanatory view showing a relation between a lens ground based on the lens frame configuration data measured by the conventional lens frame configuration measuring apparatus and the lens frame.

DESCRIPTION OF THE PREFERRED EMBODIMENTS

Embodiments of the present invention will now be described with reference to the accompanying drawings.

FIRST EMBODIMENT

Construction

Figure 1:
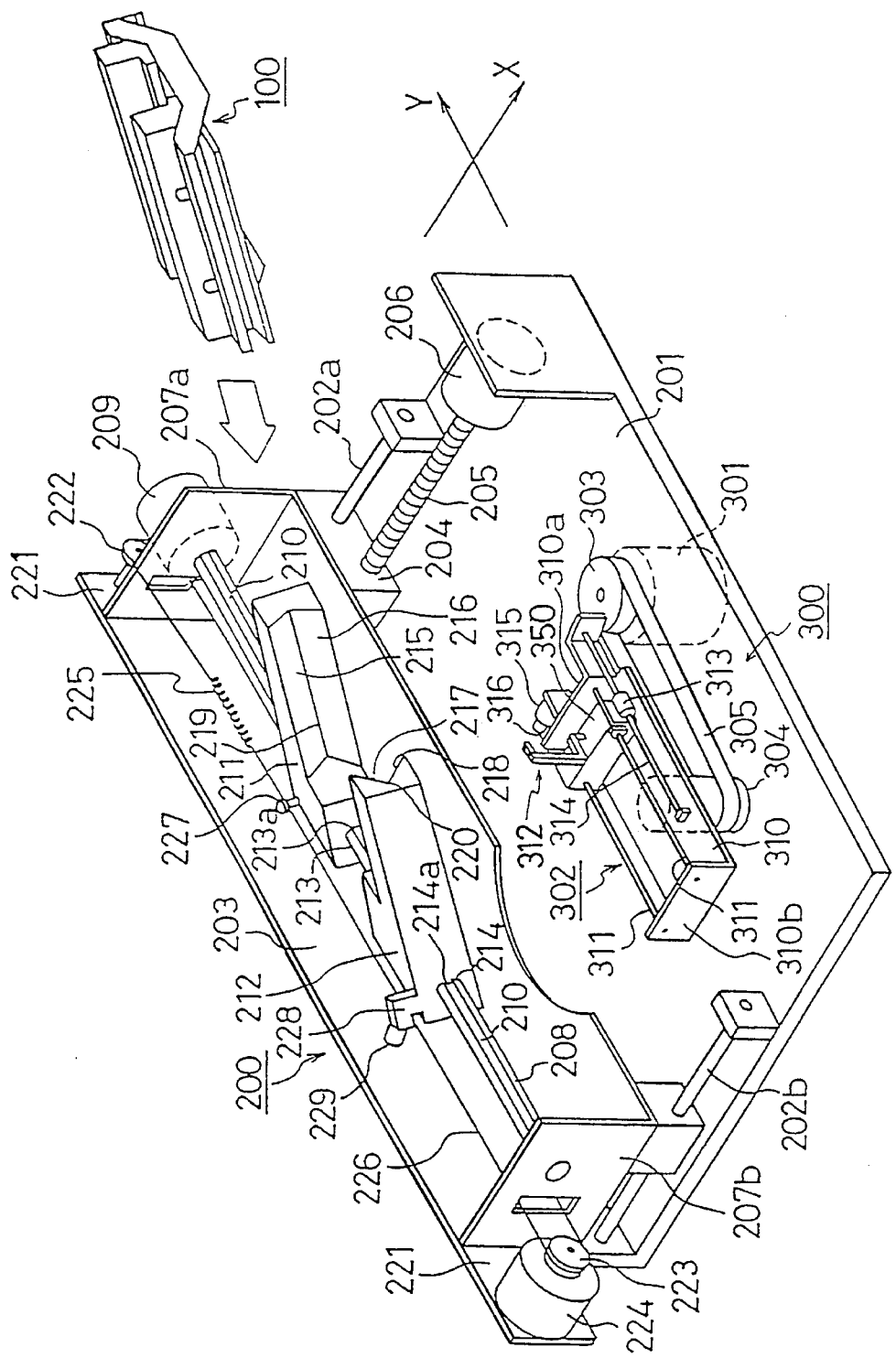
FIG. 1 is a perspective view showing an apparatus for measuring a lens frame configuration according to the present invention.

FIG. 1 is a perspective view showing a lens frame configuration measuring apparatus according to the present invention. The frame measuring apparatus according to the present invention constitutes three major parts. One part is a frame holder (frame holding means) 100 for simultaneously holding right and left frames of an eyeglass frame. Another part is a supporting device 200 (apparatus body) for supporting and moving the frame holder 100 into a measuring plane within which the frame holder 100 is further adjusted by the device 200. Still another part is a measuring portion 300 for digitally measuring the configuration of the lens frame or the configuration of a template of the lens frame.

Frame Holder 100

As shown in FIGS. 2 to 5, the frame holder has a fixed base 150 and flanges 151, 151 provided with sides 151a, 151a formed on both sides of the fixed base 150. A pair of frame holding bars 152, 152 are each secured to the flanges 151, 151 by means of a screw at an interval in a longitudinal direction. The pair of bars 152, 152 are placed on the same axis and opposite to each other with a space therebetween.

A movable base 153 having sides 153a, 153a is inserted between a bottom plate 150a of the fixed base 150 and the flanges 151. The movable base 153 is supported by two leaf springs 154, 154 mounted on the bottom plate 150a of the fixed base 150.

Two parallel guide grooves 155, 155 are formed in the movable base 153. Projections 156a, 156a of sliders 156. 156 are engaged in the guide grooves 155, 155 such that the sliders 156, 156 can slide on the movable base 153.

Circular openings 157, 157 are formed in longitudinal sides of the movable base 153, and each of rings 158, 158 is rotatably fitted in the periphery of each of the openings 157, 157. Two pins 159, 159 are mounted on the upper surfaces of the rings 158, 158, respectively. The pins 159, 159 are inserted into slots 156c, 156c formed in stepped portions 156b, 156b (holding surfaces) of the sliders 156, 156, respectively.

Further, hollows 156d, 156d through which the frame holding bars 152, 152 are inserted are formed in the sliders 156, 156. Holes 156e, 156e are formed in the upper surface of the sliders 156, 156, respectively in order to help an operator to move the sliders with the operator's fingers in the holes.

Supporting Device 200

Referring again to FIG. 1, a casing 201 of the supporting device 200 has guide rails 202a, 202b which are disposed on the casing 201 in parallel relation with each other in the direction of the X-axis of a measurement coordinate system. A movable stage 203 is slidably mounted on the guide rails 202a, 202b. A female screw portion 204 into which an X-axis feed screw 205 is screwed is formed under the movable stage 203. The X-axis feed screw 205 is turned by an X-axis motor 206 consisting of a pulse motor.

A guide shaft 208 is stretched between flanges 207a, 207b of the movable stage 203 in parallel with the Y-axis of the measurement coordinate system. The guide shaft 208 can be rotated by a guide shaft motor 209 mounted on the flange 207a. A guide groove 210 is formed on the guide shaft 208 in parallel with the shaft 208. A measuring surface SO is defined by a horizontal plane including the center line of the guide shaft 208.

Hands 211, 212 are supported by the guide shaft 208 and slid in the longitudinal direction. Projections 213a and 214a are formed on the inner surface of bores 213, 214 of the hands 211, 212, respectively. The projections 213a, 214a are engaged with the guide groove 210 of the guide shaft 208, thereby preventing the hands 211, 212 from rotating about the guide shaft 208.

Figure 6:
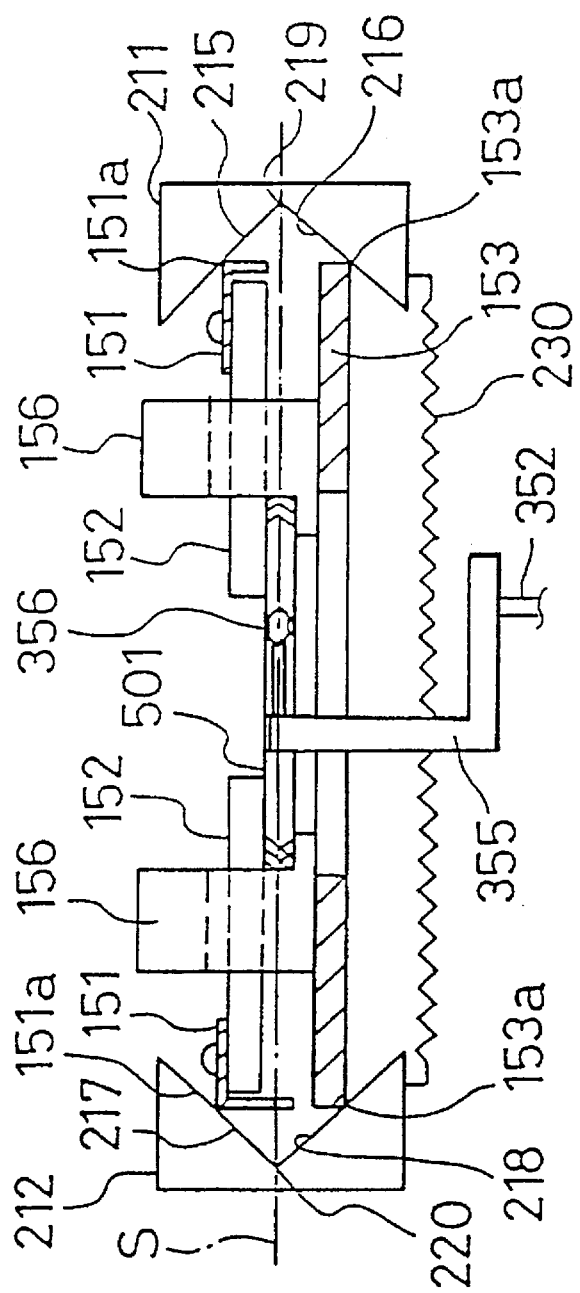
FIG. 6 is a sectional view showing a relation between a supporting apparatus section and a measuring element.

The hand 211 has two inclined surfaces 215, 216 crossing each other, and likewise, the hand 212 has two inclined surfaces 217, 218 crossing each other. An edge 220 common to the inclined surfaces 217, 218 is in parallel with and in the same plane as an edge 219 common to the inclined surfaces 215, 216. Further, an angle formed by the inclined surfaces 217, 218 is equal to that formed by the inclined surfaces 215, 216. As shown in FIG. 6, a spring 230 is stretched between the hands 211, 212. A reference plane S of the frame holder 100 (frame holding means, namely, frame holding device) is defined by a plane including the edges 219 and 220.

Figure 7:
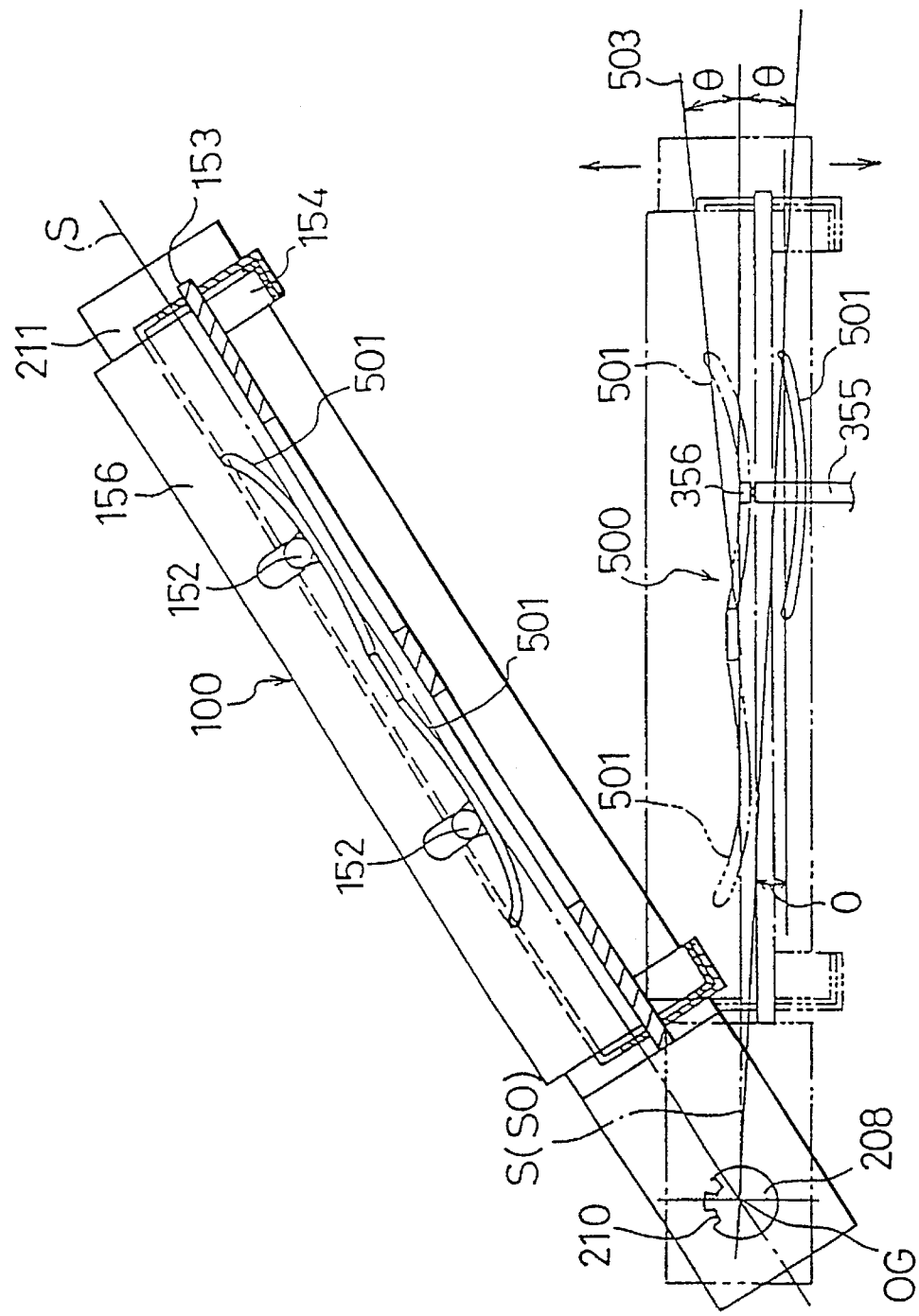
FIG. 7 is a schematic view showing the operation of the supporting apparatus section.

According to the above arrangement, the frame holder 100 is set between the hands 211, 212 and then the guide shaft 208 is rotated by the guide shaft motor 209, so that the hands 211, 212 and the frame holder 100 are inclined upward and downward with reference to the reference measuring surface SO, as shown in FIG. 7.

A pulley 222 is rotatably supported by one end of a back flange 221 of the movable stage 203, and a Y-axis motor 224 having a pulley 223 is mounted on the other end of the back flange 221. A miniature belt 226 one part of which is a spring 225 is laid between the pulleys 223, 224. Each end of the miniature belt 226 are secured to a pin 227 perpendicularly provided on the upper surface of the hand 211.

On the other hand, a flange 228 is formed on the upper surface of the hand 212, and according to the movement of the hand 212, the flange 228 is brought into contact with an end of a pin 229 projecting from the back flange 221 of the movable stage 203.

Measuring Portion 300

The measuring portion 300 as a measuring means includes a sensor-arm rotating motor 301, a sensor arm section 302, a pulley 303, a rotating shaft 304 of the sensor arm section 302, and a belt 305. The sensor-arm rotating motor 301 is mounted on the backside of the casing 201. The sensor arm section 302 is rotatably supported on the upper surface of the casing 201. The pulley 303 is mounted on the rotating shaft of the motor 301. The belt 305 is stretched between the pulley 303 and a rotating shaft 304 of the sensor arm section 302, thereby transmitting the rotation of the motor 301 to the sensor arm section 302.

The sensor arm section 302 is constituted of a base 310, two rails 311, 311, a sensor head section 312 (measuring head section), a magnetic scale read head 313, a magnetic scale 314, and a spring device 315. The base 310 has erect plates 310a, 310b at each short side end of the base 310. The rails 311, 311 are stretched between the plates 310a, 310b and in parallel with each other. The sensor head section 312 is laid on the rails 311, 311 slidably in the longitudinal direction. The magnetic scale read head 313 is mounted on one side of the sensor head section 312. The magnetic scale 314 is disposed on the base 310 in parallel with the rails 311, 311. The spring device 315 constantly pulls the sensor head section 312 toward one side of the end of the arm section 302. The magnetic scale read head 313 reads the magnetic scale 314 to detect the amount of movement of the sensor head section 312.

Figure 8:
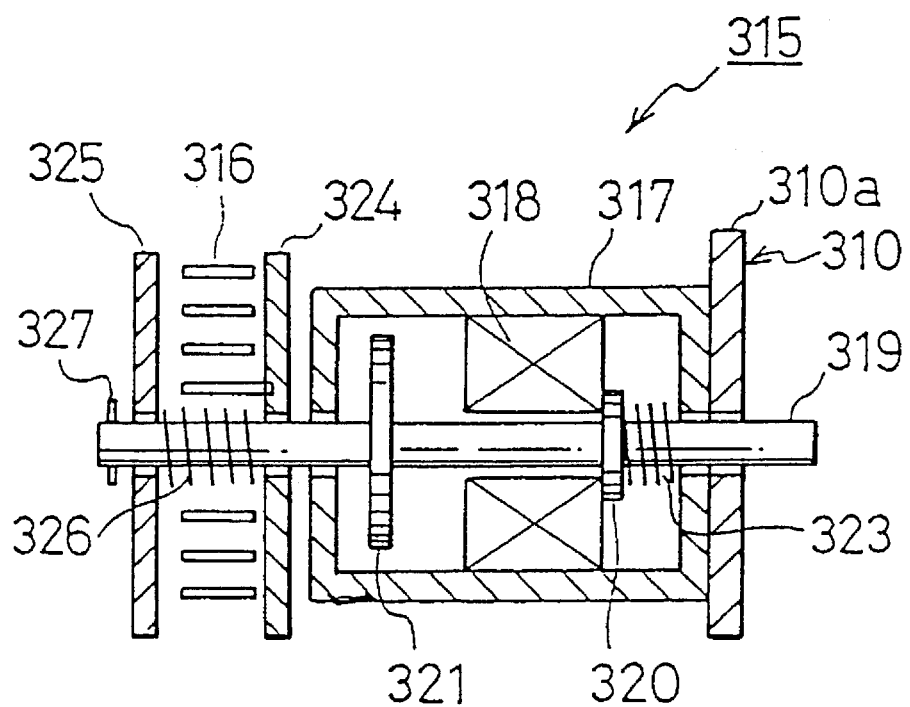
FIG. 8 is a sectional view of a spring member.

As shown in FIG. 8, the spring device 315 includes a casing 317, an electromagnet 318, and a slide shaft 319. The casing 317 is mounted on the plate 310a of the base 310. The electromagnet 318 is disposed within the casing 317. The slide shaft 319 is inserted into the axis bore of the electromagnet 318 slidably in the direction of the axis of the shaft 319. The slide shaft 319 extends in the direction perpendicular to the rail 311.

This slide shaft 319 has flanges 320, 321, and a tension spring 323 is fitted on a part of the shaft 319 which is defined between the flange 320 and the inner wall of the casing 317, so that the slide shaft 319 is constantly pushed leftward. Clutch plates 324, 325 are rotatably supported by the other end of the slide shaft 319. A flat spiral spring 316 enclosing a part of the shaft 319 is disposed between clutch plates 324, 325.

One end of the flat spiral spring 316 is secured to the clutch plate 324, whereas the other end thereof is secured to the sensor head section 312 so as to push the section 312 toward the plate 310a.

A compression spring 326 is fitted on the part of the slide shaft 319 between the clutch plates 324, 325, so that the clutch plates 324, 325 are constantly spaced apart so as to prevent the flat spiral spring 318 from coming in contact with the clutch plate 325. In addition, a washer 327 is mounted on the end of the slide shaft 319.

Sensor Head Section (Measuring Head Section)

Figure 9:
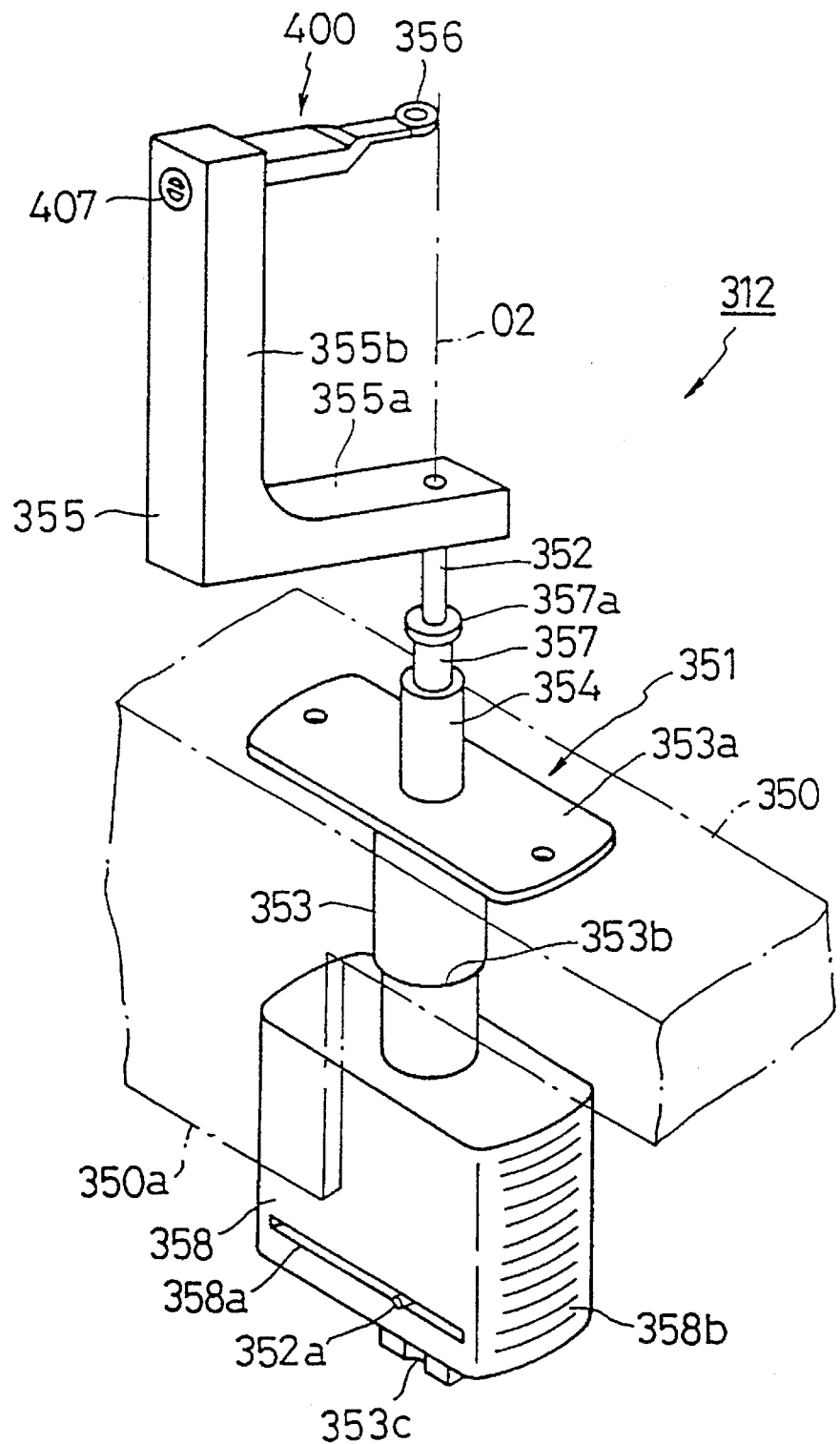
FIG. 9 is a perspective view showing an outer appearance of a measuring element axis holding member.

Referring now to FIG. 9, the sensor head section 312 has a slider 350 supported by the rail 311 movably in the longitudinal direction, a measuring element holding member 351 held by the slider 350, and a measuring element support shaft 352 supported by the member 351 such that the shaft 352 can move upward and downward and is rotatable.

Figure 10:
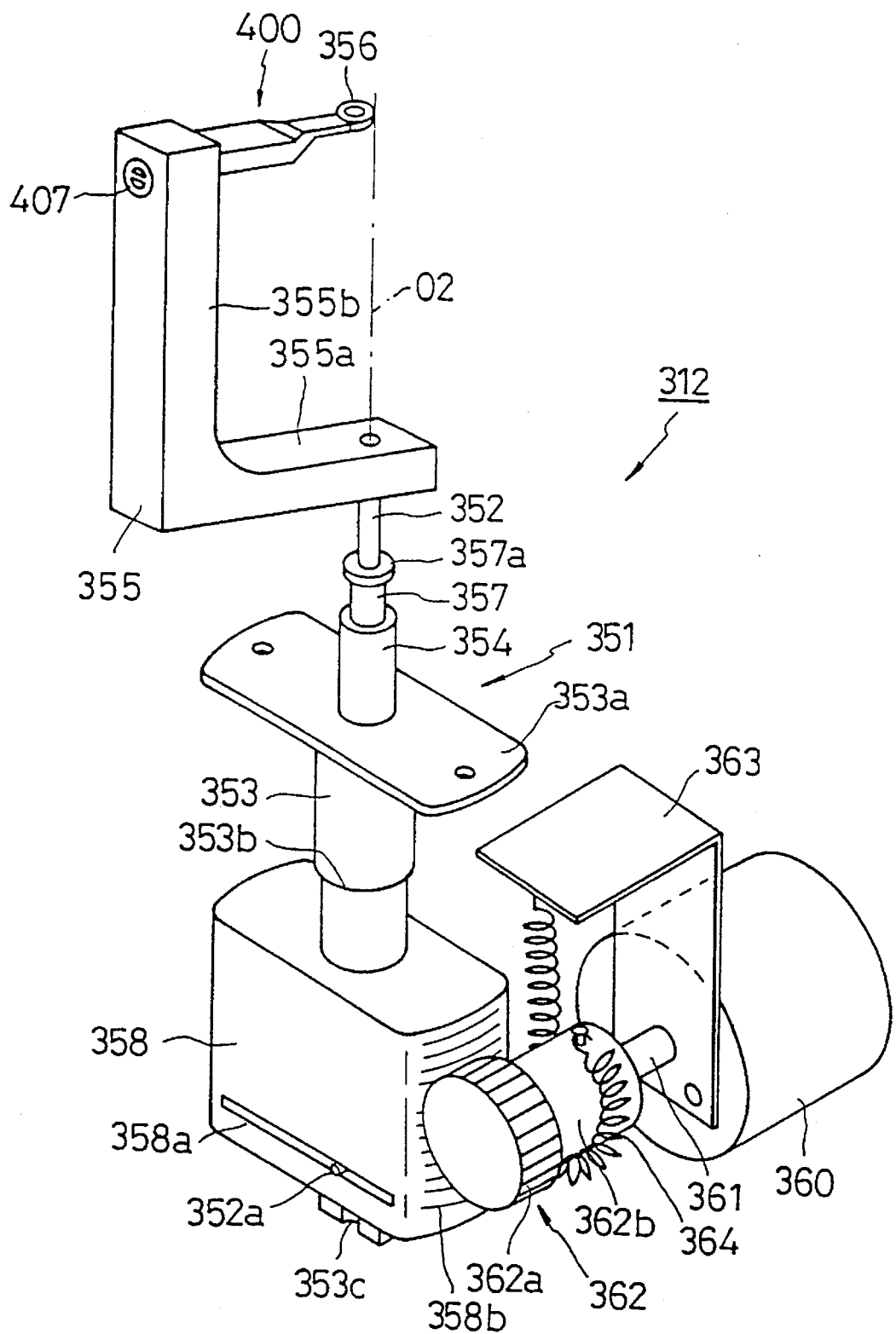
FIG. 10 is a perspective view of an important portion showing an outer appearance of an up and down movement measuring apparatus.

As shown in FIGS. 9 to 11, the measuring element holding member 351 is constituted of a hollow fixed sleeve member 353 secured to the slider 350, a sleeve-like collar 354 secured to the inner peripheral surface of the fixed sleeve member 353, a slide sleeve body 357, and a rack member 358 (upward and downward operative connection member) into which a lower end of the fixed sleeve member 353 is pierced. The slide sleeve body 357 is located between the inner perpheral surface of the sleeve-like collar 354 and the outer peripheral surface of the measuring element shaft 352 and permits upward and downward movement and rotational movement of the measuring element shaft 352 in unison with the measuring element 356 which is mounted on an upper end of the measuring element shaft 352 through an arm 355 and a measuring element connecting member 400.

The fixed sleeve member 353 is provided with a flange 353a for securing the member 353 to the upper surface of the slider 350 with fixing means such as screws, not shown. A stepped portion 353b serving as a stopper is formed on the outer peripheral surface of the fixed sleeve member 353 so as to prohibit the rack member 358 from moving upward (as later described). A lower part of the fixed sleeve member 353 is half split. A groove 353c is formed in a lower part of the fixed sleeve member 353, the lower part being lower than a middle part of the half-split portion. The groove 353c directly supports a lower portion of the measuring element shaft 352 such that the measuring element 352 can slide.

As shown in FIG. 11 (b), a plurality of ball bearings 359, 359, . . . are held by the slide sleeve body 357 astride the outer peripheral surface of the measuring element shaft 352 and the inner peripheral surface of the sleeve-like collar 354. Owing to this arrangement, the measuring element shaft 352 can rotate smoothly about the vertical axis and move smoothly in the vertical axis, and in addition, the upward and downward displacement amount of the measuring element shaft 352 is twice the upward and downward displacement amount of the slide sleeve body 357. Annular flanges 357a, 357b are formed on each upper and lower ends of the slide sleeve body 357. As shown in FIG. 11(c), the flanges 357a, 357b contact respectively the arm 355 and the fixed sleeve member 353 so that the flanges 357a, 357b act as stoppers at the lower dead point of the measuring element shaft 352.

The rack member 358 is located on the same axis as the fixed sleeve member 353, with the outer wall of the rack member 358 supported by a pair of flanges 350a (only one of the flanges 350 is shown. The flange 350a permits an upward and downward movement of the rack member 358 and restricts the rotation of the rack member 358. A slit 358a is formed in the rack member 358 opening up at the outer wall of the member 358. A pin 352a projecting from a lower end of the measuring element shaft 352 is inserted into the slit 358a, so that the rack member 358 is moved upward and downward in response to the upward and downward movement of the shaft 352. Further, a slit 358a is formed on the other outer wall of the rack member 358.

As shown in FIG. 10, a pinion 362a of a pinion member 362 meshes with the rack 358b. The pinion member 362 is secured to a rotating shaft 361 of an encoder (displacement amount measuring means) secured to the slider 350 so as to follow the displacement of the measuring element member 351 within a horizontal plane of the member 351. The rack member 358 and the encoder 360 including the pinion member 362 constitute an upward and downward movement measuring means.

One end of a coil spring 364 is fixedly wound on a fixed section 362b of the pinion member 362, whereas the other end thereof is secured to one end of a bracket 363 whose other end is secured to the encoder 360.

The coil spring 364 is set so as to offset the load based on the total amount of the various members from the measuring element 356 to the rack member 358, namely in a direction lifting up the various members (though actually those members are not lifted up), so that the measuring element 356 is not prevented from moving upward and downward by the total weight of those members. Since the coil spring 364 is fixedly wound on the fixed section 362b, the biasing force of the spring 364 is maintained generally constant. The bracket 363 may be eliminated and one end of the coil spring 364, which would otherwise be secured to the bracket 363, may be secured to the slider 350.

Figure 12:
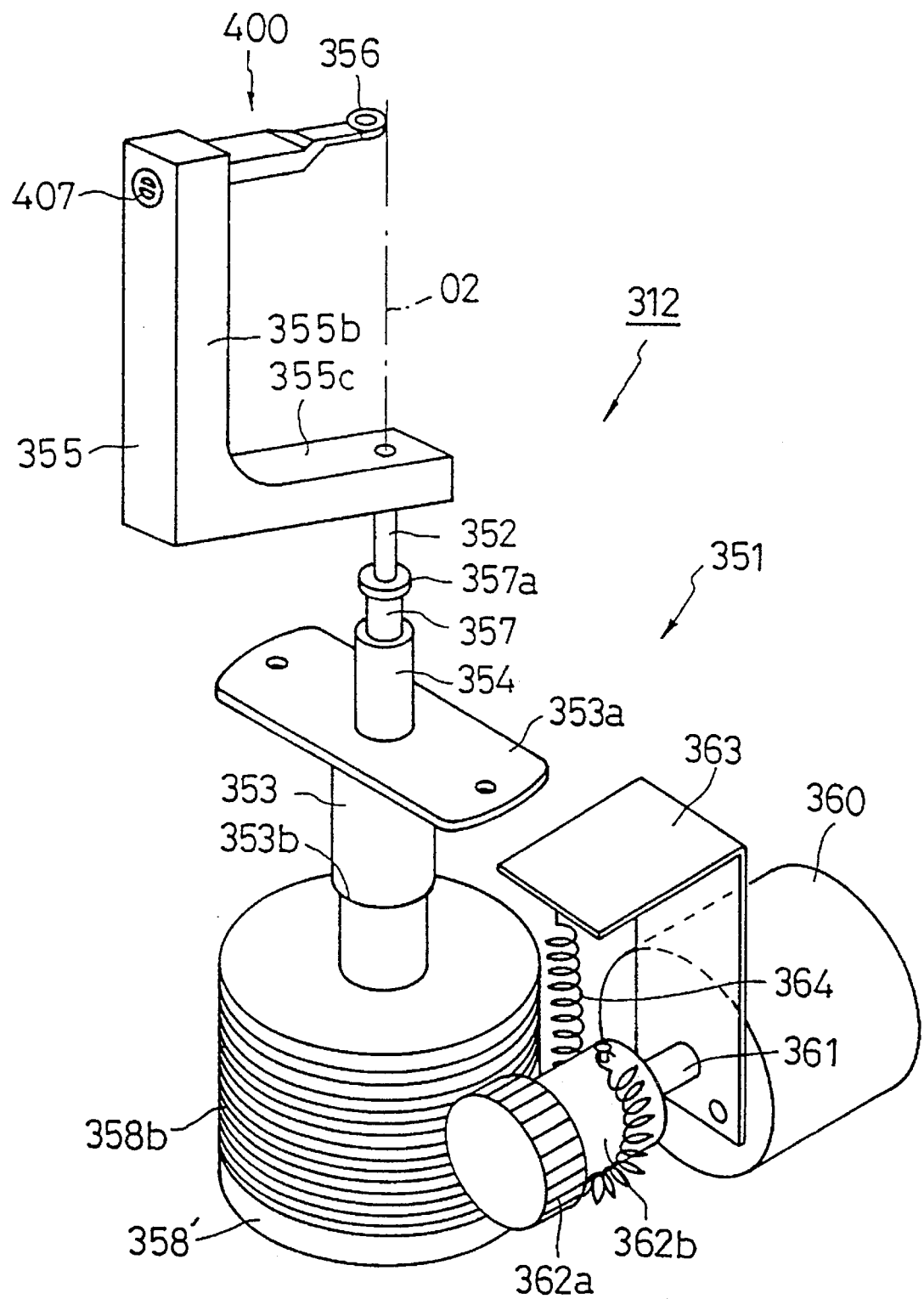
FIG. 12 is a perspective view of an important portion showing a modified example of a measuring element axis holding member.

As shown in FIG. 12, the rack member 358 may be a rack member 358' having a cylindrical configuration. In this case, a slit and a flange corresponding respectively to the slits 358a of the rack member 358 and the flange 350a of the slider 350 may be eliminated. The rack member 358' may be moved upward and downward in response to the upward and downward movement of the measuring element shaft 352.

Accordingly, the rack 358b formed in the wall surface of the rack member 358' is formed over the entire outer peripheral surface of the rack member 358'. In FIG. 12, the same numerals are given to constituent members corresponding to those in FIGS. 9 to 11, respectively, and description thereof is omitted.

An L-shaped arm 355 consists of a horizontal arm part 352a one end of which is secured to a measuring element shaft 352, and a vertical arm part integrally connected to the other end of the horizontal arm part 335a.

Figure 13:
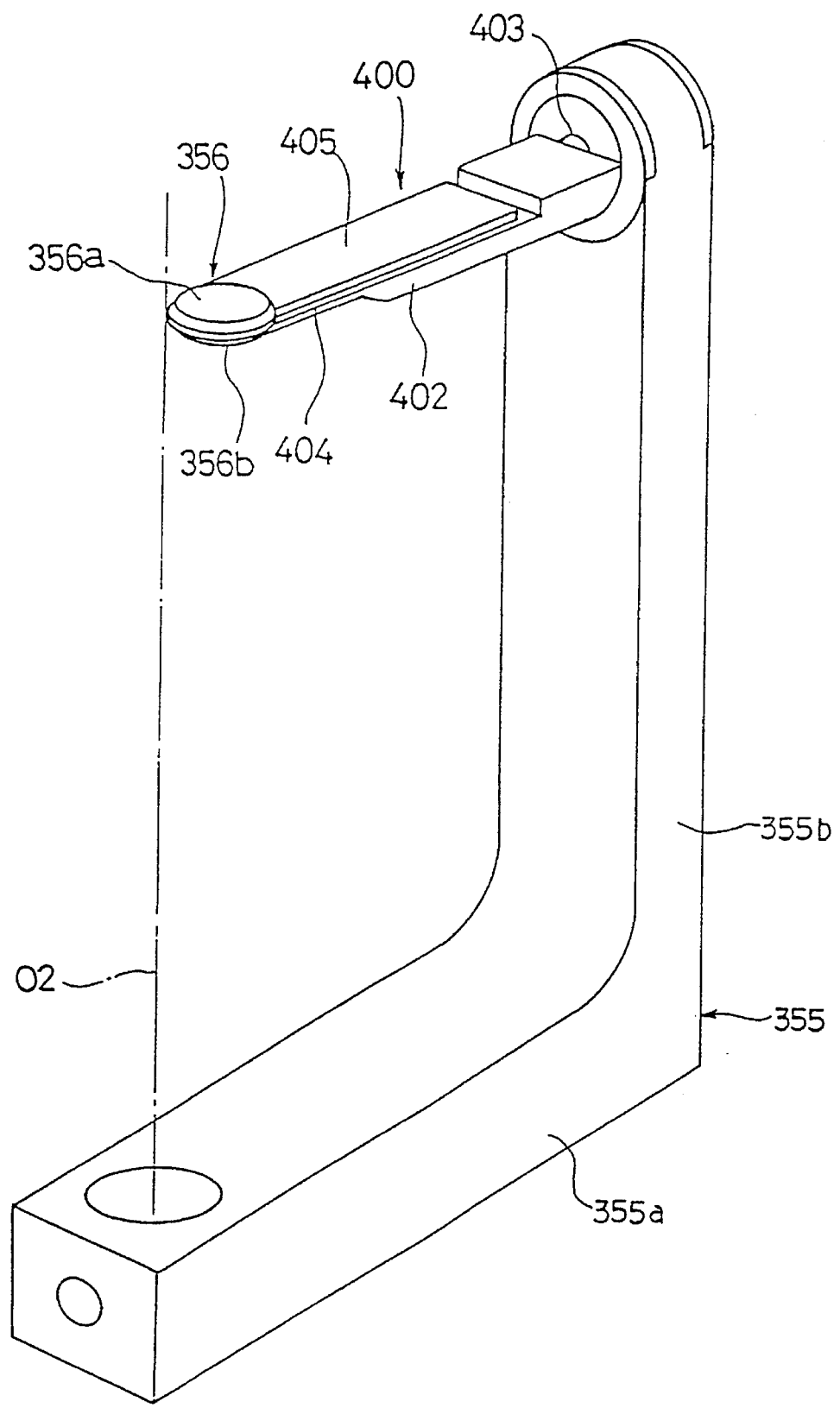
FIG. 13 is a perspective view of a measuring element mounting portion.
Figure 14:
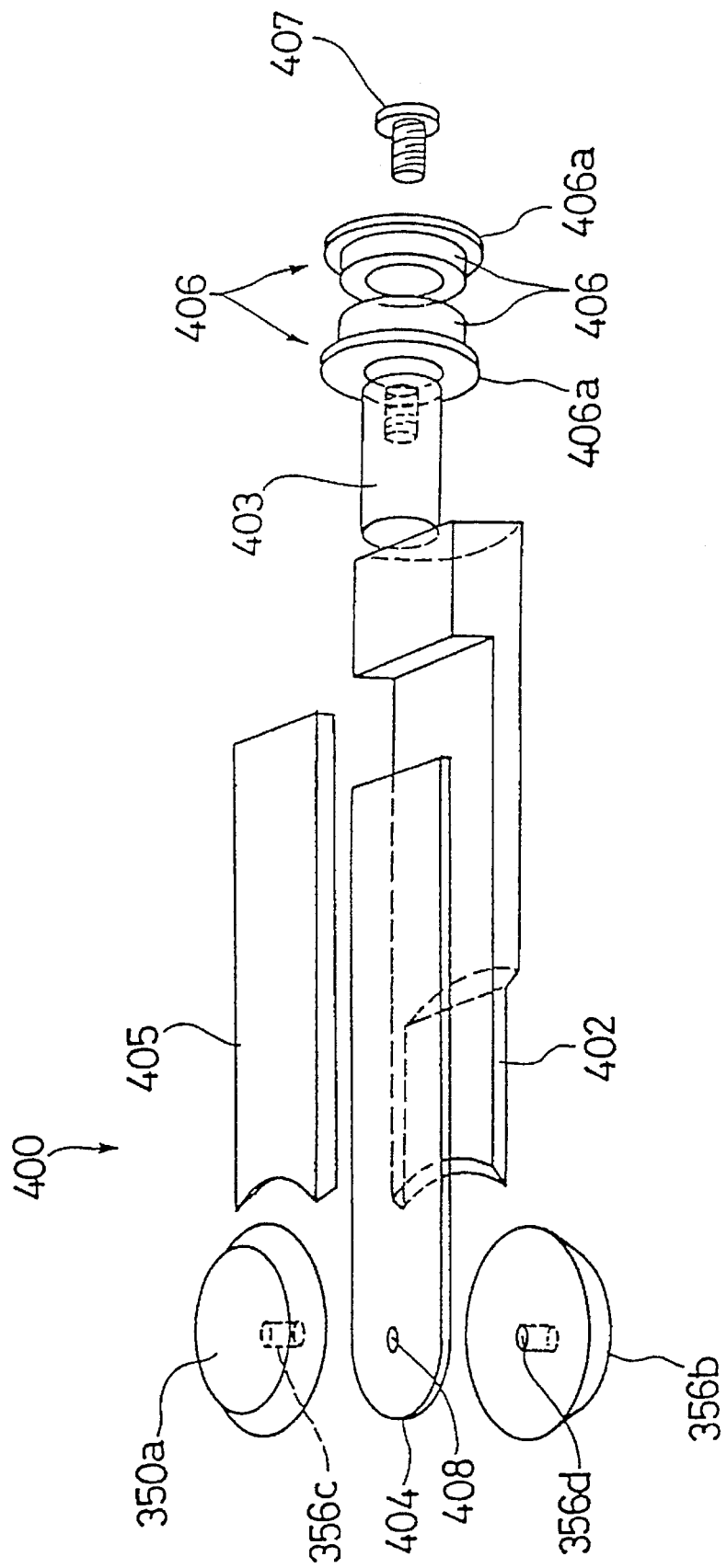
FIG. 14 is an exploded perspective view of the measuring element holding member and the measuring element.
Figure 15:
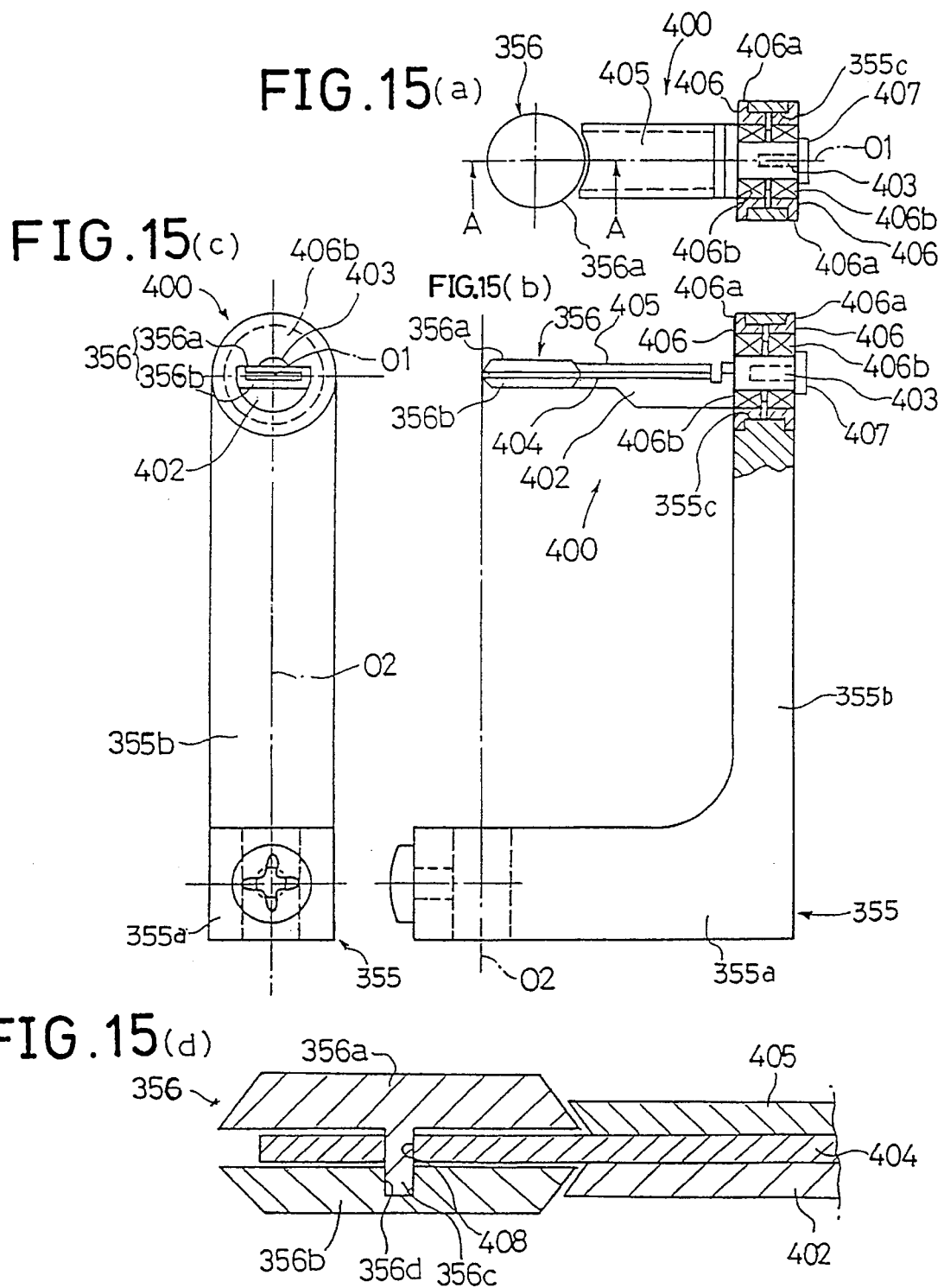
FIG. 15(a) is a partly cut-away plan view of the measuring element mounting portion.
FIG. 15(b) is a partly cut-away side view of the measuring element mounting portion.
FIG. 15(c) is a front view of the measuring element mounting portion.
FIG. 15(d) is an enlarged sectional view of an important portion of the measuring element mounting portion taken on line A—A of FIG. 15(a)

As shown in FIGS. 13 to 15, a measuring element connecting member 400 is constituted of a plate member 402 extending the same direction as the horizontal arm part 355a, a rotating shaft 403 integral with a basal end of the plate member 402, a spring plate 404 fastened to the surface of the plate member 402, and a presser plate 405 fastened to the surface of the spring plate 404.

As shown in FIGS. 15(a) and 15(b), a mounting hole 335c is formed in the upper end of the vertical arm part 355b. Ring-shaped bearings 406. 406 having flanges 406a, 406a are fitted in the mounting hole 335c.

The rotating shaft 403 is fitted between the bearings 406, 406, and a securing screw 407 is inserted into the rotating shaft 403. Rotating parts 406b, 406b of the bearings 406, 406 are maintained between the securing screw 407 and the end of the plate member 402. The axis 01 of the rotating shaft 402 is parallel with the reference surface SO and is perpendicular to the axis 02 of the measuring element shaft 352.

The measuring element 356 consists of measuring element members 356a, 356b each trapezoid shaped in section and disposed with the end part of the spring plate 404 therebetween. A mounting shaft 356c is formed at the center of the measuring element member 356a, and a mounting hole 356d is formed at the center of the measuring element member 356b. As shown in FIGS. 14 and 15(d), a mounting hole 408 is formed in the end part of the spring plate 404.

The mounting shaft 356c passes through the hole 408 of the spring 404 and is fitted in the mounting hole 356d of the measuring element member 356b by slight pressure.

As a consequence, the measuring element members 356a, 356b, namely the measuring element 356 is rotatably held by the end part of the spring plate 404. The apex of the measuring element 356 exists on the axis line (center line) 02 of the measuring element shaft 352.

Arithmetic and Control Circuit 600

Figure 16:
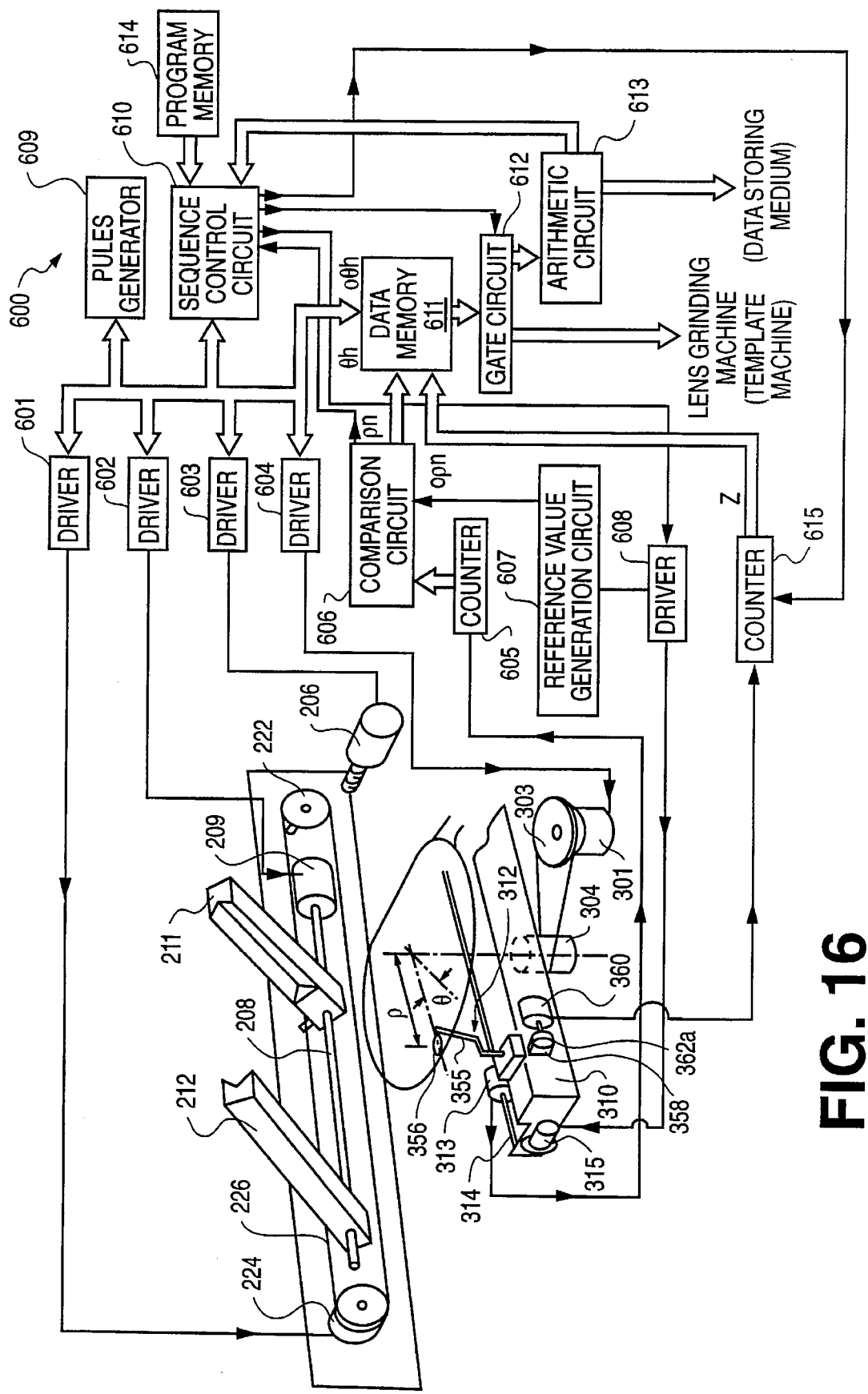
FIG. 16 is a control circuit of the lens frame configuration measuring apparatus.

FIG. 16 is a block diagram of the arithmetic and control circuit 600 of the lens frame configuration measuring apparatus according to the present invention. Driver circuits 601, 602, 603, and 604 of the arithmetic and control circuit 600 are connected to Y-axis motor 224, and the guide shaft rotating motor 209 the X-axis motor 206, and the sensor arm rotating motor 301, respectively. The driver circuits 601 to 604 are controlled by a sequence control circuit 610, while they control the rotation of each pulse motor in accordance with the number of pulses supplied from a pulse generator 609.

The quantity of movement of the magnetic scale read head 313 is calculated by a counter 605 and then is input to a comparison circuit 606. The comparison circuit 606 compares the variation of a value from the counter 605 with a signal corresponding to the allowable range a supplied from a reference value generation circuit 607. If the variation is within the range a, the value $\rho_n$ calculated by the counter 605 and the number of pulses supplied from the pulse generator 609 are transformed into a rotation angle $\theta_n$ of the sensor arm 355, and then data $(\rho_n, \theta_n)$ are input to a data memory 611 to store the data.

Also, a signal from the encoder 360 is input, as a quantity of movement of the measuring element 356 in the direction of the Z-axis, to the data memory 611 through the counter 615.

OPERATION

The lens frame configuration measuring apparatus is controllably operated by the arithmetic and control circuit 600 shown in FIG. 16. A description will be hereinafter given of the operations of the lens holder 100 and the lens frame configuration measuring apparatus controlled by the arithmetic and control circuit 600.

[1] Lens Frame Holding

Figure 2:
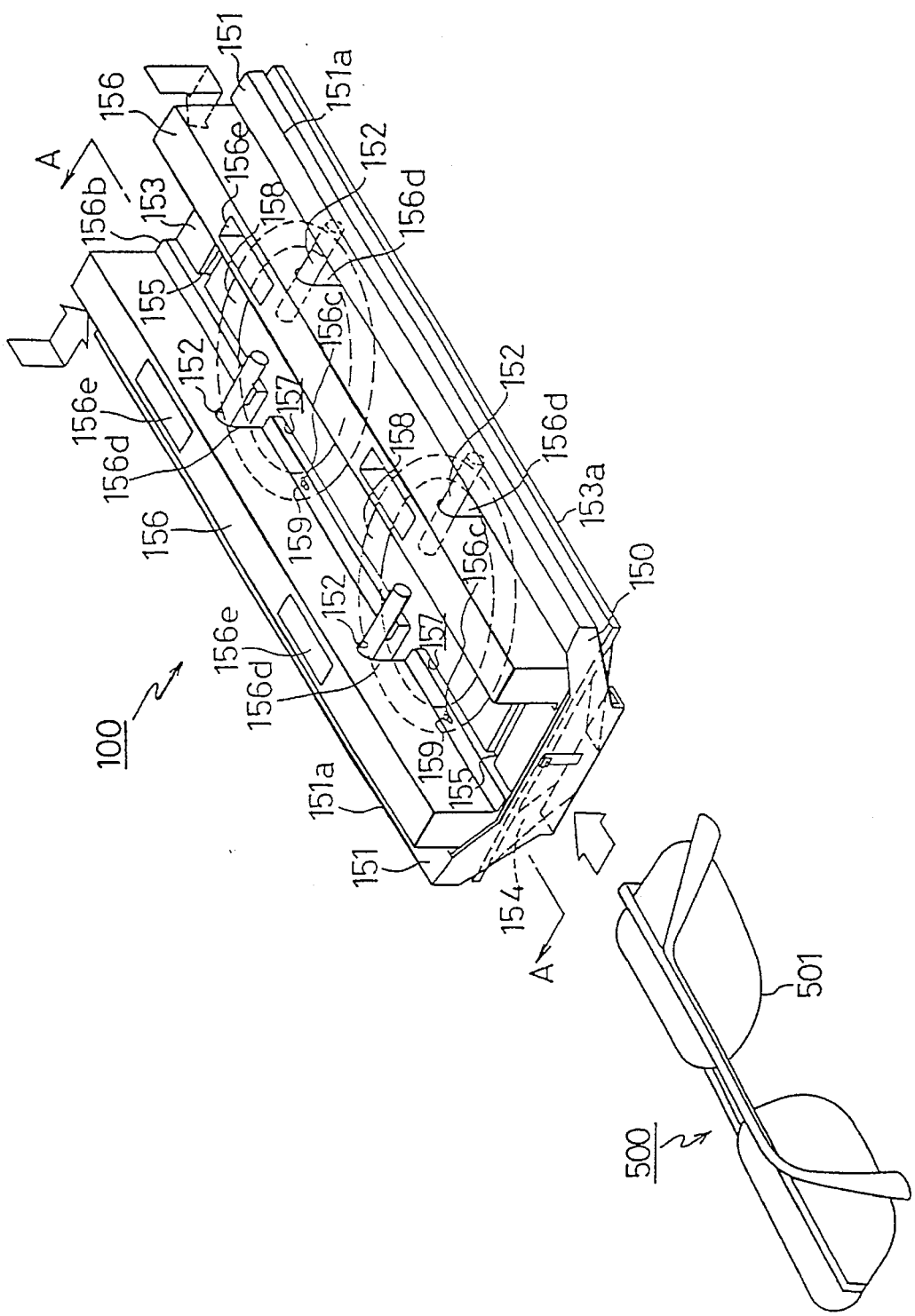
FIG. 2 is a perspective view showing a relation between a frame holding device and a pair of eyeglasses.

Fingers are first inserted into the holes 156c, 156c of the sliders 156, 156 shown in FIG. 2, and then force is applied to sufficiently widen the distance between the sliders 156, 156, while pressing the sliders 156, 156 downward against the resilience of the leaf springs 154, 154. That is, the sliders are changed from the state shown in FIG. 5 to the state shown in FIG. 3. Thereby, sufficient spaces are provided between the frame holding bars 152, 152 and the stepped portions 156b, 156b of the sliders 156, 156.

After that, the lens frame 501 desired to be measured of an eyeglass frame 500 is inserted into the space, and the distance between the sliders 156, 156 is narrowed such that the upper and lower parts of the lens frames are kept in contact with the inner walls of the sliders 156, 156.

According to this embodiment, the sliders 156, 156, as mentioned above, have a coupled structure with the rings 158, 158, and therefore, when one of the sliders 156, 156 travels a certain distance, the other slider 156 also travels a distance equivalent to that of the former.

Figure 4:
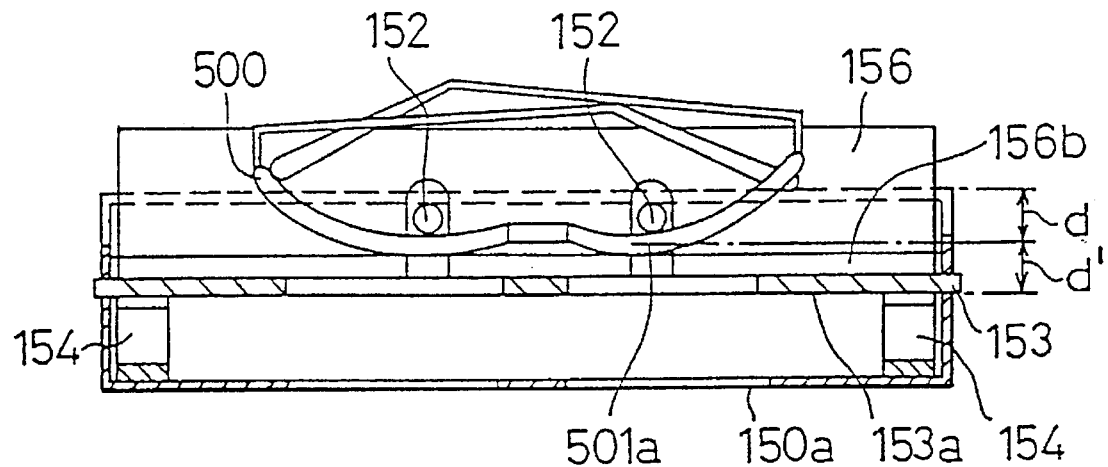
FIG. 4 is an explanatory view showing the eyeglass frame held by the frame holder.
Figure 5:
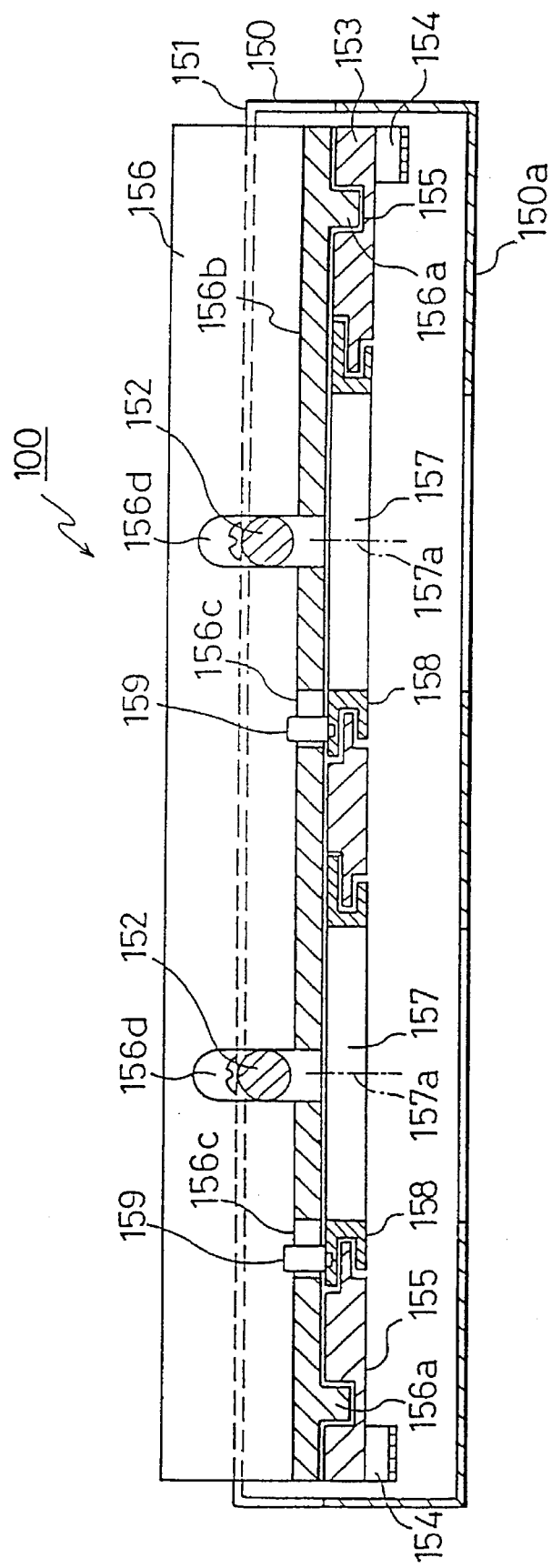
FIG. 5 is a sectional view taken on line A—A of FIG. 2.

Next, the eyeglass frame 500 is slid such that the substantial center of the upper part of the lens frame 501 is positioned under the holding bar 152. Subsequently, when the operator releases the fingers from the slider 156, 156, the movable base 153 is pushed upward by the resiliency of the leaf springs 154, 154 and, as shown in FIGS. 4 and 7, the lens frames 501, 501 are clamped between the stepped portions 156b. 156b and the holding bars 152, 152. At this time, the eyeglass frame 500 is held such that the substantial geometrical centers of the lens frames 501, 501 approximately coincide with the center lines 157a, 157a of the circular openings 157, 157 of the frame holder 100.

Further, a distance d' between the bottom (apex) 501a of the V-shaped groove (bevel groove) of the lens frame 501 and the side 151a of the flange 151 of the fixed base 150 is equal to a distance d between the bottom 501a and the side 153a of the movable base 153.

Next, the frame holder 100 holding the frame 500 is inserted into a predetermined space between the hands 211, 211 of the supporting device 200, and then the Y-axis motor 224 is rotated by a predetermined angle. The rotation of the Y-axis motor 224 drives the miniature belt 226 and the hand 211 is caused to travel leftward by a fixed distance. Simultaneously, the frame holder 100 and the hand 212 are caused to travel leftward, so that the flange 228 is released from the pin 229.

At the same time, the frame holder 100 is clamped, as shown in FIG. 6, between the hands 211, 212 by means of the pulling spring 230. At this time, the sides 151a, 151a of the flanges 151, 151 of the fixed base 150 of the frame holder 100 are respectively brought into contact with the inclined surface 215 of the hand 211 and the inclined surface 217 of the hand 212, and the sides 153a, 153a of the movable base 153 are respectively brought into contact with the inclined surface 216 of the hand 211 and the inclined surface 218 of the hand 212.

According to the preferred embodiment of the present invention, since the distance d' between the bottom (apex) 501a of the V-shaped groove 502 of the lens frame 501 and the side 151a is the same as the distance d between the apex 501a and the side 153a, when the frame holder 100 is clamped between the hands 211 and 212, an automatic coincidence is brought about between the bottom 501a and a reference plane S defined by the combined edges 219, 220 of the hands 211, 212.

Thereafter, when the guide shaft rotating motor 209 is rotated by a predetermined angle to turn the frame holder 100 to the position indicated by the alternate long and two short dashes line (phantom line) in FIG. 7, the reference plane S of the frame holder 100 stops flush with the initial position (measuring reference surface SO) of the measuring element 356 of the measuring portion 300.

[2] Arrangement of Measuring Element in Lens Frame

The Y-axis motor 224 is further rotated so that the hands 211 and 212 holding the frame holder 100 may be caused to travel a predetermined distance in the direction of the Y-axis until the center point 159a of the circular opening of the frame holder 100 substantially coincides with the axis of the rotating shaft 304 of the measuring portion 300. While the hands 212, 212 are traveling, the measuring element 356 is brought into contact with the V-shaped groove 502 of the lens frame 501.

[3] Measurement of Lens Frame Configuration

Next, after the frame holder 100 is held by the hands 211 and 212, a measurement start button, not shown, is turned on to start the measurement. This measurement will be described hereinafter with reference to the flowchart shown in FIG. 17.

(A) Provisional Measurement (i) Measurement of ρn With Respect to Rotation Angle θn Step S1

When the measurement is started by turning on the measurement start button, not shown, the sequence control circuit 610 of the arithmetic and control circuit 600 controllably operates, in Step S1, the driver 604 in accordance with a program memory 614 to rotate the motor 301 in every rotating pulses of unit rotation which is predetermined, so that the motor 301 (i.e., rotating shaft 304) is rotated by a unit angle $\Delta\theta$ to make the rotation angle $_o\theta_n$ to $_o\theta_n \leftarrow _o\theta_n + \Delta\theta$.

When the motor 301 is rotated, the measuring element 356 is moved along the V-shaped groove 502 while being rotated about the axis line 02 and receives a force directing in the extending direction of the V-shaped groove 502 from the wall surface of the V-shaped groove 502 which is inclined as the measuring element 356 is moved.

By this, the measuring element holding member 400 and the rotating shaft 403 are rotated about the axis line 01 by the bearing 406, and the measuring element 356 is inclined, as shown in FIG. 20 (a), along the V-shaped groove 502. As a consequence, the measuring element 356 is completely brought into contact with the V-shaped groove 502 as shown in FIG. 20(b).

After the rotation angle $_o\theta_n$ of the motor 301 is made to $_o\theta_n \leftarrow _o\theta_n + \Delta\theta$, the process proceeds to Step S2.

Step S2

In this Step S2, the arithmetic and control circuit 600 reads the lens frame configuration with respect to the rotation angle $_o\theta_n$ of the motor 301 (namely, rotating shaft 304) in Step S1 from the output from the magnetic scale read head 313.

Specifically, in Step S1, when the motor 301 is rotated in every rotating pulses of unit rotation which is predetermined, the sensor head section 312 is moved on the rails 311, 311 in accordance with the radius of vector of one of the lens frames (left lens frame 501 in this embodiment) and the amount of movement of the sensor head section 312 and the amount of movement of the measuring element 356 are detected by the magnetic scale 314 and the magnetic scale read head 313.

The amount of movement of the magnetic scale read head 313 is counted by the read output counter 605 and input to the comparison circuit 606.

On the other hand, the amount of movement $(\rho_n, Z_n)$ of the measuring element 356 in the direction of Z-axis is also simultaneously counted from the output from the encoder 360.

By this, three-dimensional information of $(_o\theta_n, _o\rho_n, _oZ_n)$ (n=1, 2, 3. . . N) can be obtained with respect to the lens frame configuration.

In Step S2, the three-dimensional information of $(_o\theta_n, _o\rho_n, _oZ_n)$ (n=1, 2, 3. . . N) is calculated at the position where the motor 301 (namely, rotating shaft 304) is rotated by a unit angle $\Delta\theta$(namely, position where the rotation angle $_o\theta_n$ of the motor 301 is made to $_o\theta_n \leftarrow _o\theta_n - \Delta\theta$) and then, the process proceeds to Step S3.

Step S3

In Step S3, the three-dimensional information of $(_o\theta_n, _o\rho_n, _oZ_n)$ obtained in Step S2 is stored in the data memory 611 and then the process proceeds to Step S4.

Step S4

In Step S4, the arithmetic and control circuit 600 judges whether or not the variation of the three-dimensional information of $(_o\theta_n, _o\rho_n, _oZ_n)$ obtained in Step S4 is within the predetermined established amount of operation ($\Delta\theta, \Delta\rho, \Delta Z$) wherein $\Delta\theta$ is a very small variation of the angle of rotation, $\Delta\rho$ is very small variation of the radius of vector, and $\Delta Z$ is a very small upward and downward variation. If all of them are judged as being within established amount of operation ($\Delta\theta, \Delta\rho, \Delta Z$), the process proceeds to Step S9 where the three dimensional information of $(_o\theta_n, _o\rho_n, _oZ_n)$ is stored in the data memory 611.

In contrast, if the judgment result is that the measured three-dimensional information of $(_o\theta_n, _o\rho_n, _oZ_n)$ exceeds the established amount of operation ($\Delta\theta, \Delta\rho, \Delta Z$), in other words, if the measuring element 356 is disengaged from the V-shaped groove 502 of the left lens frame 501 as shown in FIG. 23(a), the process proceeds to Step S5.

Step S5

In Step S5, the three-dimensional information of $(_o\theta_n, _o\rho_n, _oZ_n)$ where the measuring element 356 is disengaged from the V-shaped groove 502 of the left lens frame 501 is stored in the data memory, and after the motor 301 is stopped rotating. the motors 206, 209 are operated to bring the measuring element 356 away from the V-shaped groove 502 of the lens frame 501 based on the radius of vector information $(_o\theta_n, _o\rho_n)$ and then, the process proceeds to Step S6.

Step S6

In Step S6, the motors 206, 209, 224, 301, etc. are operated to bring the measuring element 356 into engagement with the V-shaped groove 502 of the lower part of the left lens frame 501 and then the process proceeds to Step S7.

Step S7

In Step S7, the angle of inclination toward the opposite side to the nose contact piece of the left lens frame 501 is measured based on the three-dimensional information of $(_o\theta_n, _o\rho_n, _oZ_n)$ of the V-shaped groove of the left lens frame 501 stored in the data memory 611.

Specifically, if a distance between the nose contact piece of the left lens frame 501 of the eyeglass frame 500 and the temple side is represented by a the arithmetic and control circuit 600 calculates an angle of inclination $\psi$ of the lens frame 501 from the variation per $\Delta\theta$ of the three dimensional information of $(_o\theta_n, _o\rho_n, _oZ_n)$. In this embodiment, the amount of inclination is calculated on the assumption that the measuring element 356 is disengaged from the V-shaped groove 502 on the side of the temple, and the distance a is assumed to be the length from the nose contact piece side to the position where the measuring element 356 is disengaged from the V-shaped groove 502. After the amount of inclination $\psi$ has been calculated, the process proceeds to Step S8.

Step S8

In Step S8, the arithmetic and control circuit 600 operates the motor 209 based on the amount of inclination $\psi$ obtained in Step S7 so as to rotate the guide shaft 208, so that the hands 211, 212 are moved upward and downward in unison with the guide shaft 208, thereby the reference plane S of the hands 211, 219 is, as shown in FIG. 23(b), rotated and inclined downward by $\psi$ with respect to the measuring reference surface S0, so that the amount of inclination on the nose contact piece side of the left lens frame 501 and the amount of inclination on the temple side are altered to be generally equal to each other, and then the process returns to Step S1 so that Steps S1 to S4 are executed. In Step S4, it is judged whether or not the variation of the three-dimensional information of $(_o\theta_n, {}_o\rho_n, {}_oZ_n)$ obtained in Step S4 is within the predetermined established operation amount ($\Delta\theta$, $\Delta\rho$, $\Delta Z$) and if the judgment result is affirmative, the process proceeds to Step S9.

In this embodiment, the adjustment of inclination (inclination alteration) is automatically made by the arithmetic and control circuit 600. Alternatively, the adjustment may be performed by the operator's hands.

Step S9

In Step S9, it is judged whether or not the angle of rotation $_o\theta_n$ of the motor 301 is 360 degrees (whether the motor 301 has made one full turn). If the judgment result is affirmative, the process proceeds to Step S9-1. In contrast, if the judgment result is negative, the process returns to Step S1 for loop.

As a result of the procedure made in Steps S1 to S9, the lens frame configuration, i.e., three-dimensional information of $(_o\theta_n, {}_o\rho_n, {}_oZ_n)$ is obtained in two cases, the first case being that the measuring element 356 is not disengaged from the V-shaped groove 502 and the second case being that the measuring element 356 is disengaged from the V-shaped groove 502. In the second case, the altered lens frame configuration is measured.

Step S9-1

In Step S9-1, the arithmetic and control circuit 600 judges whether or not the inclination adjustment (inclination alteration) is made such that the amount of inclination on the nose contact piece side of the lens frame 501 and the amount of inclination on the temple side becomes almost the same. If the judgment result is affirmative, the process proceeds to Step 13.

In contrast, if the judgment result is negative, the process proceeds to Step S10.

Step S10

After the above-mentioned measurement is made, based on data $(X_n, Y_n)$ obtained by the transformation of the data $(\rho_n, \theta_n)$ from polar to rectangular coordinates, the following points are selected; a point B $(x_b, y_b)$ to be measured showing the maximum value in the direction of the X-axis, a point D $(x_d, y_d)$ to be measured showing the minimum value in the direction of the X-axis direction: a point A $(x_a, y_a)$ to be measured showing the maximum value in the direction of the Y-axis: and a point C $(x_c, y_c)$ to be measured showing the minimum value in the direction of the Y-axis. Based on the values, the geometrical center $O_o$ of the lens frame is determinedf according to the following equation:

$$O_o(x_o, y_o) = ((K_b + K_d)/2, (y_a + y_c)/2) \quad (1)$$

Figure 18:
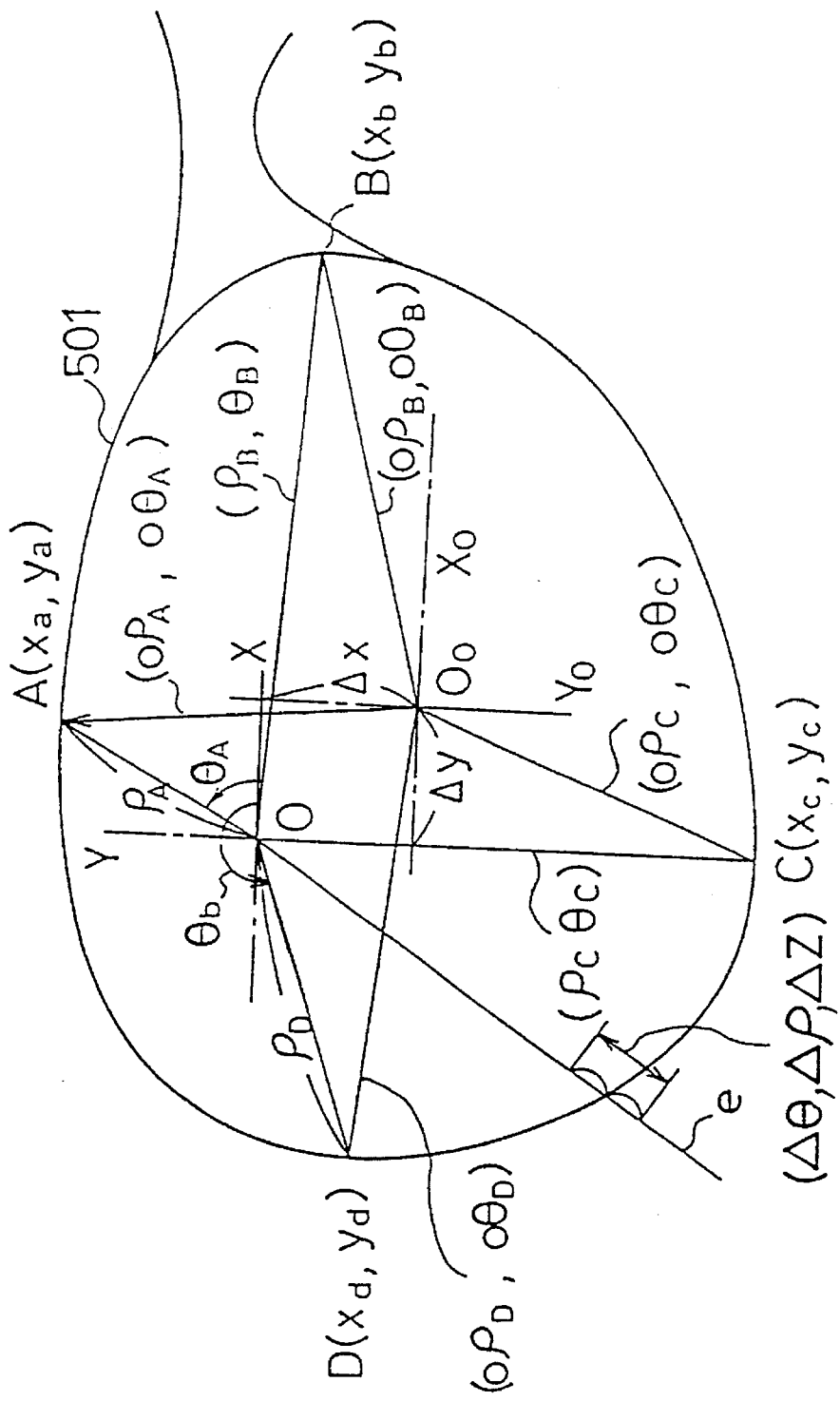
FIG. 18 is a diagrammatical view for calculating the geometrical center of a lens frame from measured values of the lens frame.

Subsequently, a measured value $)_o\rho_n, {}_o\theta_n)$ (n=1:2:3 ... N) at the geometrical center $O_o$ is calculated by the arithmetic and control circuit 600. It should be noted that as shown in FIG. 18, the measurement is made by causing the center O of the rotating shaft 304 to generally coincide with the geometrical center of the lens frame 501.

The amount of movement of the magnetic scale read head 313 is calculated by the output counter 605 and input in the comparison circuit 606. The comparison circuit 606 compares the variation of a value from the counter 607 with a signal corresponding to the established operation amount ($\Delta\theta$, $\Delta\rho$, $\Delta Z$) from the reference value generation circuit 607.

In this comparison, if the counted value is within the established operation amount ($\Delta\theta$, $\Delta\rho$, $\Delta Z$), the value $\rho_n$ calculated by the counter 605 and the number of pulses supplied from the pulse generator 609 into a rotation angle $\theta_n$ of the sensor arm 355 and input the ($\rho_n, \theta_n$) into the data memory 611 as a set of the counted value $\rho_n$ and the converted value $\theta_n$ to store the data.

Alternatively, based on the $x_o, y_o$ values, the X-axis motor 206 and the Y-axis motor 224 are driven to move the frame holder 100 clamped between the hands 211, 212, thereby causing the geometrical center of the lens frame 501 to generally coincide with center O of rotation of the sensor arm 802. Subsequently, the lens frame configuration is measured to obtain the measured value $(_o\rho_n, {}_o\theta_n)$ at the geometrical center $O_o$.

In such a provisional measurement, as shown in FIGS. 7 and 21, since the lens frame 501 is inclined, the center line 503 of the V-shaped groove 502 is inclined by $\theta$ at the upper and lower end portions of the lens frame 501. For this reason, the feeler 356 cannot contact the bottom portion of the V-shaped groove 502 of the lens frame 501 and is held in contact with either the inclined surface 502a or 502b.

As a consequence, in the above-mentioned provisional measurement, the distance d $(d \neq c = (a^2 + b^2)^{1/2})$ between the upper end portion and the lower end portion of the V-shaped groove 502 of the lens frame 501 cannot be measured correctly. An actual measurement thus obtained is smaller by 2$\Delta$d than the true measurement. For this reason, in order to obviate the error, the arithmetic and control circuit 600 calculates the inclined angle $\theta$ in this Step. When the inclined angle $\theta$ is larger than a predetermined angle $\beta$, the inclined angle $\theta$ is altered in Step S11 and a correct measurement is made in Step S12.

Based on the minimum ($h_{min}$) and the maximum ($h_{max}$) of the height $z_n$ from the reference measuring surface S0 among the lens frame configuration information $(_o\rho_n, {}_o\theta_n, {}_oZ_n)$ obtained above, the arithmetic and control circuit 600 calculates an angle $\theta$ of inclination (frame inclination) of the lens frame 502 shown in FIGS. 7 and 21, in other words, an angle $\theta$ of the center line 503 by which $h_{min}$ and $h_{max}$ of the V-shaped groove 502 are connected to each other with respect to the reference measuring surface S0.

Here, if the amount of movement of the feeler 356 in the lateral direction is represented by a and the amount of movement of the feeler 356 in the z-direction, by b, respectively, the inclination angle θ can be obtained from tan θ=b/a. After obtaining the inclination angle θ, it is judged whether or not the angle θ of inclination obtained in Step S10 is equal to or larger than the predetermined angle β (for example, 5 degrees).

If the judgement is made in the negative, the process proceeds to Step S12 without taking Step S11. In contrast, if the judgment is made in the affirmative, the process proceeds to Step S11 where the inclination is altered. When the inclination angle β is smaller than a predetermined angle, for example, about five degrees, the arithmetic and control circuit 600 skips Step S11 and the process is finished. At that time, the lens frame configuration at the time of provisional measurement, i.e., the three-dimensional information of $(_o\theta_n, {_o\rho_n}, {_oZ_n})$ is stored as the lens frame configuration information $(\theta_n, \rho_n, Z_n)$ in the data memory 611 and thereafter, the process is finished.

Step S11

V-Shaped Groove Inclination Adjustment
(Inclination Amendment)

Next, the arithmetic and control circuit 600 drives the motor 209 so that the guide shaft 208 is rotated. By doing this, the frame holder 100 an the eyeglass frame 500 are rotated downward by an angle θ in unison with the hands 211, 211 and then stopped. At that position, the center line 503 of the lens frame 501 of the eyeglass frame 500 is parallel with the plane including the apex of the feeler 356 as shown in FIG. 22. d and a shown in FIG. 21 are equal in FIG. 22, that is, d=a in FIG. 22.

Step S12

Main Measurement

In Step S12, after such an inclination alteration is finished, the arithmetic and control circuit 600 measures a new lens frame configuration $(\theta_n, \rho_n, Z_n)$ of the right and left lens frames 501 of the eyeglass frame 500 by the feeler 356 in the same manner as in Steps S1 to S4, and S9.

At this measurement, the feeler 356 is generally in agreement with V-shaped groove 502 and the apex of the feeler 356 is engaged with the bottom portion of the V-shaped groove 502. Accordingly, the distance d of the V-shaped groove 502 of the lens frame 501 can be measured correctly.

Such obtained lens frame configuration information $(\theta_n, \rho_n, Z_n)$ of the right and left lens frames 501 of the eyeglass frame 500 is stored in the data memory 811.

In this embodiment, the configuration is measured by altering only the frame inclination of the lens frame 501. However, it is also possible that the frame configuration can be measured by gradually horizontally altering the inclination of the center line at all points of the V-shaped groove 502 of the lens frame 501 and measuring the coordinates at each point in the manner as mentioned previously. Also, it is possible that a measurement is made serving the center 0 of rotation of the sensor arm 302 as the center of measurement based on the pre-input eccentric information as a difference between the geometrical center $0_o$ of the lens frame 501 and the center 0 of rotation of the arm sensor 302. Also, the frame PD (FPD) may be obtained by calculating the position of the geometrical center of the lens frame from the lens frame configuration information $(\theta_n, \rho_n, Z_n)$ of the right and left lens frames 501 and then calculating the distance between the center positions. After the main measurement is finished, the calculated results are stored in the data memory 611 and the process is finished.

Step S13

In Step S13, the arithmetic and control circuit 600 controls the motors 206, 301, etc., so that the measuring element 356 is disengaged from the V-shaped groove 502 of the left lens frame 501. Thereafter, the arithmetic and control circuit 600 activates the motor 209 to rotate the hands 211, 211 upward, and then controls the motors 206, 209, 224, 301, etc. such that the measuring element 356 is brought into contact with the V-shaped groove 502 under the right lens frame 501 of the eyeglass frame 500 as shown in FIGS. 24(a) and 24(b).

Thereafter, the arithmetic and control circuit 600 rotates the motor 501, so that the same measurement as in Steps S1 to 3 is performed within the predetermined angle (within the angle of approximately 180 degrees as indicated by reference character LX in this embodiment) with respect to the right lens frame 501 serving the position of the nose contact piece 20 as the center. Then, the process proceeds to Step S14. In the drawing, reference numeral 21 denotes a bridge connecting the right and left lens frames 501, 501 of the eyeglass frame 500, and 22 denotes a temple as an ear hanger of the eyeglass frame 500.

Step S13

In Step S14, the size of the nose contact section 20, i.e., the distance e (see FIG. 24(a)) between the V-shaped grooves 502, 502 on the nose contact section 20 side of the right and left lens frames 501, 501 is calculated from the control amount of the motors 206, 209, 224, 301, etc. in Step S12, the lens frame configuration information $(_o\rho_n, {_o\theta_n}, {_oZ_n})$ on the nose contact section side of the right lens frame 501 obtained in Step S13, etc.

On the other hand, a lateral maximum moving distance G (moving distance in the V-shaped groove 502) a of the left lens frame 501 is calculated from the lens frame configuration information $(_o\theta_n, {_o\rho_n})$ of the left lens frame 501 by making a =cos ψ. The distance G can be calculated from the rightward and leftward movement position of the measuring element 356, i.e., from the lens frame configuration information $(_o\theta_n, {_o\rho_n})$, when the inclination is altered, as shown in FIG. 23(b).

The distance FPD between the geometrical centers of the right and left lens frames 501, 501 is calculated from the distance e on the nose contact section side and the lens frame configuration information $(_o\rho_n, {_o\theta_n}, {_oZ_n})$ of the left lens frame 501 obtained in Step S10, the calculated result is stored in the data memory 611, and then the process is finished.

In the example mentioned above, a provisional measurement and a main measurement are made. However, the main measurement may be eliminated. In other words, Steps S9-1 to S12 may be eliminated and the process proceeds 40 Step S13 if the judgement result in Step S9 is that the rotation angle $_o\theta_n$ is 360 degrees (namely, one full rotation).

Supply of Data to Grinder, Etc.

By the switching of the gate circuit 612, as occasion demands, the lens frame configuration information $(\rho_n, \theta_n, Z_n)$ and FPD thus obtained and stored in the data memory 611 are supplied, for example, to a digital lens grinding machine or templating machine which is disclosed in prior Japanese Patent Application No. Sho 58-225197 which was filed by the present applicant, or to an apparatus for judging whether an eyeglass frame is shaped and sized according to predetermined design data.

From the data $Z_n$ of the lens frame configuration information ($\rho_n$, $\theta_n$, $Z_n$) stored in the data memory 611, the arithmetic circuit 613 can locate a curve value c when the need arises.

As shown in FIGS. 19(A) and 19(B), based on the radius vectors $\rho_{IA}$, $\rho_{IB}$ of at least two points a and b of the lens frame 501 and traveling distances $Z_A$ and $Z_B$ of the points a and b in the direction of the Z-axis, respectively, the radius R of curvature of a spherical body SP including the locus of the V-shaped groove 503 of the lens frame 501 is obtained according to the following equations:

$$R^2 = \rho_{IA}^2 + (Z_o - Z_A)^2$$

$$R^2 = \rho_{ID}^2 + (Z_o - Z_D)^2 \quad (2)$$

Accordingly, the curve value c is $$C = \{(n-1)/R\} \times 1000 \quad (3)$$

where n is a constant (=1.523).

The sequence control circuit executes the measuring steps mentioned above in accordance with a program stored in the program memory 614.

A finished lens L for the right or left lens frame ground in accordance with the thus obtained data has a size substantially equal to the true distance d of the lens frame shown in FIG. 22(c).

In order to measure the configuration of the lens frame 501 more accurately, the rotating shaft 403 may be interconnected with a rotary encoder via a pulley and a wire thereby the arithmetic and control circuit 600 may calculate an angle of inclination of the feeler 356 in accordance with a signal input thereto from the encoder.

SECOND EMBODIMENT

FIG. 25 shows a second embodiment of the present invention, i.e., another example of the above-mentioned embodiment, in which the rotation of the motor 301 is transmitted to the base 310 via the pulley 303 and the belt 305, and there is employed head moving amount detecting means constituted of a magnetic scale read head 313 and a magnetic scale 314.

Figure 3:
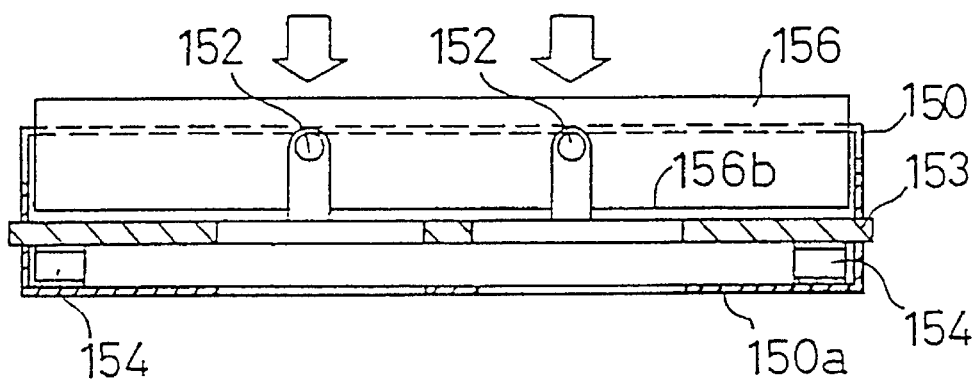
FIG. 3 is an explanatory view showing the operation of the frame holder shown in FIGS. 1 and 2.

In this embodiment, the base 310 is formed in a disk-like configuration as shown in FIG. 25 and provided with a gear portion 370 at its peripheral surface, thereby providing a base gear. The driving gear 301b disposed on the output shaft 301a of the motor 301 is meshed with the gear portion 370, so that the rotation of the motor 301 can be transmitted to the base 310.

in FIG. 25, the area indicated by 0 is rotatably supported by the casing 201 through the rotating shaft 304 shown in FIG. 3.

The head moving amount read means includes a rotary encoder 312b secured to the lower surface of the base 310 and having an output shaft 312a piercing the base 310, a rack 312c secured to the sensor head portion 312 in parallel with the rail 311, and a pinion 312d secured to the output shaft 312a and meshed with the rack 312c.

When the sensor head section 312 is moved along the rail 311, the pinion 312d is rotated by the rack 312c and the rotary endcoder 312b outputs a detection signal by detecting the traveling amount of the sensor head section 312. This detection signal is input in the data memory 611 through the traveling amount detecting circuit 615.

In FIG. 25, among members located above the slider 350, only the measuring element 356, the measuring element shaft 352, the slide sleeve body 357, and the sleeve-like collar 361 are schematically shown. It should be noted, however, that actually, those illustrated in FIGS. 9 to 11 or FIG. 12 are used. In FIG. 25, reference numeral 372 denotes a slit formed in the base 310; 310a, 310b, rail holding members secured to the upper surface of the base 310 and holding both ends of the rails 311, 311; 700, a lens frame inter-distance measuring means for measuring the distance between the right and left lens frames 501. 501 by mutually opposing line LED 702 and on-line area CCD 703; and 803, a shading plate secured to the peripheral edge portion of the base 310 and projecting, in part, from the peripheral edge, respectively.

According to the above-mentioned embodiment, even a lens frame of an eyeglass frame having so large curve as causing the measuring element to be disengaged from the lens frame can be measured either automatically or manually. Further, it never happens that the measuring element is deformed or damaged by hitting the lens frame.

Also, even in the case of a frame PD of a lens frame having a large curve as often experienced in the prior art, there is a demand for a lens frame configuration measuring apparatus in which the geometrical center positions of the right and left lens frames are calculated from the measured results of the right and left lens configurations, so that the frame PD can be obtained based on the lens frame configuration information measured within a range prohibiting the feeler from disengagement and without a need of a provision of means for measuring the distance between the geometrical center positions.

The above embodiment can meet the above-mentioned demand. According to the embodiment, from the measured results of the right and left lens frames, the geometrical center positions of the right and left lens frames are obtained, and the frame PD can be obtained based on the lens frame configuration information measured within a range prohibiting the feeler from disengaging and without a need of a provision of means for measuring the distance between the center positions. In addition, the miniaturization of the apparatus body can be realized and yet, reliable measured results in the upward and downward directions can be obtained while preventing the disengagement of the measuring element caused by the upward and downward displacement, irrespective of the degree of curvature of the lens frame.

THIRD EMBODIMENT

Overall Construction

FIG. 26 is a perspective view showing a lens frame configuration measuring apparatus according to the present invention. FIG. 27 is a perspective view, partly omitted, of FIG. 26, FIG. 28(a) is an explanatory view of a part of the interior of the case of the apparatus body shown in FIGS. 26 and 27, FIG. 28(b) is a partial sectional view for explaining a state in which a measuring head portion for measuring a lens configuration of a rimless frame into a mounting hole shown in FIG. 28(a), and FIG. 29 is an explanatory view of an important portion, partly omitted, of the lens frame configuration measuring apparatus shown in FIGS. 26 and 27.

This lens frame configuration measuring apparatus includes a frame holder 100 (frame holding means) for simultaneously holding the right and left lens frames of the eyeglass frame, and an apparatus body 1200 for attachably and detachably holding the frame holder 100 and adapted to measure the right and left lens frames and the right and left lens configuration of the rimless frame of the eyeglass frame held by the frame holder 100.

The apparatus body 1200 is constituted of a casing 1201 having an opening 1201*a* at its upper part, holder support means 1210 disposed at an upper part of the casing 1201 and adapted to attachably, detachably and inclinably hold the frame holder 100, a control panel section 1230 disposed on the right-hand side, as viewed in FIG. 26, of the casing 1201, a measuring section supporting and traveling device 1240 disposed within the casing 1201, a measuring section 1300 (see FIG. 3) for digitally measuring the configuration of the lens frame or the configuration of a template of the eyeglass frame held by the frame holder 100 held by the measuring section supporting and traveling device 1240, and others. The frame holder 100 and the holder supporting means 1210 constitute a frame holding means FH.

The detailed constructions of the frame holder 100, holder supporting means 1210, control panel section 1230, measuring section supporting and traveling device 1240, measuring section 1300, etc. will now be described.

Frame Holder 100

Since the frame holder 100 is the same in construction as that shown in the first embodiment, description thereof is omitted.

Holder Supporting Means 1210

The holder supporting means 1210 includes supporting posts 1202, 1203 (see FIGS. 26 and 27) projecting upward from opposite side walls 1201*a*, 1201*b* of the casing 1201, a C-like holding frame 1204 having opposite elements 1204*a*, 1204*b* and disposed on the supporting posts 1202 and 1203, and a pulse motor 1205 (upward and downward inclining means) secured to the outer surfaces of the supporting post 1202 and whose rotating shaft 1205*a* is allowed to pierce into the supporting post 1202.

The center of the opposite element 1204*a* of the holding frame 1204 is secured to the rotating shaft 1205*a* as an output shaft of the pulse motor 1205, whereas the center of the opposite element 1204*b* of the holding frame 1204 is rotatably supported by the supporting post 1203 through a rotating shaft 1206 coaxial with the rotating shaft 1205*a*. V-shaped grooves 1204*c*, 1204*d* are formed in opposing surfaces of the opposite elements 1204*a*, 1204*b*, respectively.

Control Panel Section 1230

The control panel section 1230 is provided with a seesaw type inclination control switch 1231, and set switch 1232, a mode switch 1233, a start switch 1234, and a transfer switch 1235. The inclination control switch 1231 is used for the initial inclination operation or the inclination operation when the measuring element is not correctly engaged with the lens frame. The set switch 1232 is used for setting (selecting) the mode for measuring the right and left lens frames or the lens. The mode switch 1233 selects the mode for an auto measurement (automatic measurement) or the mode for semi-auto measurement (semi-automatic measurement). The start switch 1234 is used to control the start/stop operation. The transfer switch 1235 transmits such measurement data as right data, left data, etc.

Measuring Section Supporting and Traveling Device 1240

Figure 28:
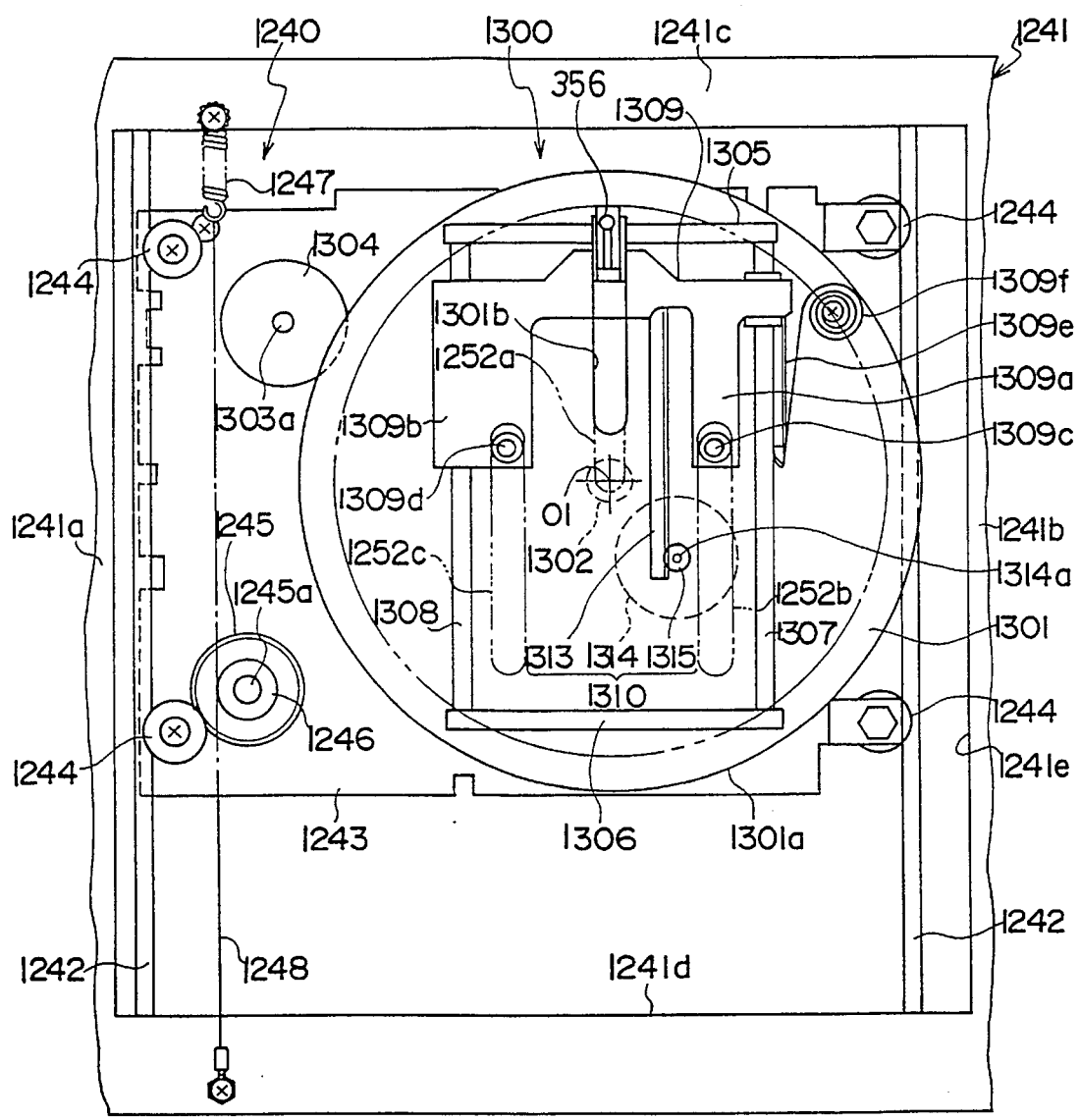
Figure 28:
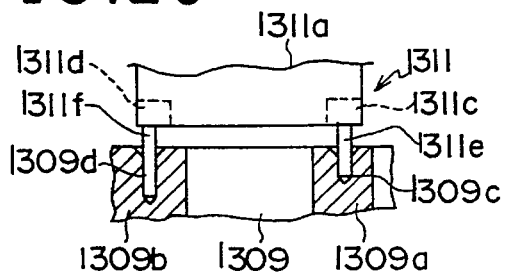

The measuring section supporting and traveling device 1240 has a chassis 1241 as shown in FIG. 28(*a*). The chassis 1241 is disposed within the casing 1201. The external side of the side wall portions 1241*a*, 1241*b* is covered with the side walls 1201*a*, 1201*b* of the casing 1201. The measuring section supporting and traveling device 1240 has guide rails 1242, 1242 which are disposed within a recess 1241*e* of the chassis 1241 in parallel with each other and extend along the side wall portions 1241*a*, 1241*b*.

As shown in FIG. 28(*a*), the measuring section supporting and moving device 1240 includes a slide plate 1243 (slide base) disposed between the guide rails 1242, 1242, and four guide rollers 1244 rotatably supported by four corners of the slide plate 1243 and adapted to movably support the slide plate 1243 in the longitudinal direction of the guide rails 1242, 1242 with their annular groove portions (not shown) extending circumferentially being in engagement with the guide rails 1242, 1242.

Further, the measuring section supporting and traveling device 1240 includes a measuring position switching motor 1245 secured to the upper surface of the slide plates 1243, a pulley 1246 secured to the output shaft 1245*a* of the measuring position switching motor 1245, a spring 1247 whose one end is secured to a rear end section 1241*c* of the chassis 1241, and a wire 1248 whose front end portion is secured to a front portion 1241*a* of the chassis 1241 and whose rear end portion is retained by the spring 1247, an intermediate portion of the wire 1248 being wound around a pulley 1246. The motor 1245 used herein is a pulse motor.

On the slide plate 1243, a square cover 1250 is upwardly spacedly disposed by a screw (not shown) with a spacer (not shown) therebetween. A circular opening 1251 is formed in the center of the cover 1250.

A rear accordion-like cover 1255 is interposed between the rear edge portion of the cover 1250 and the rear edge portion 1241*c* of the chassis 1241. A front accordion-like cover 1258 is interposed between the front edge portion of the cover 1250 and the front portion 1241*d* of the chassis 1241.

Measuring Section 1300

The measuring section 1300 shown in FIG. 28(*a*) includes a rotating base 1301 (large gear), a supporting shaft 1302, a base rotating motor 1303, and a gear 1304. The rotating base 1301 has a gear portion 1301*a* on its outer peripheral surface. The supporting shaft 1302 rotatably supports the central portion of the rotating base 1301 on the slide plate 1243. The base rotating motor 1303 is secured to the rotating base 1301. The gear 1304 is secured to the output shaft 1303*a* of the base rotating motor 1303 and meshed with the toothed portion 1301*a* of the rotating base 1301. Further, a slit 1301*b* is formed in the rotating base 1301. The slit 1301*b* extends radially from the area in the vicinity of the rotating center 01 (see FIG. 29).

Further, the measuring section 1300 has rail holding members 1305, 1306 disposed in parallel relation with each other with the center 01 of rotation of the rotating base 1301 therebetween, and secured to the upper surface of the rotating base 1301. The rail holding member 1305 is perpendicular to the slit 1301*b* on the peripheral edge portion side of the rotating base 1301.

The measuring section 1300 includes a pair of parallel rails 1307, 1308 stretched between the rail holding members 1305, 1306, a slider 1309 movable on the rails 1307, 1308 in the longitudinal direction, and a slider traveling amount detecting means 1310 for detecting the traveling amount of the slider 1309.

Supporting leg portions 1309*a*, 1309*b* extending along the rails 1307, 1308 are formed on the slider 1309. Mounting holes 1309*c*, 1309*d* are formed in end portions of the supporting leg portions 1309*a*, 1309*b*. The depth of the mounting hole 1309*c* is smaller than that of the mounting hole 1309*d*.

A spiral spring 1309*f* interposed between an arm 1309*e* integral with the slider 1309 and the moving base 1301. The spiral spring 1309*f* biases the slider 1309 so as to move along the rails 1307, 1308 in the radial direction of the rotating base 1301. The base rotating motor 1303 herein used is a pulse motor. The motor 1303, rails 1307, 1308, slider 1309, spiral spring 1309*f*, etc. constitute traveling means, as later described, for bringing the measuring element 1356 into contact with the V-shaped groove 502 of the eyeglass frame 500.

Further, the measuring section 1300 includes a measuring head section 1311 for measuring the lens configuration of the rimless frame held by the slider 1309, and a measuring head section 1312 for measuring the configuration of the lens frame held by the slider 1309.

The above-mentioned slider traveling amount detecting means 1310, and measuring head section 1311, 1312 are constructed as follows.

Slider Traveling Amount Detecting Means 1310

The slider traveling amount detecting means 1310 includes a rack bar 1313 secured to the slider 1309 in parallel with the rails 1307, 1308, a rotary encoder 1314 secured to the lower surface side of the rotating base 1301, and pinion 1315 secured to the output shaft 1341*a* of the rotary encoder 1314 and meshed with the rack bar 1313.

Measuring Head Section 1311

As shown in FIG. 28(*b*), the measuring head section 1311 for measuring the lens configuration of the rimless frame includes a measuring element body 1311*a*, a cut-out cylindrical or semi-cylindrical measuring head section (measuring element portion i.e., contact element portion) disposed at an upper end portion of the measuring element body 1311*a*, and mounting legs 1311*c*, 1311*d* disposed on each side of the measuring element body 1311*a*.

The measuring head section 1311 has mounting shafts 1311*e*, 1311*f* disposed on the mounting legs 1311*c*, 1311*d*. The mounting shaft 1311*e* is shorter than the mounting shaft 1311*f*. The mounting shafts 1311*e*, 1311*f* are removably fitted respectively in the mounting holes 1309*c*, 1309*d* formed in the slider 1309.

By making the length of the mounting shafts 1311*e*, 1311*f* and the depth of the mounting holes 1309*c*, 1309*d* different, the measuring head section 1311 can be prevented from being mounted in the wrong way.

Measuring Head Section 1312

Since the construction of the measuring head section 1312 is the same as that in the first embodiment, only different points in mounting operation will be described and description of the remainder is omitted.

The measuring element holding member 351 of the measuring head section 12 has, as previously mentioned, a fixed sleeve member 353 provided with a flange 353*a*. The flange 353*a* is located on the upper surface of the slider 1309 and secured (the secured state is not shown) thereto by a securing means, such as a screw, not shown. The outer wall of the rack member 358 is supported by a pair of flanges 1309*a* (only one of them is shown) formed on the slider 1309. The flange 1309*a* permits the upward and downward displacement of the rack member 358 and restricts the rotation thereof. Further, a rotary encoder 360 (displacement amount measuring means) is secured to the slider 1309. It is possible that the bracket 363 is eliminated and one end (bracket 363 side) of the coil spring 364 is secured to the slider 1309.

If a plane, which is parallel with a plane including the axis line of the rails 1307, 1308 and which includes the axis line of the rotating shafts 1205*a*, 1260, is served as a measuring reference plane, the axis line 01 of the rotating shaft 403 is parallel with the measuring reference plane SO and is perpendicular to the axis line 02 of the measuring element axis 352.

On the rotating base 1301 shown in FIG. 28(*a*), a disk-like cover 1252 is spacedly disposed by a spacer (not shown) and secured by a screw (not shown), such that a circular opening 1251 of the cover 1250 is closed by the disk-like cover 1252.

Slits 1252*a*, 1252*b*, 1252*c* are formed in the circular cover 1252. The slit 1252*a* is parallel with the rails 1307, 1308, exists on the center between the rails 1307, 1308 and located above the slit 1301. The slits 1252*b*, 1252*c* correspond to the track of the mounting holes 1309*c*, 1309*d* when the slider 1309 is moved along the rails 1307, 1308. The upper end portion of the measuring element shaft 1352 projects upward from the slit 1252*a*, whereas the mounting legs 1311*c*, 1311*d* of the measuring head section 1311 are fitted in the mounting holes 1309*c*, 1309*d* through the slits 1252*b*, 1252*c*.

As apparent from FIGS. 26 and 27, the feeler portion 1311*b* of the measuring head section 1311 projects upwardly exceeding the measuring element 356 of the measuring head section 1312.

Arithmetic and Control Circuit 1600

As shown in FIG. 31, the arithmetic and control circuit 1600 includes drivers 1601, 1602, a counter 1605, a comparison circuit 1606, a reference value generating circuit 1607, a driver 1608, a pulse generating circuit 1609, a sequence control circuit 1610, a data memory 1611, a gate circuit 1612, an arithmetic circuit 1613, a program memory 1614, a counter 1615, and the like.

Control signals from the switches 1231 to 1235 of the control panel section 1230 are input to the control circuit 1613 of the arithmetic and control circuit 1600. A detected signal from the rotary encoder 1314 is input to the control circuit 1613 of the arithmetic and control circuit 1600 via the counter 1605, comparison circuit 1606, data memory 1611, gate circuit 1612, etc. A detected signal from the rotary encoder 1360 is input to the control circuit 1613 of the arithmetic and control circuit 1600 via the counter 1615, data memory 1611, gate circuit 1612, etc.

Upon receipt of the control signals from the various switches 1231 to 1235, the control circuit 1613 controls the operation of each section in accordance with the program stored in the program memory 1614, so that the motors 1205, 1245, 1305, etc. are driven.

The drivers 1601, 1602, 1608 control the rotation of the motors 1205, 1245, 1303 in accordance with the number of pulses supplied from the pulse generator 1609 under the control of the sequence control circuit 1610.

Operation and Function of Arithmetic and Control Circuit 1600

A description will now be given of the control of the operation of the arithmetic and control circuit 1600 and operations of various sections accompanying with the measurement.

[A] LENS FRAME CONFIGURATION MEASUREMENT (i) Lens Frame Holding

The lens frame of the eyeglass frame is held by the frame holder 100 in the same manner as in the first embodiment.

(ii) Prepartion For Mounting Frame Holder 100 on Measuring Apparatus Body 1200 a. Setting of Measuring Mode and Movement of Holding Frame to Holder Attaching/Detaching Position Next, before the frame holder 100 is mounted on the measuring element body 1200, the measuring head 1311 for measuring the distance between the geometrical centers of lenses of the measuring apparatus body 1200 is removed from the slider 1309.

When the mode switch 1233 of the control panel section 1230 is set to the auto (automatic) mode, the arithmetic and control circuit 1600 supplies a predetermined number of pulses to the pulse motor 1205 via the sequence control circuit 1610, and the driver 1601, to cause the pulse motor 1205 to rotate normally by a predetermined amount. After the holding frame 1204 is rotated about the rotating shafts 1205a, 1206 by a predetermined amount in the direction where the front end portion of the holding frame 1204 is moved upward, the pulse motor 1205 is caused to stop. In this position, the holding frame 1204 is inclined upward by angle β as shown in FIG. 10(*b*).

b. Selection of Right and Left Lens Frames or Lenses to be Measured (Selection of Measuring Position)

The set switch 1232 of the control panel 1230 is operated to select either the right or left lens frame of the eyeglass frame, which lens frame configuration is to be measured. If the left lens frame is selected, the arithmetic and control circuit 1600 supplies a predetermined number of pulses to the pulse motor 1245 via the sequence control circuit 1610 and driver 1608 to rotate the pulse motor 1245 so that the slide plate 1243 is moved to the center (lens frame measuring position for the left eye) in the sense of the forward and backward directions of a second half portion of the chassis 1241.

On the other hand, if the right lens frame is selected, the arithmetic and control circuit 1600 supplies a predetermined number of pulses to the pulse motor 1245 via the sequence control circuit 1610 and driver 1608 to rotate the pulse motor 1245 so that the slide plate 1243 is moved to the center (lens measuring position for the right eye) in the sense of the forward and backward direction of a first half portion of the chassis 1241.

Further, the arithmetic and control circuit 1600 supplies a predetermined number of pulses to the base rotating motor 1303 via the sequence control circuit 1610 and driver 1608 to rotate the base rotating motor 1303 to thereby rotate the rotating base 1301, so that the slit 1252a is positioned in parallel with the right and left side walls 1201a, 1201b.

By doing this, the arithmetic and control circuit 1600 causes the measuring element 1356 to move to generally above the center of the rear half portion of the upper opening of the case 1201 or to generally above the center of the front half portion of the upper opening of the case 1201.

(iii) Mounting of Frame Holder 100 on Measuring Apparatus Body 1200

In this state, the frame holder 100 is inserted into and held by the V-shaped grooves 1204c, 1204d of the opposing elements 1204a, 1204b of the holding frame 1204 disposed on the apparatus body 1200.

In this embodiment, as shown in FIG. 4, since the distances d respectively from the apex 501a of the V-shaped groove of the lens frame 501 to the side 151a and to the side 153a are equal, when the frame holder 100 is clamped between the opposing elements 1204a, 1204b of the holding frame 204, the apex 501a of the V-shaped groove of the lens frame 501 is automatically positioned on the reference plane S defined by the groove bottom lines 1204c, 1204d of the opposing elements 1204a, 1204b, as shown in FIGS. 30(*a*) to 30(*c*).

(iv) Provisional Measurement of One of Right and Left Lens Frames 501, 501 a. Measurement of Vector Radius $\rho_n$ With Respect to Rotation Angle $\theta_n$ Next, when the start switch 1234 of the control panel 1230 is operated, the arithmetic and control circuit 1613 supplies a predetermined number of pulses to the pulse motor via the sequence control circuit 1610 and driver 1602 to rotate the pulse motor 1205 reversely by a predetermined amount. After the holding frame 1204 is rotated to the horizontal position as shown in FIG. 30(*a*), the pulse motor 1205 is caused to stop.

At that time, the frame holder 100 is turned counterclockwise from the position shown in FIG. 30(*b*), so that the reference plane S is stopped on the same plane as the initial position (reference measuring plane SO) of the measuring element 356 of the measuring section 1300. Here, the lower side of the lens frame 501 at the time the eyeglass is put on, is referred to as the "lower side" in the following description of the measuring operation.

Thereafter, the arithmetic and control circuit 1600 controls the operation of the base rotating motor 1303 to rotate the rotating base 1301 and the disk-like cover 1252 in unison, so that the measuring element 356 is turned generally to the center side in the sense of the right and left directions of the lower side of the lens frame 501. At that time, in the course of the movement, the measuring element 356 is brought into contact with the V-shaped groove 502 of the lens frame 501.

In that state, when the start switch 1234 of the control panel section 1230 is turned on for the start of the measurement, the arithmetic control circuit 1600 controls the rotational operation of the base rotating motor 1303.

Owing to the rotational operation controlling, the measuring element 356 is moved along the V-shaped groove 502 while rotating about the axis line 02. Due to a force acting on the measuring element 356 from the wall surface of the V-shaped groove 502 which is inclined as the measuring element 356 is moved along the V-shaped groove 502, the measuring element holding member 400 and the rotating shaft 403 are rotated about the axis line 01 by the bearing 406. As a result, the measuring element 356 is inclined along the V-shaped groove 502 as shown in FIG. 20(a), so that the measuring element 356 is fully engaged with the V-shaped groove 502 as shown in FIG. 20(b).

The arithmetic and control circuit 1600 rotates first the motor 1301 in every rotating pulses of unit rotation which is predetermined.

As a consequence, the measuring head section 1312 is moved on the rails 1307, 1308 in accordance with the configuration of the eyeglass frame 550, in other words, in accordance with the vector radius of the lens frame 501. The movement of the measuring head section 1312 is transmitted to the rotary encoder 1314 through the rack bar 1313 and the pinion 1315. The traveling amount of the measuring head section 1312 is detected by the rotary encoder 1314.

At that time, the lens configuration is measured as $(\rho_n, \theta_n)$ (n=1, 2, 3 . . . ) from the traveling amount $\rho$ of the slider 1309 based on the rotation angle $\theta$ of the motor 1303 and the output from the rotary encoder 1314.

Here, the measurement is made, as previously described, by causing the center 0 of the rotating shaft 1304 to generally coincide with the geometrical center of the lens frame 501.

After the above-mentioned measurement is made, based on data $(X_n, Y_n)$ obtained by the transformation of the data $(\rho_n, \theta_n)$ from polar to rectangular coordinates, the following points are selected; a point B $(x_b, y_b)$ to be measured showing the maximum value in the direction of the X-axis, a point D $(x_d, y_d)$ to be measured showing the minimum value in the direction of the X-axis direction; a point A $(x_a, y_a)$ to be measured showing the maximum value in the direction of the Y-axis; and a point C $(x_c, y_c)$ to be measured showing the minimum value in the direction of the Y-axis. Based on the values, the geometrical center $0_0$ of the lens frame is determined according to the following equation:

$$O_o(X_o, Y_o)=((x_b+x_d)/2, (y_a+y_o)2) \quad (1)$$

Subsequently, a measured value $(_o\rho_n, _o\theta_n)$ n=1:2:3 . . . N) at the geometrical center $0_o$ is calculated by the arithmetic and control circuit 600.

After counted by the read output counter 1605, the measured signal from the rotary encoder 1314 is input to the comparison circuit 1606.

The comparison circuit 1606 compares the variation of a value from the counter 1605 with a signal corresponding to the allowable range a supplied from a reference value generation circuit 1607. If the variation is within the range a, the value $Y_n$ calculated by the counter 1605 and the number of pulses supplied from the pulse generator 1609 are transformed into a rotation angle $\theta_n$ of the sensor arm 355, and then data $(\rho_n, \theta_n)$ are input to a data memory 1611 to store the data.

b. Measurement of Data $Z_n$ in Z-Axis Direction With Respect to Vector Radius $(\rho_n, \theta_n)$ At the time the lens frame configuration is measured based on the geometrical center $0_o$, the traveling amount of the measuring element 356 in the direction of the Z-axis is simultaneously measured by the rotary encoder 360. By this, the three-dimensional information of $(_o\rho_n, _o\theta_n, _oZ_n)$ (n=1, 2, 3 . . . ) can be eventually obtained with respect to the lens frame configuration.

Next, the sequence control circuit 1610 switches the gate circuit 1612 toward the arithmetic circuit 1613 to cause the circuit 1613 to calculate the geometrical center $0_o$ of the lens frame based on the vector radius $(\rho_n, \theta_n)$ stored in the data memory 1611, so as to input the data to the sequence control circuit 1610.

Based on the data from the arithmetic circuit 1618, the sequence control circuit 1610 calculates $x_o$, $y_o$ from the above-mentioned equation (1), and inputs the number of pulses required to the drivers 1601, 1608 to control the operation of the motors 1245, 1303 so that the center of the lens frame 500 is caused to coincide with the center of rotation of the arm 135.

At the same time, the sequence control circuit 1610 sends a command to the counter circuit 1615 instructing the circuit 1615 to measure the data from the Z-axis rotary encoder 360.

Thereafter, the lens frame information $(_o\rho_n, _o\theta_n, _oZ_n)$ including the Z-axis direction data is measured, and the obtained data is stored in the data memory 1611.

Here, if the measured value $\rho_n$ or $_o\rho_n$ from the counter 1605 is larger than the vector radius variation range a output from the reference value generating circuit 1607, the comparison circuit 1606 sends an output telling to that effect to the sequence control circuit 1610, and stops the supply of pulses to the driver 1601 so that the motor 1303 is prevented from rotation.

(v) V-Shaped Groove Inclination Adjustment of One Lens Frame 501 (Inclination Amendment)

Based on the minimum ($h_{min}$) and maximum ($h_{max}$) of the height $z_n$ from the reference measuring plane SO among the lens frame configuration information $(_o\rho_n, _o\theta_n, _oZ_n)$ thus obtained, the arithmetic and control circuit 1600 calculates an inclination (frame inclination) angle $\theta$ of the lens frame 502 shown in FIG. 21, in other words, an angle $\theta$ with respect to the reference measuring plane SO of the center line 503 interconnecting $h_{min}$ and $h_{max}$ of the V-shaped groove 502. Here, if the rightward and leftward traveling amount of the feeler 356 is represented by a and the Z-axis direction traveling amount of the feeler 356, by b, the inclination angle $\theta$ can be obtained from tan $\theta$=b/a.

Figure 30C:
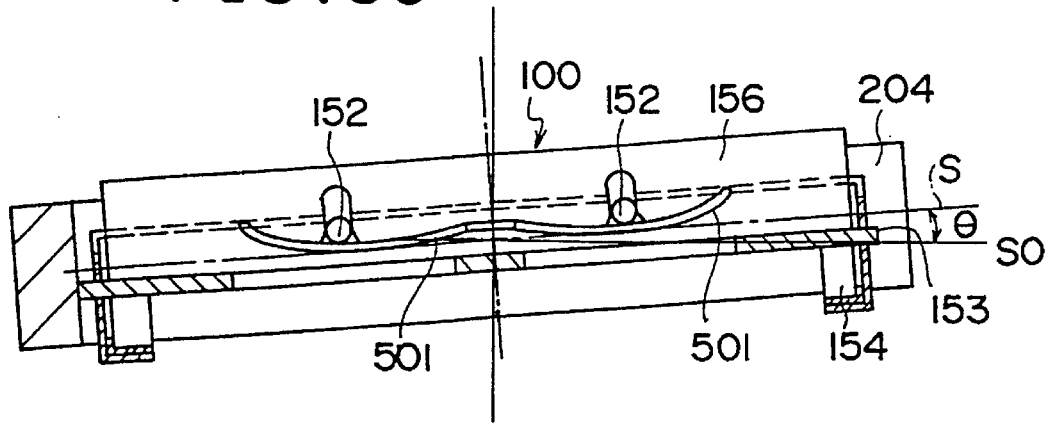

Then, the arithmetic and control circuit 1600 controls the operation of the motor 1209 to rotate the guide shaft 1208 so that the frame holder 100 and eyeglass frame 500 are rotated counterclockwise in unison with the holding frame 1204 by an angle $\theta$ as shown in FIG. 30(c) and then stopped. In this position, the center line 503 of the lens frame 501 of the eyeglass frame 500 is in parallel with the reference measuring plane SO as shown in FIG. 23. Since the reference measuring plane SO is in parallel with the plane including the apex of the measuring element 356, the center line 503 of the lens frame 501 is in parallel with the plane including the apex of the measuring element 356.

(vi) Main Measurement of One Lens Frame

After such an inclination alteration as mentioned above is finished, the arithmetic and control circuit 1600 measures new lens frame configuration information $({}_o\rho_n, {}_o\theta_n, {}_oZ_n)$ by the measuring element 356 in the same manner as in the case with the above-mentioned provisional measurement.

At the time of measurement, since the measuring element 356 generally coincides, as shown in FIG. 22, with the V-shaped groove 502 and the apex of the measuring element 356 is engaged with the bottom portion of the V-shaped groove 502, the distance d of the V-shaped groove 502 of the lens frame 501 can be almost correctly measured.

The thus obtained new lens frame configuration information $({}_o\rho_n, {}_o\theta_n, Z_n)$ is stored in the data memory 1611 and then the measuring operation is finished.

In this embodiment, the lens configuration is measured by altering only the inclination of the lens frame 501. Instead, it may be measured such that the inclination of the center line passing through all the points of the V-shaped groove 502 of the lens frame 501 is alternately altered to be horizontal and then the measurement of coordinates of each of the points is carried out.

As shown in FIG. 27, the measuring head section 1311 is mounted on the slider 1309, the lens of the rimless frame is held by a lens holder (not shown), the lens holder is held by the holding frame 1204 in the same manner as in the frame holder 100, and the feeler portion 1311b of the measuring head section 1311 is brought into contact with the peripheral surface of the lens of the lens holder, thereby the lens configuration can be measured in the same manner as in the case with the provisional measurement.

(vii) Frame Configuration Measurement With Respect to Remaining Right or Left Lens Frame 501

After the measurement of the frame configuration is finished with respect to one of the right and left lens frames 501, 501 in the above (v) and (vi), the arithmetic and control circuit 1600 controls the motor 1245 so as to move from the position for measuring one of the right and left lens frames indicated by b of the above (ii) to the position for measuring the remaining one.

Then, the arithmetic and control circuit 1600 executes a measurement with respect to the frame configuration of the remaining right or left lens frame 501, 501 following the same procedure as the above (v) and (vi) and stores the data in the data memory.

Thereafter, the arithmetic and control circuit 1600 calculates the distance (FPD) between the geometrical centers of the right and left lens frames 501 and 501 from the obtained geometrical center positions of the right and left lens frames and the traveling amount of the motor 1245.

[B] DATA SUPPLY TO LENS GRINDING MACHINE

By the switching of the gate circuit 1612, as occasion demands, the lens frame configuration information $(\rho_n, \theta_n, Z_n)$ and FPD thus obtained and stored in the data memory 1611 are supplied, for example, to a digital lens grinding machine or templating machine which is disclosed in prior Japanese Patent Application No. Sho 58-225197 which was filed by the present applicant, or to an apparatus for judging whether an eyeglass frame is shaped and sized according to predetermined design data.

From the data $Z_n$ of the lens frame configuration information $(\rho_n, \theta_n, Z_n)$ stored in the data memory 1611, the arithmetic circuit 1613 can locate a curve value c when the need arises.

As shown in FIGS. 19(A) and 19(B), based on the radius vectors $\rho_{IA}, \rho_{IB}$ of at least two points a and b of the lens frame and traveling distances $Z_A$ and $Z_B$ of the points a and b in the direction of the Z-axis, respectively, the radius R of curvature of a spherical body SP including the locus of the V-shaped groove 503 of the lens frame 501 is obtained according to the following equations:

$$R^2 = \rho_{IA}^2 + (Z_o - Z_A)^2$$
$$R^2 = \rho_{IB}^2 + (Z_o - Z_B)^2 \quad (2)$$

Accordingly, the curve value c is $$C = \{(n-1)/R\} \times 1000 \quad (3)$$

where n is a constant (=1.523).

The sequence control circuit executes the measuring steps mentioned above in accordance with a program stored in the program memory 1614.

A finished lens L ground in accordance with the thus obtained data has a size substantially equal to the true distance d of the lens frame shown in FIG. 22. In FIG. 17(c), the finished lens L is represented slightly different in size from the distance d for convenience of illustration, but the two are formed substantially equal to each other in fact.

In order to measure the configuration of the lens frame 501 more accurately, the rotating shaft 403 may be interconnected with a rotary encoder via a pulley and a wire thereby the arithmetic and control circuit 1600 may calculate an angle of inclination of the measuring element 356 in accordance with a signal input thereto from the encoder.

FOURTH EMBODIMENT

In the embodiments so far described, the measuring head section 1311 is attachably and detachably disposed so that the measuring head section 1311 is removed from the slider 1309 when the lens frame configuration is measured. However, the present invention is not necessarily limited to this.

For example, as shown in FIG. 34, the measuring head section 1311 may be constituted of an L shaped base plate 1311g formed from the bottom wall portion BW and the rear wall portion RW, mounting legs 1311c, 1311d mounted on the base plate 1311g, mounting shafts 1311e, 1311f disposed between the mounting legs 1311c, 1311d, a feeler portion 1311b mounted on an apparatus body 1311a, and a rotating shaft 1311h for collapsibly supporting the apparatus body 1311a by the mounting legs 1311c, 1311d, whereby the apparatus body 1311a can be collapsed on the bottom wall portion BW.

FIFTH EMBODIMENT

Figure 36:
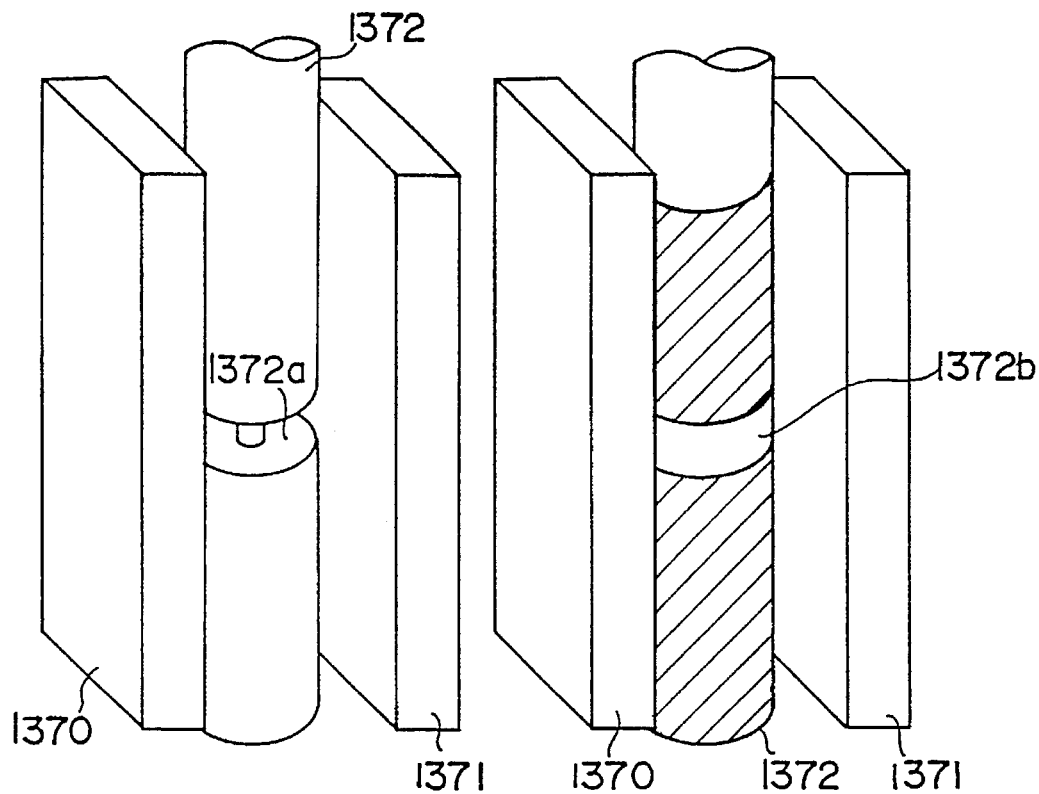
Figure 36:
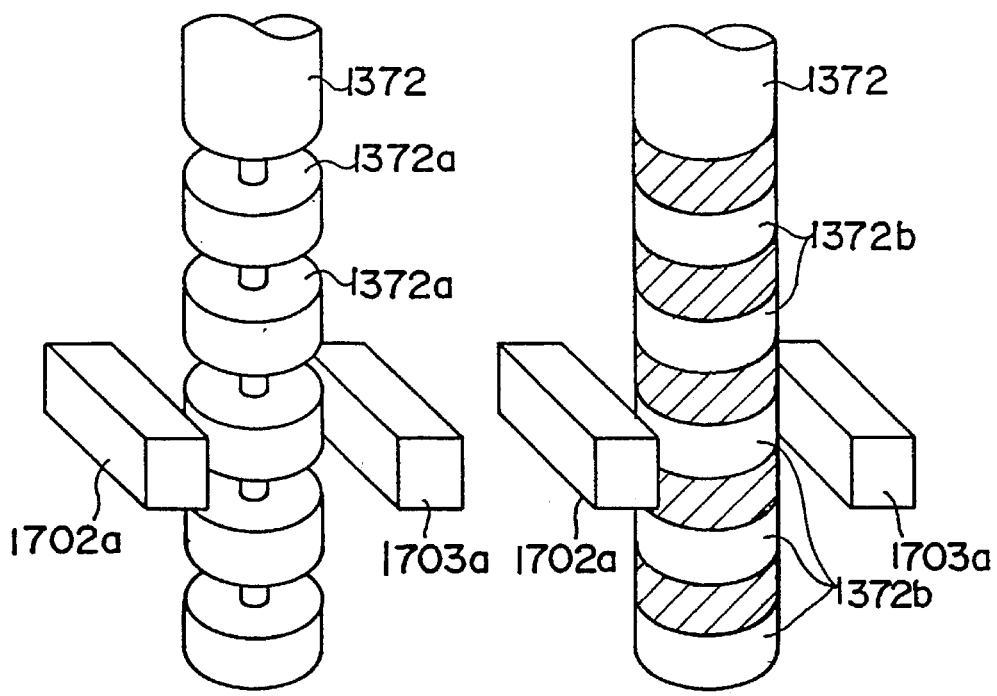

FIGS. 35 and 36 show a construction which can take the place of the rotary encoder 1314 of the first embodiment.

In FIG. 35, a linear sensor as Z-axis direction position detecting means for detecting the traveling amount in the vertical direction of the measuring element 352, in other words, for measuring the traveling amount of the measuring element 352 in the direction of the Z-axis, is disposed on a lower part of the slider 1309 and a lower part of the measuring element shaft 352.

This linear sensor includes a line CCD 1370 (line sensor) as an optical sensor secured to the lower end portion of the slider 1309, and a line LED 1371 (line light emitting means) placed opposite to the line CCD 1370 with the measuring element shaft 352 sandwiched therebetween.

The Z-axis direction position detecting means has a cylindrical scale 1372 formed integrally with the lower end of the measuring element shaft 1309. As illustrated, an annular groove 1372a as a light transmitting portion is formed in the scale 1372.

In the embodiment described above, the annular groove 1372a formed in the scale 1372 serves as a light transmitting portion. However, the present invention is not necessarily limited to this. For example, the light transmitting portion formed at the scale 1372 may be a transparent circular portion 1372b having a thin width as shown in FIG. 36(*b*).

Also, as shown in FIGS. 36(*d*) and 36(*c*), annular grooves 1372a and transparent circular portions 1372b may be arranged at equal intervals in the axial direction, and LED 1702a and a light receiving element 1703a may be provided in the place of the line LED 1371 and linear area CCD 1370. In that case, by counting the signals output from the light receiving element 1703 when light from the LED 1702 reaches the light receiving element 1703a, the traveling amount of the measuring element 356 in the Z-direction can be measured correctly.

Since the present invention is constructed in the manner as mentioned above, the lens frame configuration can be correctly measured irrespective of the curve and inclination of the lens frame of an eyeglass frame.

Also, even with respect to an eyeglass frame having so large curve as to cause the measuring element to escape or disengage greatly from the lens frame, the lens frame configuration can be measured either automatically or manually. Moreover, it never happens that the measuring element is deformed or damaged by hitting the lens frame.

Furthermore, according to the present invention, miniaturization of the apparatus body can be realized, and yet reliable measured results in the upward and downward directions can be obtained while preventing the disengagement of the measuring element caused by the upward and downward displacement, irrespective of the degree of curvature of the lens frame.

In addition, since the frame holding means is designed such that it can be upwardly and downwardly rotated for inclination about the nose contact portion of the eyeglass frame, the amount of inclination of the frame holding means for making the line interconnecting the center of the V-shaped groove on the nose contact piece side of the lens frame and the center of the V-shaped groove on the side apart from the nose contact piece side of the lens frame parallel with the measuring reference plane can be made generally equal for the right and left lens frame. Therefore, controlling thereof is easy.

What is claimed is:

1. An apparatus for measuring a lens frame configuration, comprising:

an apparatus body provided with a measuring reference surface;

frame holding means movably retained by said apparatus body and adapted to hold right and left lens frames of an eyeglass frame so as to rotate and incline a holding plane of said lens frame with respect to said reference surface;

rotating means for rotating and inclining said frame holding means;

measuring means for measuring coordinates of each point in a circumferential direction of a V-shaped groove of said lens frame with respect to said measuring reference surface; and an arithmetic circuit for calculating an inclination of said lens frame in said V-shaped groove with respect to said reference surface from a result obtained by said measuring means.

2. An apparatus for measuring a lens frame configuration, comprising:

an apparatus body provided with a measuring reference surface;

frame holding means for simultaneously holding right and left lens frames of an eyeglass frame, said frame holding means being attachably and detachably held by said apparatus body;

a measuring element retained by said apparatus body so as to be engaged in a V-shaped groove of said eyeglass frame;

measuring section supporting/moving means for supporting said measuring element and relatively moving the same to the side of selected one of said right and left lens frames of said eyeglass frame;

moving quantity detecting means for detecting a quantity of three-dimensional movement of said measuring element by moving said measuring element in contact with and along said V-shaped groove; and an arithmetic control circuit for controllably driving said moving quantity detecting means and calculating an inclination of said lens frame and a quantity of movement to reduce said inclination of said lens frame relative to said reference surface from an output result of said moving quantity detecting means.

3. An apparatus for measuring a lens frame configuration, comprising:

an apparatus body provided with a measuring reference surface;

frame holding means movably retained by said apparatus body and adapted to simultaneously hold right and left lens frames of an eyeglass frame so as to rotate and incline a holding plane of said lens frame with respect to said reference surface;

a measuring element retained by said apparatus body so as to be engaged in a V-shaped groove of said eyeglass frame;

rotating means for rotating and inclining said frame holding means;

measuring means for measuring coordinates of each point in a circumferential direction of a V-shaped groove of said lens frame with respect to said measuring reference surface; and an arithmetic control circuit for calculating an inclination of said V-shaped groove of said lens frame with respect to said reference surface from a result obtained by said measuring means;

wherein said arithmetic control circuit preliminarily stores data of inclination at the time said measuring element is disengaged from said lens frame of said eyeglass frame, rotates and inclines, when remeasuring, said frame holding means automatically or by way of the operator's manual operation to measure coordinates of each point in said V-shaped groove by said measuring means, based on said inclination data, and calculates a configuration of said lens frame of said eyeglass frame from a measured result.

4. An apparatus for measuring a lens frame configuration, comprising;

an apparatus body;

frame holding means disposed along an upper part of said apparatus body and attachably and detachably retained by said apparatus body, said frame holding means being adapted to hold an eyeglass frame along an upper surface of said apparatus body;

a measuring element retained by said apparatus body so as to be engaged in a V-shaped groove of said eyeglass frame;

measuring section supporting/moving means for supporting said measuring element and relatively moving the same to the side of selected one of said right and left lens frames of said eyeglass frame;

moving quantity detecting means for detecting a quantity of three-dimensional movement of said measuring element by moving said measuring element in contact with and along said V-shaped groove; and an arithmetic control circuit for controllably driving said moving quantity detecting means and calculating an inclination of said lens frame and a quantity of movement to reduce said inclination of said lens frame relative to said upper part of said apparatus body from a result output by said moving quantity detecting means;

wherein said frame holding means has a rotating shaft, said rotating shaft being situated at a place corresponding to a nose contact portion of said eyeglass frame so as to rotate said eyeglass frame upward and downward centering said nose contact portion, said measuring section supporting/moving means being relatively moved according to a direction of inclination of said frame holding means in order to measure a three-dimensional configuration of said eyeglass frame.

\* \* \* \* \*